US012186752B2

(12) United States Patent
Seo et al.

(10) Patent No.: US 12,186,752 B2
(45) Date of Patent: Jan. 7, 2025

(54) MICROFLUIDIC DEVICE INCLUDING AT LEAST ONE MICROFLUIDIC STRUCTURE AND ANALYSIS METHOD OF SAMPLE SUPPLIED THERETO

(71) Applicant: UNIVERSITY-INDUSTRY COOPERATION GROUP OF KYUNG HEE UNIVERSITY, Yongin-si (KR)

(72) Inventors: Tae Seok Seo, Suwon-si (KR); Van Hiep Nguyen, Suwon (KR); Minh Vu Phan, Suwon (KR)

( * ) Notice: Subject to any disclaimer, the term of this patent is extended or adjusted under 35 U.S.C. 154(b) by 27 days.

(21) Appl. No.: 17/359,505

(22) Filed: Jun. 26, 2021

(65) Prior Publication Data

US 2021/0339251 A1 Nov. 4, 2021

(30) Foreign Application Priority Data

Apr. 29, 2020 (KR) ........................ 10-2020-0052667
Apr. 29, 2020 (KR) ........................ 10-2020-0052668
Apr. 29, 2020 (KR) ........................ 10-2020-0052669

(51) Int. Cl.
*B01L 3/00* (2006.01)

(52) U.S. Cl.
CPC . *B01L 3/502761* (2013.01); *B01L 2300/0681* (2013.01); *B01L 2300/0883* (2013.01)

(58) Field of Classification Search
CPC ....... B01L 3/502761; B01L 2300/0681; B01L 2300/0883; B01L 13/02; B01L 2200/142;
(Continued)

(56) References Cited

U.S. PATENT DOCUMENTS

2011/0091356 A1* 4/2011 Kim .................... F16K 99/0032 422/68.1
2020/0206739 A1* 7/2020 Maaskant ............. B01L 3/5021

FOREIGN PATENT DOCUMENTS

KR 10-2021-0133711 A 11/2021
KR 10-2021-0133712 A 11/2021
KR 10-2021-0133713 A 11/2021

OTHER PUBLICATIONS

Curran, Patrick. "Precision Ground Ball Screw Options for Linear Motion Applications." Linear Motion Tips, Sep. 9, 2016, https://www.linearmotiontips.com/precision-ground-ball-screw-options-linear-motion-applications/ (Year: 2016).*

* cited by examiner

*Primary Examiner* — Jennifer Wecker
*Assistant Examiner* — Ali Husain Faraz

(57) ABSTRACT

Disclosed are a microfluidic device and a sample analysis apparatus using the microfluidic device. According to an exemplary embodiment, there is provided microfluidic device including: a rotating body; and at least one microfluidic structure disposed at a predetermined interval in the rotating body, wherein the microfluidic structure includes a pretreatment unit which shares a solution injected through a solution injected through a solution inlet with another adjacent microfluidic structure through a sharing channel and performs a pretreating process for a sample injected through a sample inlet and the solution; a storage unit which is located outside the pretreatment unit in a radial direction in the rotating body and separately stores the sample and solution pretreated by the pretreatment unit based on a rotational direction of the rotating body; and a detection unit which distributes a target material in the pretreated sample from the storage unit and performs the detection on the distributed target material.

17 Claims, 19 Drawing Sheets

(58) Field of Classification Search
CPC ....... B01L 3/502753; B01L 2300/0803; B01L 3/50273
See application file for complete search history.

MICROFLUIDIC DEVICE INCLUDING AT LEAST ONE MICROFLUIDIC STRUCTURE AND ANALYSIS METHOD OF SAMPLE SUPPLIED THERETO

CROSS-REFERENCE TO RELATED APPLICATIONS

This application claims the priority of Korean Patent Application Nos. 10-2020-0052667, 10-2020-0052668, and 10-2020-0052669, filed on Apr. 29, 2020, which are hereby incorporated by reference for all purposes as if fully set forth herein.

BACKGROUND

Field

The present disclosure relates to a microfluidic device including at least one microfluidic structure and a sample analysis apparatus using the microfluidic device. More specifically, the present disclosure relates to a microfluidic device for extracting and diagnosing a genome, a target antigen, or a target material in a sample and a sample analysis apparatus for performing a method for analyzing a sample supplied thereto.

Discussion of the Related Art

In order to diagnose viral diseases such as influenza virus, bird influenza virus, and coronavirus, techniques for analyzing proteins or genomes in samples have been developed, and particularly, there is a need to develop technology for rapidly and quickly diagnosing diseases of bacteria or viruses with large social effects in the field.

For rapid field diagnosis of these pathogens, microfluidic devices capable of performing biological or chemical reaction by operating a small amount of fluid have been used. The microfluidic device may include microfluidic structures having various shapes, such as a chip, a disk, and the like, which are disposed in the body. By using the microfluidic device, various pathogens are diagnosed directly in the field to rapidly block the pathogens, so that there is an effect of reducing life damage and economic loss.

However, general microfluidic devices have had a limit to simultaneously treat multiple samples on a single chip due to a spatial limitation, and during the field diagnosis, and have had a limit to require a lot of time to assemble and operate a cartridge for injecting the sample and the microfluidic devices.

Therefore, there is a need to develop a microfluidic device capable of effectively analyzing various samples and a sample analysis apparatus using the microfluidic device without a separate manual operation.

The above-described technical configuration is the background art for helping in the understanding of the present invention, and does not mean a conventional technology widely known in the art to which the present invention pertains.

SUMMARY

An object of the present invention is to provide a microfluidic device capable of moving samples based on the rotation of a rotating body.

Another object of the present invention is to provide a sample analysis apparatus using the microfluidic device.

According to an aspect of the present disclosure, there is provided a microfluidic device including: a rotating body; and at least one microfluidic structure disposed at a predetermined interval in the rotating body, wherein the microfluidic structure includes a pretreatment unit which shares a solution injected through a solution injected through a solution inlet with another adjacent microfluidic structure through a sharing channel and performs a pretreating process for a sample injected through a sample inlet and the solution; a storage unit which is located outside the pretreatment unit in a radial direction in the rotating body and separately stores the sample and solution pretreated by the pretreatment unit based on a rotational direction of the rotating body; and a detection unit which distributes a target material in the pretreated sample from the storage unit and performs the detection on the distributed target material.

According to one embodiment, the pretreatment unit may include a sample chamber receiving the sample injected through the sample inlet; a solution chamber receiving the solution injected through the solution inlet; and a capture filter capturing a target material from the injected sample.

According to one embodiment, the pretreatment unit may further include a first passive valve which provides the sample received the sample chamber to the capture filter based on a first rotational force generated by the rotating body; and a second passive valve which provides the solution received the solution chamber to the capture filter based on a second rotational force generated by the rotating body.

According to one embodiment, the sharing channel may be formed in a zigzag form in a circumferential direction in the rotary body, and the rotating body may stop or rotate so that the solution in the solution chamber is not moved to the capture filter until the solution is shared in each solution chamber in another microfluidic structure.

According to one embodiment, the storage unit may include a collection chamber which stores an elusion including the target material captured in the capture filter in the target material in the sample and the solution; and a first waste chamber which stores a cleaning solution for cleaning remaining materials except for the target material captured in the capture filter in the sample and the solution passing through the capture filter.

According to one embodiment, the storage unit may further include a delivery chamber which acquires an elusion containing the target material or a sample passing through the capture filter, and the cleaning solution from the capture filter, and selectively delivers the elusion including the target material to the collection chamber or deliver the sample passing through the capture filter and the cleaning solution to the first waste chamber, wherein reaction solutions for detecting the target material may be lyophilized in the collection chamber.

According to one embodiment, the detection unit may include a siphon channel of which one end is connected to the collection chamber; a distribution unit which is connected to the other end of the siphon channel and includes a plurality of distribution chambers so that the elusion including the target material is distributed by a predetermined amount from the collection chamber; and a reaction unit which acquires the elusion including the target material provided from the distribution chambers and includes reaction chamber in which primers and reaction solutions for detecting the target material are lyophilized.

According to one embodiment, the detection unit may further include a second waste chamber which stores an elusion remaining after being distributed to the distribution chambers in the elusion including the target material acquired from the siphon channel.

According to one embodiment, the detection unit may further include a wax storage which stores wax for generating oil to be injected into the distribution chamber at a predetermined temperature so as to prevent evaporation of the elusion after the elusion including the target material is distributed to the distribution chambers.

According to one embodiment, the rotating body may stop for a predetermined time so that a rotational force generated by the rotating body applied to at least a partial channel portion in the siphon channel is smaller than a capillary force generated by the at least the partial channel portion, so that the target material in the collection chamber starts to move to the siphon channel.

According to one embodiment, the rotating body may rotate so that the rotational force applied to the elusion containing the target material in the distribution chambers become greater than the air pressure stored in the reaction chambers.

According to another aspect of the present disclosure, there is provided a sample analysis apparatus including: the microfluidic device; a first driver which rotates the microfluidic device along the rotary shaft; a second driver which moves an injection mechanism for injecting the sample and the solution to the microfluidic device along a predetermined driving shaft; a supply unit which stores the samples and solutions to be provided to the injection mechanism and selectively provides the stored samples and solutions to the injection mechanism; and a controller which controls the first driver, the second driver, and the supply unit so that the samples and solutions in the microfluidic structure moves on a predetermined path.

According to one embodiment, the first driver may include a rotating member which is fastened to the microfluidic device and rotatably installed together with the microfluidic device along the rotary shaft of the microfluidic device; and a spindle motor which rotates the rotating member at predetermined rotational direction and rotational speed based on a first control signal acquired from the controller.

According to one embodiment, the second driver may include at least a guide shaft which is separated at a predetermined interval; a first driving member in which one end of the drive shaft is fastened to an injection mechanism; a second driving member which is connected to the other end of the drive shaft and transmits a driving force to the drive shaft so that the drive shaft rotates at a predetermined angle interval; and a step motor which rotates the second driving member by a predetermined angle.

According to one embodiment, the second driving member may include a through hole in which the at least one guide shaft penetrates; and ball screw member in contact with a surface formed in the through hole, wherein the second driving member moves along the at least one guide shaft in a state in which the ball screw member and threads formed on the at least one guide shaft are in contact with each other.

According to an embodiment, the sample analysis apparatus may further include heating units which cover at least a part of the first driver in a cylindrical shape in an outer direction of the first driver below the microfluidic device; and linear guides for aligning the positions of the heating units in the outer direction of the first driver.

According to an embodiment, the sample may include a target material to be analyzed, and the solution may include a cleaning solution for cleaning remaining materials except for the target material, an elusion for separating the target material, and a reaction solution for amplifying the target material in the sample.

According to an embodiment, the supply unit may include a storage unit in which the sample, the cleaning solution, and the elusion are separately stored; a supply channel which is connected to the storage unit, wherein the sample, the cleaning solution, the elusion, and the reaction solution are separately acquired from the storage unit; a port valve for selecting a channel to be connected to the injection mechanism among the supply channels by the control of the controller; and a cylinder pump for moving the sample, the cleaning solution, the elusions, and the reaction solutions to the injection mechanism in the storage unit.

According to an embodiment, the storage unit may include a cleaning solution storage unit storing the cleaning solution; an elusion storage unit for storing the elusion; and a reaction solution storage unit for storing the reaction solution, wherein the sample storage unit, the cleaning solution storage unit, and the elusion storage unit further comprise a connection hole in communication with the supply channel.

According to an embodiment, the sample analysis apparatus may further include a first housing formed so that the first driver, the second driver, and the controller are located therein; and a second housing which is connected to the first housing to be openable to selectively expose the microfluidic device.

According to another aspect of the present disclosure, there is provided a microfluidic device including: at least one microfluidic structure disposed at a predetermined interval in a rotating body; and a waste chamber which is formed further outside the at least one microfluidic structure in the rotating body in the radial direction and connected with at least one microfluidic structure, wherein the microfluidic structure includes a solution chamber which receives a solution injected through a solution inlet and shares the received solution with other adjacent microfluidic structures through the first sharing channel, a sample chamber which is located further outside the solution chamber in the rotating body in the radial direction and receives a sample injected through an air vent opened outside, and a siphon channel which has one end connected to the sample chamber and the other end connected to the waste chamber to deliver the sample and the solution to the waste chamber.

According to one embodiment, the microfluidic structure may further include a passive valve which has one end connected to the solution chamber and provides solutions received in the solution chamber based on the rotating force generated by the rotating body to the sample chamber.

According to one embodiment, the waste chamber may further include a super absorbent polymer which absorbs the sample and the solution in the waste chamber.

According to one embodiment, the first sharing channel may be formed in a zigzag form in a circumferential direction in the rotary body, and the rotating body may stop or rotate so that the solution in the solution chamber is not moved to the capture filter until the solution is shared in each solution chamber in another microfluidic structure.

According to one embodiment, the sample chamber may be provided to be connected to a second sharing channel for sharing the samples injected through the air vent with other adjacent microfluidic structures.

According to one embodiment, the rotating body may stop for a predetermined time so that a rotational force generated by the rotating body applied to at least a partial channel portion in the siphon channel is smaller than a capillary force generated by the at least the partial channel portion, so that the sample and the solution in the collection chamber starts to move to the siphon channel.

According to one embodiment, primary antibodies capable of binding to the target material in the sample are pre-coated on the surface of the sample chamber, and the solution chamber may acquire a solution containing secondary antibodies attached with a chromogenic enzyme for ELISA, a solution containing a chromogenic substrate, and a solution for cleaning a target material which does not bind to the primary antibodies among the target materials in the sample, through the solution inlet.

According to one embodiment, the at least one microfluidic structure is arranged in the rotating body in a circumferential direction around the rotary shaft of the rotary body, and the rotary body may be provided to rotate at a predetermined rotational number around at least one rotary shaft and move in the microfluidic structure based on the rotational force generated by rotating the rotating body.

According to another aspect of the present disclosure, there is provided a sample analysis apparatus including: the microfluidic device; a first driver which rotates the microfluidic device along the rotary shaft; a second driver which moves an injection mechanism for injecting the sample and the solution to the microfluidic device along a predetermined driving shaft; a supply unit which stores the samples and solutions to be provided to the injection mechanism and selectively provides the stored samples and solutions to the injection mechanism; and a controller which controls the first driver, the second driver, and the supply unit so that the samples and solutions in the microfluidic structure moves on a predetermined path.

According to one embodiment, the first driver may include a rotating member which is fastened to the microfluidic device and rotatably installed together with the microfluidic device along the rotary shaft of the microfluidic device; and a spindle motor which rotates the rotating member at predetermined rotational direction and rotational speed based on a first control signal acquired from the controller.

According to one embodiment, the second driver may include at least a guide shaft which is separated at a predetermined interval; a first driving member in which one end of the drive shaft is fastened to an injection mechanism; a second driving member which is connected to the other end of the drive shaft and transmits a driving force to the drive shaft so that the drive shaft rotates at a predetermined angle interval; and a step motor which rotates the second driving member by a predetermined angle.

According to one embodiment, the second driving member may include a through hole in which the at least one guide shaft penetrates; and ball screw member in contact with a surface formed in the through hole, wherein the second driving member moves along the at least one guide shaft in a state in which the ball screw member and threads formed on the at least one guide shaft are in contact with each other.

According to an embodiment, the sample analysis apparatus may further include heating units which cover at least a part of the first driver in a cylindrical shape in an outer direction of the first driver below the microfluidic device; and linear guides for aligning the positions of the heating units in the outer direction of the first driver.

According to an embodiment, the sample may include a target material to be analyzed, and the solution may include a cleaning solution for cleaning remaining materials except for the target material and a reaction solution for ELISA.

According to an embodiment, the supply unit may include a storage unit in which the sample, the cleaning solution, and the reaction solutions are separately stored; a supply channel which is connected to the storage unit, wherein the sample, the cleaning solution, and the reaction solutions are separately acquired from the storage unit; a port valve for selecting a channel to be connected to the injection mechanism among the supply channels by the control of the controller; and a cylinder pump for moving the sample, the cleaning solution, the elusions, and the reaction solutions to the injection mechanism in the storage unit.

According to an embodiment, the storage unit may include a sample storage unit for storing the sample; a cleaning solution storage unit storing the cleaning solution; and a reaction solution storage unit for storing the reaction solution, wherein the sample storage unit, the cleaning solution storage unit, and the reaction solution storage unit further comprise a connection hole in communication with the supply channel.

According to an embodiment, the sample analysis apparatus may further include a first housing formed so that the first driver, the second driver, and the controller are located therein; and a second housing which is connected to the first housing to be openable to selectively expose the microfluidic device.

According to an embodiment, the sample analysis apparatus may further include a camera which acquires images for the microfluidic device at a predetermined time intervals; and a network interface which transmits information on the images acquired from the camera to an external device connected to the sample analysis apparatus.

According to yet another aspect of the present disclosure, there is provided a microfluidic device including: a rotating body; and at least one microfluidic structure disposed at a predetermined interval in the rotating body, wherein the microfluidic structure includes a pretreatment unit which shares a solution injected through a solution injected through a solution inlet with another adjacent microfluidic structure through a sharing channel and performs a pretreating process for a sample injected through a sample inlet and the solution; and a distribution unit which is located outside the pretreatment unit in a radial direction in the rotating body and distributed with the target material in the sample pretreated through the pretreatment unit to perform detection for the distributed target material.

According to one embodiment, the pretreatment unit may include a sample chamber receiving the sample injected through the sample inlet; a solution chamber receiving the solution injected through the solution inlet; and a capture filter capturing a target material from the injected sample.

According to one embodiment, the pretreatment unit may further include a first passive valve which provides the sample received the sample chamber to the capture filter based on a first rotational force generated by the rotating body; and a second passive valve which provides the solution received the solution chamber to the capture filter based on a second rotational force generated by the rotating body.

According to one embodiment, the sharing channel may be formed in a zigzag form in a circumferential direction in the rotary body, and the rotating body may stop or rotate so that the solution in the solution chamber is not moved to the capture filter until the solution is shared in each solution chamber in another microfluidic structure.

According to one embodiment, the distribution unit may include a collection chamber which stores an elusion including the target material captured in the capture filter in the solution; and a waste chamber which stores the sample passing through the capture filter and a cleaning solution for cleaning remaining materials except for the target material captured in the capture filter among the solutions.

According to one embodiment, the distribution unit may further include a delivery chamber which acquires an elusion containing the target material or a sample passing through the capture filter, and the cleaning solution from the capture filter, and selectively delivers the elusion including the target material to the collection chamber or deliver the sample passing through the capture filter and the cleaning solution to the waste chamber.

According to one embodiment, in the channel in the first passive valve and the second passive valve, an area of the partial channel may be larger than the area passing through inlets of the first passive valve and the second passive valve, and the surface of the channel in the first passive valve and the second passive valve may be hydrophobically treated.

According to one embodiment, the capture filter may include a filter formed of a glass fiber of a predetermined thickness or a matrix including a plurality of silica-based beads and capture target materials in the sample by using the matrix.

According to one embodiment, the rotating body may rotate in predetermined rotational number and rotational direction based on at least one rotary shaft and the sample and the solution may move in the microfluidic structure based on a rotational force generated by rotating the rotating body and move in the microfluidic structure in different directions according to the rotational direction of the rotating body.

According to one embodiment, at least one microfluidic structure disposed at the predetermined interval may be arranged in the rotary body in a circumferential direction around the rotary shaft.

According to another aspect of the present disclosure, there is provided a sample analysis apparatus including: the microfluidic device; a first driver which rotates the microfluidic device along the rotary shaft; a second driver which moves an injection mechanism for injecting the sample and the solution to the microfluidic device along a predetermined driving shaft; a supply unit which stores the sample and the solutions to be provided to the injection mechanism and selectively provides the stored sample and solutions to the injection mechanism; and a controller which controls the first driver, the second driver, and the supply unit so that the sample and the solutions in the microfluidic structure moves on a predetermined path.

According to one embodiment, the first driver may include a rotating member which is fastened to the microfluidic device and rotatably installed together with the microfluidic device along the rotary shaft of the microfluidic device; and a spindle motor which rotates the rotating member at predetermined rotational direction and rotational speed based on a first control signal acquired from the controller.

According to one embodiment, the second driver may include at least a guide shaft which is separated at a predetermined interval; a first driving member in which one end of the drive shaft is fastened to an injection mechanism; a second driving member which is connected to the other end of the drive shaft and transmits a driving force to the drive shaft so that the drive shaft rotates at a predetermined angle interval; and a step motor which rotates the second driving member by a predetermined angle.

According to one embodiment, the second driving member may include a through hole in which the at least one guide shaft penetrates; and ball screw member in contact with a surface formed in the through hole, wherein the second driving member moves along the at least one guide shaft in a state in which the ball screw member and threads formed on the at least one guide shaft are in contact with each other.

According to an embodiment, the sample analysis apparatus may further include heating units which cover at least a part of the first driver in a cylindrical shape in an outer direction of the first driver below the microfluidic device; and linear guides for aligning the positions of the heating units in the outer direction of the first driver.

According to an embodiment, the sample may include a target material to be analyzed, and the solution may include a cleaning solution for cleaning remaining materials except for the target material and an elusion for separating the target material.

According to an embodiment, the supply unit may include a storage unit in which the sample, the cleaning solution, and the elusions are separately stored; a supply channel which is connected to the storage unit, wherein the sample, the cleaning solution, and the elusions are separately acquired from the storage unit; a port valve for selecting a channel to be connected to the injection mechanism among the supply channels by the control of the controller; and a cylinder pump for moving the sample, the cleaning solution, and the elusions to the injection mechanism in the storage unit.

According to an embodiment, the storage unit may include a sample storage unit for storing the sample; a cleaning solution storage unit storing the cleaning solution; and an elusion storage unit for storing the elusion, wherein the sample storage unit, the cleaning solution storage unit, and the elusion storage unit further comprise a connection hole in communication with the supply channel.

According to an embodiment, the sample analysis apparatus may further include a first housing formed so that the first driver, the second driver, and the controller are located therein; and a second housing which is connected to the first housing to be openable to selectively expose the microfluidic device.

According to an embodiment, the sample analysis apparatus may further include a camera which acquires images for the microfluidic device at a predetermined time intervals; and a network interface which transmits information on the images acquired from the camera to an external device connected to the sample analysis apparatus.

According to an embodiment of the present disclosure, various types of target materials can be effectively analyzed in one microfluidic device.

According to an embodiment of the present disclosure, in the field diagnosis, the target materials in large quantities of samples can be quickly and accurately diagnosed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF EXEMPLARY EMBODIMENTS

Figure 1A:
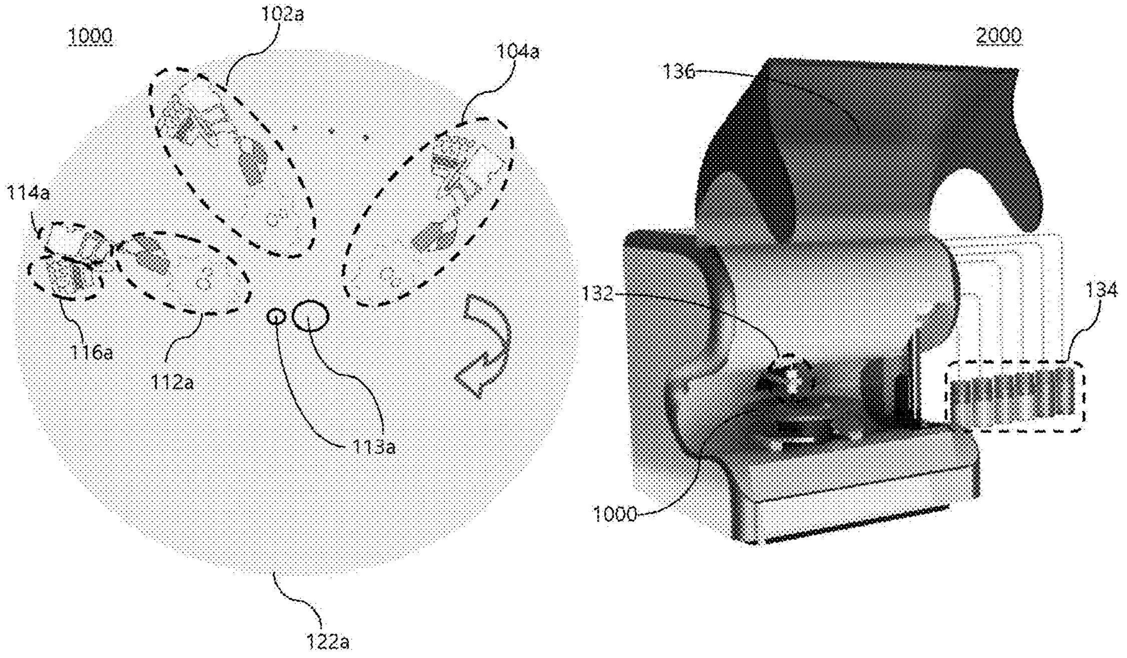
FIG. 1A is a diagram for schematically describing a process of analyzing samples by a microfluidic device and a sample analysis apparatus using the microfluidic device according to an embodiment.

Terms used in the present specification will be described in brief and the present disclosure will be described in detail. Terms used in the present disclosure adopt general terms which are currently widely used as possible by considering functions in the present disclosure, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, a term used in the present disclosure should be defined based on not just a name of the term but a meaning of the term and contents throughout the present disclosure.

Further, throughout the specification, unless explicitly described to the contrary, the word "comprise" and variations such as "comprises" or "comprising", will be understood to imply the inclusion of stated elements but not the exclusion of any other elements. In addition, terms including "part", "module", and the like disclosed in the specification mean a unit that processes at least one function or operation and this may be implemented by hardware or software or a combination of hardware and software.

An embodiment of the present disclosure will be described more fully hereinafter with reference to the accompanying drawings so as to be easily implemented by those skilled in the art. However, the present disclosure can be realized in various different forms, and is not limited to the embodiments described herein. Accordingly, the drawings and description are to be regarded as illustrative in nature and not restrictive. Like reference numerals designate like elements throughout the specification.

FIG. 1A is a diagram for schematically describing a process of analyzing samples by a microfluidic device and a sample analysis apparatus using the microfluidic device according to an embodiment.

According to an embodiment, a microfluidic device 1000 may include a rotating body 122*a* to be rotatable, a chamber in which samples and solutions may be received in the rotating body, and microfluidic structures 102*a* and 104*a* provided with a plurality of channels through which the sample and the solutions may move. For example, the microfluidic device 1000 may include a plurality of microfluidic structures 102*a* and 104*a* which are disposed at predetermined intervals in the rotating body 122*a*. The microfluidic structures may be disposed in the rotating body 122*a* in a circumferential direction based on at least one rotary shaft 113*a* and move the sample and the solutions in the microfluidic structures based on a rotating force generated by rotation of the rotating body and a rotational direction of the rotating body.

According to an embodiment, the microfluidic structures 102*a* and 104*a* may include a pretreatment unit 112*a* which shares a solution injected through a solution injected through a solution inlet with another adjacent microfluidic structure through a sharing channel and performs a pretreating process for a sample injected through a sample inlet and the solution; a storage unit 114*a* which is located outside the pretreatment unit in a radial direction in the rotating body 122*a* and separately stores the sample and solution pretreated by the pretreatment unit based on a rotational direction of the rotating body; and a detection unit 116*a* which distributes a target material in the pretreated sample from the storage unit and performs the detection on the distributed target material.

A structure of the microfluidic structure will be described in more detail with reference to FIGS. 1B to 1C to be described below.

The microfluidic device 100 includes at least one microfluidic structure and may move a sample and a solution in the microfluidic structure while rotating along a predetermined rotary shaft 113*a*. The microfluidic device 1000 according to the present disclosure may be fastened to a sample analysis apparatus 2000 and may be used in an automated sample analysis process by the control of the sample analysis apparatus 2000.

According to an embodiment, the sample analysis apparatus 2000 may extract samples and solutions from the storage unit 134 in which the sample and the solutions are stored in advance. The sample analysis apparatus 2000 controls the inlet 132 for providing the sample and the solutions to the microfluidic device 1000 to inject the sample and the solutions extracted from the storage unit 134 to the microfluidic device 1000. The sample analysis apparatus 2000 rotates the microfluidic device 1000 injected with the sample or solution according to predetermined rotational number and rotation direction, so that the sample or solution moves in the microfluidic device. That is, the sample analysis apparatus 2000 may detect target materials included in various types of samples by moving the samples in the microfluidic device 1000 including at least one microfluidic structure. According to an embodiment, the target materials may be genomes including genetic information. In addition, unlike a general sample analysis apparatus in the related art, the sample analysis apparatus 2000 automatically supplies the prestored samples and solutions to the microfluidic device to rapidly and accurately analyze the samples injected to the microfluidic device.

Further, according to an embodiment of the present disclosure, a microfluidic device and the sample analysis apparatus for controlling the microfluidic device may move a sample, an elusion for separating a target material in the sample, and a cleaning solution for cleaning the remaining materials except for the target material captured in a capture filter from the microfluidic device. Further, according to one embodiment, a reaction solution for inducing amplification reaction of the target material in the sample may be freeze-dried in a collection chamber or a reaction chamber in the microfluidic device. According to one embodiment, the reaction solution may include a reaction solution for a loop-mediated isothermal amplification (LAMP) method or polymerase chain reaction (PCR) amplification of the target material.

Figure 1B:
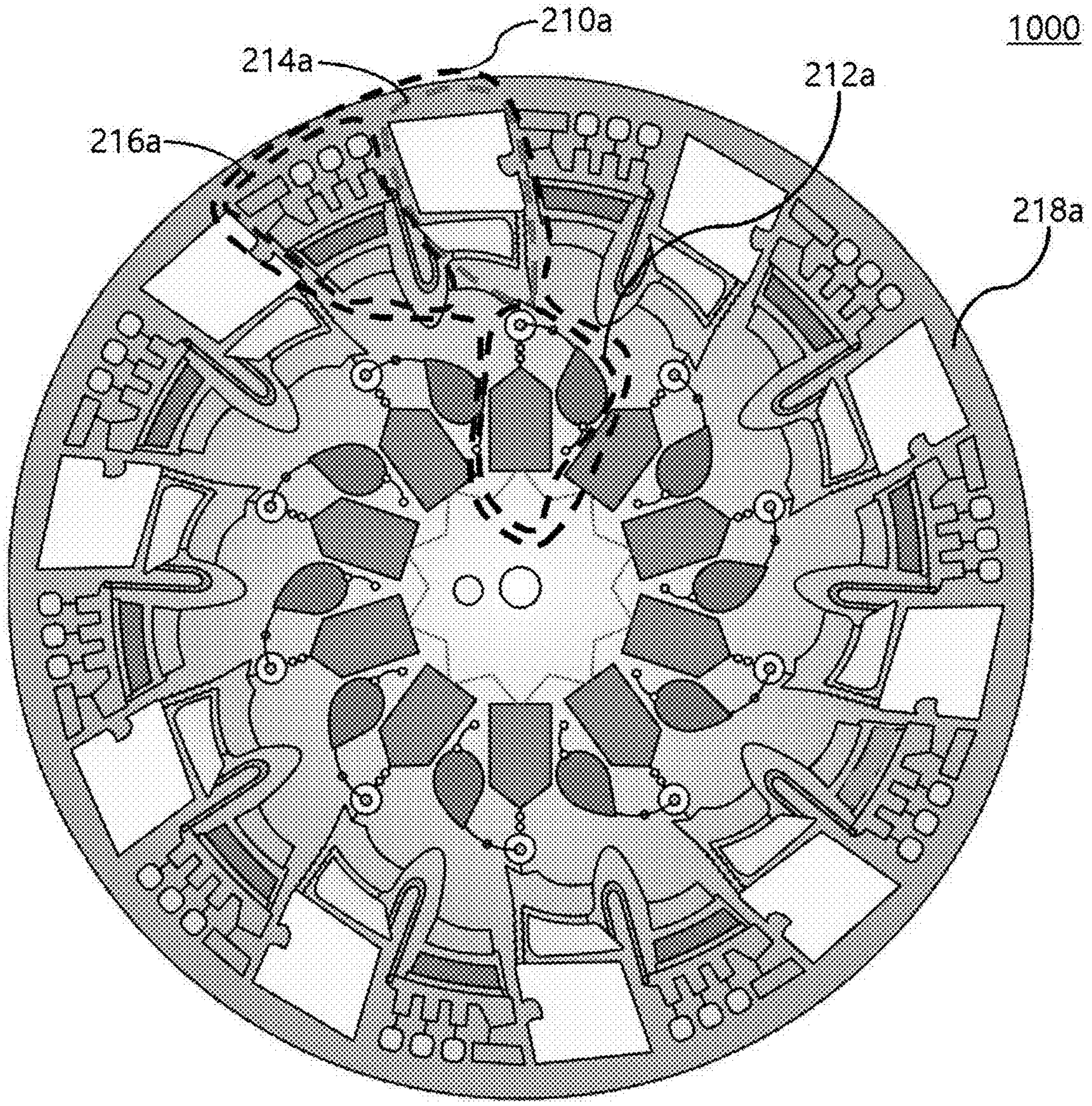
FIG. 1B is a diagram for describing a structure of a microfluidic device in which a plurality of microfluidic structures are disposed according to an embodiment.

FIG. 1B is a diagram for describing a structure of a microfluidic device in which a plurality of fine flow structures are disposed according to an embodiment.

According to one embodiment, the microfluidic device 1000 may include a plurality of microfluidic structures arranged in a circumferential direction based on a rotary shaft. According to one embodiment, the microfluidic structures 210*a* may be arranged at predetermined intervals in a rotating body 218*a*.

According to one embodiment, the microfluidic structures may share samples or solutions stored in a chamber in the adjacent microfluidic structure through at least one sharing channel. For example, the microfluidic structure 210*a* may share samples or solutions stored in the chamber in microfluidic structures adjacent to both sides of the microfluidic structure 210*a*. The microfluidic structures adjacent to the microfluidic structure 210*a* may be connected with other microfluidic structures in the same manner. According to one embodiment, all microfluidic structures in the rotating body 218*a* may be connected to each other through at least one sharing channel.

The microfluidic structure 210*a* may include a pretreatment unit 212*a*, a storage unit 214*a* located outside the pretreatment unit in a radial direction in the rotating body 218*a*, and a detection unit 216*a* located outside the pretreatment unit in a radial direction in the rotating body 218*a*. The microfluidic structure 210*a* may distribute the samples or solutions injected through an inlet, and detect a target material in the distributed sample or store materials and solutions excluding the target material in the sample.

According to one embodiment, the microfluidic structure may include 10 microfluidic structures 210*a*. However, it is not limited thereto, and the number of the microfluidic structures may vary depending on a type of sample and solution to be analyzed, an analysis method, a size of the rotating body, and a size of the microfluidic structure.

Figure 1C:
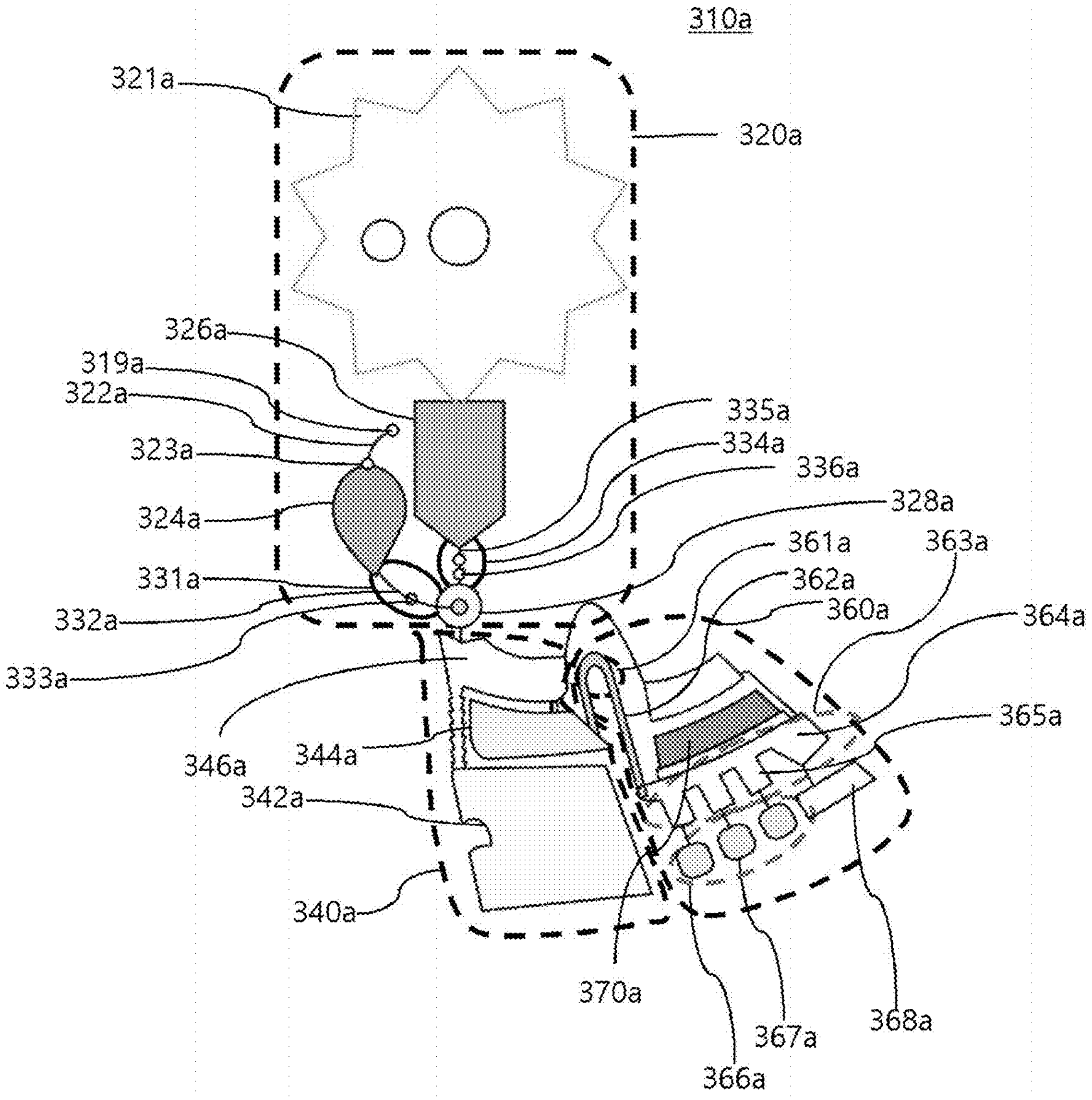
FIG. 1C is a diagram for describing a structure of the microfluidic structure according to an embodiment.

FIG. 1C is a diagram for describing a structure of a microfluidic structure according to an embodiment.

According to one embodiment of the present disclosure, a microfluidic structure 310*a* may include a pretreatment unit 320*a*, a storage unit 340*a* which is located outside the pretreatment unit in a radial direction in a rotating body and separately stores the sample and solution pretreated by the pretreatment unit based on a rotational direction of the rotating body, and a detection unit 360*a* which distributes a target material in the pretreated sample from the storage unit and performs the detection on the distributed target material. The microfluidic structure 310*a* may move to the storage unit, the sample injected through the sample inlet and the solution injected through the solution inlet and move to the detection unit, a part of the sample and solution moved to the storage unit.

According to one embodiment, the pretreatment unit 320*a* may include a sample chamber 324*a* receiving the sample injected through the sample inlet, a solution chamber 326*a* receiving the solution injected through the solution inlet, and a capture filter 328*a* capturing a target material from the injected sample. According to another embodiment, the pretreatment unit 320*a* may further include a first passive valve 331*a* connecting the sample chamber 324*a* and the capture filter 328*a* and a second passive valve 334*a* connecting the solution chamber 326*a* and the capture filter 328*a*.

According to one embodiment, the pretreatment unit 320*a* may receive the sample and the solution and share at least one of the received sample or solution with other adjacent microfluidic structures through a sharing channel. As illustrated in FIG. 1C, the sharing channel 321*a* may also be formed in a part of the solution chamber 326*a*, but may also be connected to one end of the solution inlet when the solution inlet is formed in the solution chamber 326*a*. According to another embodiment, the sharing channel and another sharing channel connected to the solution chamber may also be formed at one end of the sample chamber 324*a* or one end of the sample inlet. According to one embodiment, the sharing channel may be formed only in the solution chamber, or may also be formed on at least one of the solution chamber or sample chamber.

The sample and the solutions received in the pretreatment unit 320*a* of the microfluidic structure 310*a* may be provided so as not to be moved to the capture filter until the sample and the solutions are shared in the sample chamber and the solution chamber in another microfluidic structure, respectively, due to a passive valve connected to one end of the sample chamber 324*a* or the solution chamber 326*a*.

The sample chamber 324*a* may receive the sample injected through the first sample inlet 323*a*. According to one embodiment, the first sample inlet 323*a* formed at one end of the sample chamber may be connected to a second sample inlet 319*a* through an inlet channel 322*a*, and the sample chamber 324*a* may also acquire a sample injected through the second sample inlet. According to one embodiment, when the sharing channel is formed in the sample chamber 324*a*, the sharing channel formed in the sample chamber may also be connected to at least one of the first sample inlet 323*a*, the inlet channel 322*a* or the second sample inlet 319*a*.

According to one embodiment, when the solution chamber 326*a* acquires a solution through a solution inlet, the solution inlet may not be exposed on the surface of the rotating body in which the microfluidic structure 310*a* is formed. For example, the solution inlet to which the solution chamber 326*a* is connected may be connected to the solution chamber at a predetermined depth from the surface of the rotating body. The solution inlet may be formed at one end of the solution chamber, or may be formed in at least a part of the sharing channel connected to the solution chamber. As described above, the sharing channel 321*a* may be connected to one side of the solution chamber 326*a*.

The solution chamber 326*a* may be connected to the capture filter 328*a* through the second passive valve. The samples received in the solution chamber 326*a* may be provided so as not to be moved to the capture filter until all solutions in other microfluidic structures are filled due to the second passive valve.

According to one embodiment, the sharing channel 321*a* connected to at least one of the sample chamber 324*a* or the solution chamber 326*a* may be formed in a zigzag form, but is not limited thereto, and may be formed in other forms so that the sample and the solution may be shared in the sample chamber and the solution chamber in another microfluidic structure, respectively.

The first passive valve 331*a* may include a first channel 332*a* formed in the same area as an area passing through a first passive valve inlet and at least one second channel 333*a* formed between the first channels in a larger area than the area passing through the first passive valve inlet. According to one embodiment, the surface in the first passive valve 331*a* may be hydrophobically treated.

More specifically, the first passive valve 331*a* may be limited so that radii of interfaces of a fluid passing through the first channel 332*a* and the second channel 333*a* may be different from each other due to a difference between the first channel 332*a* and the second channel 333*a* in the passive valve, and the samples in the sample chamber are not moved to the capture filter through a capillary force caused by the difference between the radii of the two interfaces. Further, the first passive valve 331*a* may also ensure a larger resistance so that the sample in the sample chamber is not moved to the capture filter because at least a partial area in the first passive valve is hydrophobically treated as well as an area difference between the first and second channels in the first passive valve.

The feature provided larger than an area in which at least a partial channel in the first passive valve 331*a* passes through the inlet of the first passive valve and the resistance generated by a hydrophobic material treated on an internal surface may be set so that the samples in the sample chamber 324*a* is moved to the capture filter 328*a* according to a first rotational force generated by the rotation of the rotating body.

The second passive valve 334*a* may include a third channel 335*a* formed in the same area as an area passing through a second passive valve inlet and at least one fourth channel 336*a* formed between the third channels in a larger area than the area passing through the second passive valve inlet. According to one embodiment, the surface in the second passive valve 334*a* may be hydrophobically treated.

More specifically, the second passive valve 334*a* may be limited so that radii of interfaces of a fluid passing through the third channel and the fourth channel may be different from each other due to a difference in area between the third channel 335*a* and the fourth channel 336*a* in the passive valve, and the solutions received in the solution chamber are not moved to the capture filter through a capillary force caused by the difference between the radii of the two interfaces. Further, the second passive valve 334*a* may also ensure a larger resistance so that the solution in the solution chamber is not moved to the capture filter because at least a partial area in the second passive valve is hydrophobically treated as well as an area difference between the third channel 335*a* and the fourth channel 336*a* in the second passive valve.

The feature provided larger than an area in which at least a partial channel in the second passive valve 334*a* passes through the inlet of the second passive valve and the resistance generated by a hydrophobic material treated on an internal surface may be set so that the solutions in the solution chamber 326*a* are moved to the capture filter 328*a* according to a second rotational force generated by the rotation of the rotating body.

The capture filter 328*a* may capture the target material from the injected sample. For example, the capture filter 328*a* may be formed of a glass filter at a predetermined thickness. According to one embodiment, the capture filter 328*a* may be a silica-based matrix including a glass fiber filter or a plurality of silica beads at a predetermined thickness. The capture filter 328*a* may capture target materials in the sample using a silica-based matrix.

The storage unit 340*a* may include a collection chamber 344*a* and a first waste chamber 342*a*. According to another embodiment, the collection chamber 344*a* may further include a delivery chamber 346*a*. For example, the storage unit 340*a* is located outside the pretreatment unit 320*a* in the rotating body in a radial direction, and may separately store the sample and the solution pretreated by the pretreatment unit in the radial direction of the rotary body.

For example, the storage unit 340*a* may selectively store the sample and the solutions in the collection chamber 344*a* or the first waste chamber 342*a* based on the rotational force and the rotational direction of the rotating body in which the microfluidic structure 310*a* is included.

The collection chamber 344*a* may store an elusion including a target material captured in the capture filter. For example, the collection chamber 344*a* may acquire an elusion including the target material captured in the capture filter based on a first rotational direction (e.g., clockwise rotation based on a rotary shaft of the rotating body illustrated in FIG. 1A) of the rotating body in which the microfluidic structure 310*a* is included. More specifically, elusions including the target material captured in the capture filter may be stored in the collection chamber 344*a* by moving unilaterally in a right direction of the delivery chamber 346*a* illustrated in FIG. 1C by rotating the rotating body in a first rotational direction. According to yet another embodiment, the collection chamber 344*a* may further include a well in which reaction solutions for amplification reaction of the target material are pre-lyophilized through the solution chamber in addition to the elusion including the target material. According to one embodiment, the reaction solutions may include a LAMP cocktail solution for reacting with the target material in the sample or a reaction solution for PCR amplification.

According to one embodiment, one end of the collection chamber 344*a* may be connected to the delivery chamber 346*a*, and the other end of the collection chamber 344*a* may be connected to a siphon channel 362*a*. The elusion including the target material in the collection chamber 344*a* may be filled with some channel portions of the siphon channel 362*a*. More specifically, the elusion including the target material stored in the collection chamber 344*a* may be filled with some channel portion 361*a* in the siphon channel located at a portion corresponding to a height in which the solution is filled in the collection chamber 344*a*. The elusions including the target material filled with a partial channel portion 361*a* in the siphon channel may be moved to a distribution chamber 364*a* based on the capillary force acting on the partial channel portion 361*a* as the rotating body stops for a predetermined time.

Further, according to one embodiment, when predetermined solutions are injected into the collection chamber 344*a* and the injected predetermined solutions are filled up to at least a partial channel portion 361*a* in the siphon channel, the rotary body in which the microfluidic structure 310*a* is installed stops for a predetermined time, and then perform an operation of shaking a collection chamber while rotating alternately in a first direction or second direction. Through the process of shaking the collection chamber 344*a* according to the present disclosure, the reaction (e.g., PCR or LAMP amplification reaction) between the elusion including the target material stored in the collection chamber 344*a* and the predetermined reaction solutions pre-lyophilized in the collection chamber may be induced.

Once the elusion including the target material stored in the collection chamber 344*a* starts to move to the distribution chamber 364*a*, the rotating body may rotate again at high speed. The operation of the rotating body will be described in more detail with reference to FIG. 1D in connection with the siphon channel.

The first waste chamber 342*a* may be located adjacent to the collection chamber 344*a*, and may receive the cleaning solution for cleaning the remaining materials except for the target material that is captured in the capture filter in the sample and the solution passing through the capture filter 328*a*. For example, the first waste chamber 342*a* may receive remaining materials on the capture filter which are not captured in the capture filter and the cleaning solution of the solutions received in the solution chamber, based on the second rotational direction of the rotating body to which the microfluidic structure 310*a* is fastened. More specifically, as the rotating body rotates in the second rotational direction, the remaining materials which are not captured in the capture filter among the samples and some of the solutions received in the solution chamber may be stored in the first waste chamber 342*a* by moving unilaterally in a left direction of the delivery chamber 346*a* illustrated in FIG. 1C.

In the delivery chamber 346*a*, an upper end of the delivery chamber is connected to the capture filter 328*a*, a lower end thereof is connected to the collection chamber 344*a*, and the other lower end may be connected to the waste chamber 342*a*. The delivery chamber 346*a* may connect the capture filter 328*a* with the collection chamber 344*a* and the first waste chamber 342*a*, respectively, and may deliver selectively some of the samples or solutions received in the delivery chamber to the collection chamber 344*a* or the first waste chamber 342*a* in the rotational direction of the rotating body.

According to one embodiment, the delivery chamber 346*a* acquires the elusion including the target material or the sample passing through the capture filter and the cleaning solution from the capture filter and may selectively deliver the elusion including the target material to the collection chamber 344*a* or deliver the sample passing through the capture filter and the cleaning solution to the first waste chamber 342*a*.

The detection unit 360*a* may include a siphon channel 362 of which one end is connected to the collection chamber 344*a*, a distribution unit 363*a* which is connected to the other end of the siphon channel 362*a* and includes a plurality of distribution chambers 364*a* and 365*a* so that the elusion including the target material is distributed by a predetermined amount from the collection chamber 344*a*, and a reaction unit 366*a* which acquires the elusion including the target material provided from the distribution chambers and includes reaction chambers 367*a* provided with a primer and a reaction solution for detecting the target material.

According to another embodiment, the detection unit 360*a* may further include a second waste chamber 368*a* in addition to the siphon channel 362*a*, the distribution unit 363*a*, and the reaction unit 366*a*. According to yet another embodiment, the detection unit 360*a* may further include a wax storage unit 370*a* in addition to the siphon channel 362*a*, the distribution unit 363*a*, the reaction unit 366*a*, and the second waste chamber 368*a*.

The detection unit 360*a* may acquire an elusion including the target material from the collection chamber 344*a* of the storage unit 340*a* through the siphon channel 362*a*, distribute the acquired elusion including the target material to the distribution chambers by a predetermined amount, and inject the elusion including the target material distributed to the distribution chambers to the reaction chamber 367*a* based on the rotational force of the rotating body to induce a biological or chemical reaction for the target material.

The siphon channel 362*a* may move the elusion including the target material in the collection chamber or a cocktail mixture to the distribution chambers 365*a* of the distribution unit 363*a*, based on the capillary force provided by the siphon channel and the rotational force generated by the rotating body in which the microfluidic structure 310*a* is located. For example, the solutions stored in the collection chamber 344*a* may be filled to at least a partial channel portion 361*a* in the siphon channel, as described above. The solutions filled to at least a partial channel portion 361*a* in the siphon channel may move to the distribution chamber 364*a* based on the capillary force of the siphon channel acting in the distribution chamber 364*a* direction on the partial channel portion 361*a* as the rotating body stops for a predetermined time. Once the solutions stored in the collection chamber 344*a* start to move to the distribution chambers 364*a* and 365*a*, the number of revolutions of the rotating body may be increased again.

The distribution unit 363*a* distributes the elusions including the target material acquired from the collection chamber 344*a* through the siphon channel 362*a* to the distribution chambers capable of receiving a predetermined volume of solutions. According to one embodiment, as the rotating body stops for a predetermined time, when the solutions filled to at least the partial channel portion 361*a* in the siphon channel 362*a* start to move to the distributions 364*a* and 365*a*, the rotating body may rotate in a first direction at high speed and may sequentially distribute the elusions including the target material through the siphon channel to distribution chambers adjacent to the siphon channel.

According to one embodiment, the distribution unit 363*a* may further include a waste liquid chamber 364*a* for storing the remaining solutions after being distributed in the distribution chamber 365*a*. More specifically, based on the rotation of the rotating body rotating in a first rotation direction, the elusion including the target material passing through the siphon channel starts from the distribution chamber adjacent to the siphon channel to the waste liquid chamber 364*a* in sequence.

When the elusion including the target material is distributed in the distribution chambers 365*a*, oil generated from the wax storage unit 370*a* may be injected to the upper ends of the distribution chambers to prevent evaporation of the elusion or mixture. According to one embodiment, after the elusion including the target material is distributed in the distribution chambers, heat over a predetermined temperature may be provided to the wax storage unit 370*a* and waxes of the wax storage unit 370*a* are liquefied by the provided heat so that the generated oils may be injected to the distribution chambers 364*a* and 365*a*. Since the elusion including the target material is filled in the current distribution chambers, the oils injected into the distribution chambers may cover the upper part of the elusion filled in advance in the distribution chambers.

The sample analysis apparatus 2000 according to the present disclosure uses the wax storage unit 370*a* so that a immobilized amount of elusion including the target material is injected into the reaction chamber 367*a*, thereby inducing the accurate biological or chemical amplification reaction for the target material.

The reaction unit 366*a* is located outside the distribution chambers 364*a* and 365*a* in the radial direction on the rotating body to acquire the elusion including the target material or the mixed solution from the distribution chambers. According to one embodiment, the reaction unit 366*a* may include at least one reaction chamber, and in the reaction chamber 367*a*, primers and reaction solutions (e.g., reaction solutions required for PCR or LAMP amplification) for detecting the target material may be pre-lyophilized. More specifically, in the reaction chamber 367*a*, the primers for detecting the target material may be located on the surface of the reaction chamber in a lyophilized (e.g., freezing dry) state. In addition, as mixtures for amplification reaction, reaction solutions including an LAMP cocktail mixture or reaction solutions for PCR amplification may be lyophilized on the surface in the reaction chamber. The reaction unit 366*a* may induce the amplification reaction for the target material by reacting the elusions including the target material stored in the distribution chambers with the pre-lyophilized primers and reaction solutions in the reaction chamber.

The second waste chamber 368*a* may acquire an elusion including a target material and the like from the waste liquid chamber 364*a*, which stores the elusion including the target material and the like remaining after distributed to the distribution chambers. According to another embodiment, the second waist chamber 368*a* may acquire the elusions remaining after distributed to the distribution chambers when the elusion including the target material moves from the collection chamber.

As described above, the microfluidic structure 310*a* may induce the amplification reaction for the target material so as to move the sample including the target material and the elusion for separating the target material in the sample in the microfluidic structure 310*a*. In the reaction chamber or the collection chamber in the microfluidic structure 310*a* according to an embodiment, the reaction solutions for LAMP amplification or PCR amplification for the target material may be pre-lyophilized. In this case, the microfluidic structure may be used for LAMP amplification, PCR amplification, or the like for inducing the amplification reaction for the target material, but is not limited thereto. That is, the sample analysis apparatus 2000 may effectively perform extraction and amplification reaction of various types of samples by using the microfluidic device 1000 in which the microfluidic structures 310*a* are disposed at predetermined intervals.

Figure 1D:
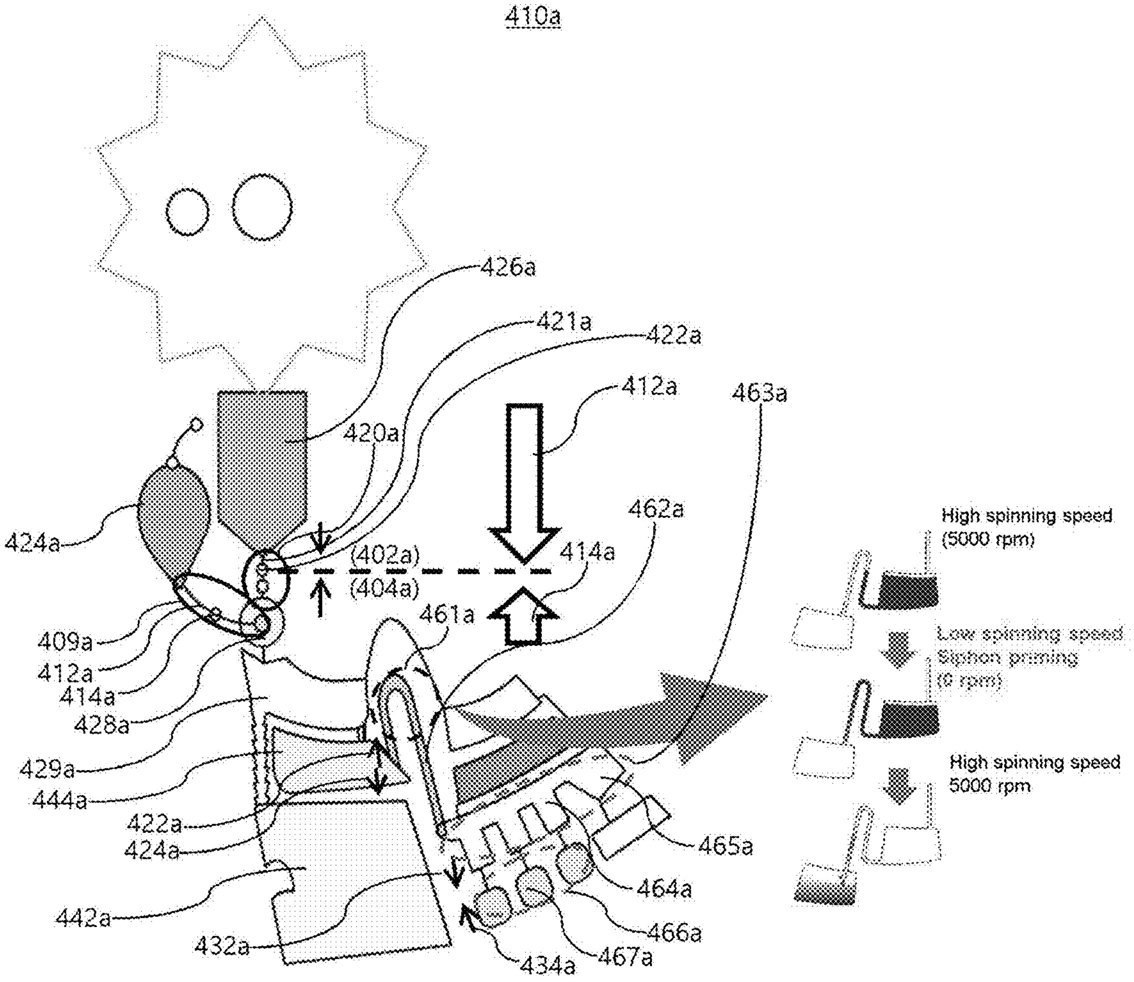
FIG. 1D is a diagram for describing movement of a fluid in a microfluidic structure according to an embodiment.

FIG. 1D is a diagram for describing movement of a fluid in a microfluidic structure according to an embodiment.

A microfluidic structure 410*a* may include a first passive valve 409*a* connecting a sample chamber 424*a* and a capture filter 428*a* and a second passive valve 420*a* connecting a solution chamber 426*a* and the capture filter 428*a*. For example, the first passive valve 409*a* may include a first channel 412*a* formed in the same area as an area passing through a first passive valve inlet and a second channel 414*a* formed between the first channels 412*a* in a larger area than the area passing through the first passive valve inlet.

Further, the second passive valve 420*a* may include a third channel 421*a* formed in the same area as an area passing through a second passive valve inlet and at least one fourth channel 422*a* formed between the third channels at predetermined intervals in a larger area than the area passing through the second passive valve inlet. An operation of the second passive valve will be described based on the fourth channel in the second passive valve 420*a* formed most adjacent to the solution chamber 426*a* illustrated in FIG. 1D.

Although not illustrated in FIG. 1D, as illustrated in FIG. 1B, the solution chamber 426*a* in the microfluidic structure 410*a* may be located close to the rotary shaft of the rotating body in which the microfluidic structure 410*a* is mounted. Therefore, when the rotating body rotates around the rotary shaft, the rotational force generated by rotation may occur in a second passive valve direction in the solution chamber.

On the other hand, since an inlet area of the second passive valve 420*a* is smaller than the area of the solution chamber 426*a*, the solutions in the solution chamber 426*a* may move to the inlet of the second passive valve 420*a* due to a difference in capillary pressure. The solution moved to the inlet of the second passive valve 420*a* may pass through a part of the third channel 421*a* formed in the same area as the passage area of the inlet of the second passive valve 420*a* and then reach the inlet of the fourth channel 422*a* formed in a larger area than the third channel. At this time, since the fourth channel is formed in a larger area than the third channel, there is a difference between a capillary force 402*a* corresponding to the interface of the solution formed in the direction of the third channel and a capillary force 404*a* corresponding to the interface of the solution formed in the direction of the fourth channel.

Since the fourth channel 422*a* has an interface having a larger radius than the third channel 421*a*, the capillary force 404*a* corresponding to the interface of the fourth channel may be larger than the capillary force 402*a* corresponding to the interface of the third channel. Therefore, a net capillary force generated when a part of the channel in the second passive valve is formed to be wider than the area passing through the inlet of the second passive valve may form a resistance so that the solutions in the solution chamber 426*a* are not moved to the capture filter 428*a*.

Thus, the solutions stored in the solution chamber 426*a* may be moved to the capture filter 428*a* based on the rotational force generated by the rotation of the rotating body and the resistance provided by the second passive valve 420*a*. According to one embodiment, the second passive valve 420*a* may move the solutions injected from the solution chamber 426*a* to the capture filter 428*a* based on a second rotational force generated by the rotating body. According to one embodiment, the second rotational force may be provided to be equal to or smaller than the resistance provided by the second passive valve.

Similarly to the operation of the second passive valve, the first passive valve 409*a* may also limit the samples stored in the sample chamber 424*a* to be moved to the capture filter 428*a* by using a difference in capillary pressure caused by a difference in area between the first channel and the second channel in the first passive valve. According to one embodiment, the first passive valve 409*a* may move the samples injected from the solution chamber 424*a* to the capture filter 428*a* based on a first rotational force generated by the rotating body. Further, as described above, at least a part of the surface in the first passive valve and the second passive valve may be hydrophobically treated, thereby providing additional resistance to the samples or solutions.

The sample and the solutions provided from the sample chamber 424*a* and the solution chamber 426*a* may be stored in the collection chamber 444*a* and the first waste chamber 442*a* through the delivery chamber 429*a*. As described above, the collection chamber 444*c* may store the elusions including the target material captured in the capture filter based on the first rotational direction of the rotating body in which the microfluidic structure 410*a* is located. According to another embodiment, in the collection chamber 424*a*, the reaction solutions (for example, LAMP cocktail mixtures) for amplification reaction of the target material may be lyophilized.

The siphon channel 462*a* connected to one end of the collection chamber 444*a* may relatively move the solutions or mixtures stored in the collection chamber 444*a* located in an inner direction in the radial direction on the rotating body to the distribution chambers 464*a* and 465*a* located in a further outer direction in the radial direction in the distribution unit 463*a*. The siphon channel 462*a* may move the solutions based on the capillary force provided by the siphon channel and the rotational force generated by the rotating body in which the microfluidic structure 410*a* is located.

According to one embodiment, when the elusions including the target material are injected into the collection chamber 444*a*, the elusions injected into the collection chamber 444*a* may move to at least a partial channel portion 461*a* in the siphon channel. According to an embodiment, the elusions including the target material may be filled up to the partial channel portion 461*a* in the siphon channel 462*a* located in the portion corresponding to a height at which the solution is filled in the collection chamber 444*a*.

The solutions filled up to the partial channel portion 461*a* in the siphon channel may start to move to the distribution chambers 464*a* and 465*a* through an outlet in the siphon channel as the rotating body stops for a predetermined time. For example, when the rotating body stops for the predetermined time, the capillary force of the siphon channel acting to the partial channel portion 461*a* in the siphon channel is larger than the rotational force of the rotating body acting to the solution located at the partial channel portion 461*a* and the solutions in the siphon channel 461*a* may start to move to the distribution chambers. Once the solutions in the siphon channel 461*a* start to move to the distribution chambers, the rotating body may rotate according to a fifth rotation number (5000 rpm).

The elusions including the target material distributed in at least one distribution chamber 464*a* and 465*a* in the distribution unit 463*a* may move to the reaction chambers 467*a* in the reaction unit 466*a* through the channel connected to each of the distribution chambers. More specifically, in the reaction chambers 467*a*, the primers and reaction solutions for amplifying the target material may be lyophilized in advance. In addition, the reaction chambers 467*a* may have resistance 434*a* due to the air pressure of the reaction chamber itself except for the primers or the pre-stored reaction solutions. Therefore, in order for the elusion including the target material stored in the distribution chambers 464*a*, 465*a*, a rotational force greater than the resistance 434*a* due to the air pressure of the reaction chamber itself may be required. According to an embodiment, the elusions including the target material distributed in the distribution chambers 464*a* and 465*a* may move to the reaction chamber 467*a* in the reaction unit 466*a* based on the rotational force generated when the rotating body rotates at a sixth rotation number (e.g., 5000 rpm or more).

Figure 2A:
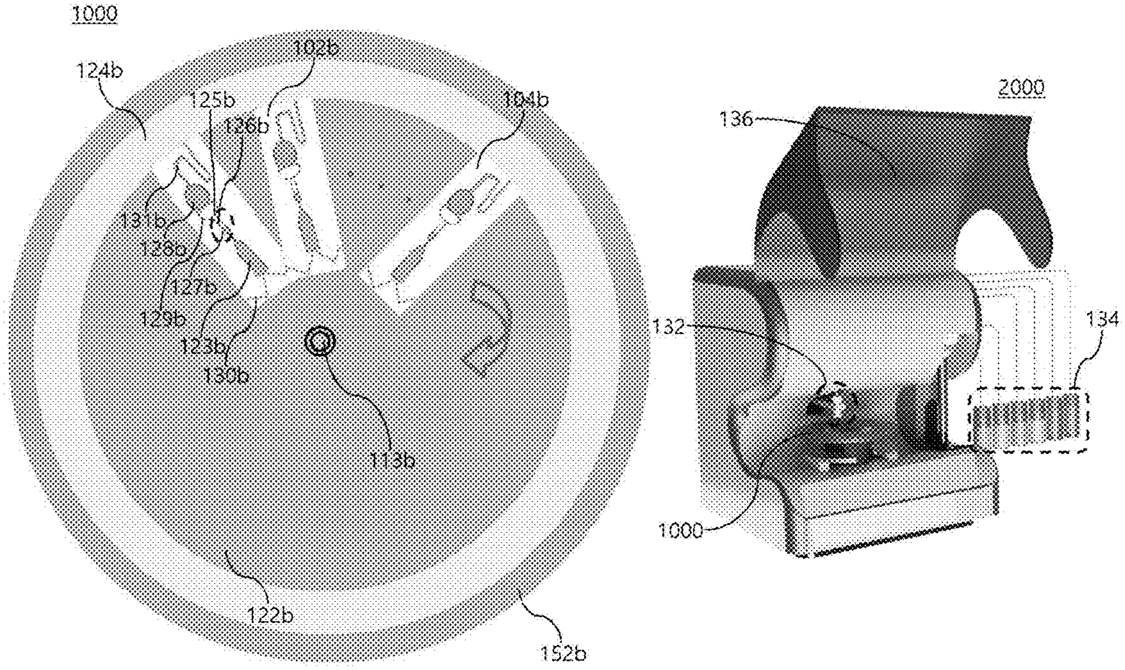
FIG. 2A is a diagram for schematically describing a process of analyzing samples by a microfluidic device and a sample analysis apparatus using the microfluidic device according to another embodiment.

FIG. 2A is a diagram for schematically describing a process of analyzing samples by a microfluidic device and a sample analysis apparatus using the microfluidic device according to yet another embodiment.

According to an embodiment, the microfluidic device 1000 may include a rotating body 152*b* to be rotatable, at least one microfluidic structure 102*b* and 104*b* disposed at predetermined intervals in the rotating body 152*b*, and a waste chamber 124*b* which is formed further outside the at least one microfluidic structure in the rotating body in the radial direction and connected with at least one microfluidic structure. More specifically, the rotating body 152*b* may include a region 122*b* in which a microfluidic structure is formed to be separated from a space in the waste chamber 124*b* in which the waste chamber 124*b* is formed.

According to one embodiment, the microfluidic device 1000 may include microfluidic structures disposed at predetermined intervals inside the radial direction of the area where the waste chamber 124*b* is formed. The microfluidic structure may be disposed in the circumferential direction in the rotary body 152*b*, based on at least one rotary shaft 113*b*. In addition, the microfluidic structure may move the sample and the solutions in the microfluidic structure based on the rotational force and the rotation direction of the rotary body 152*b*.

According to an embodiment, the microfluidic structures 102*b* and 104*b* may include a solution chamber 123*b* which receives a solution injected through a solution inlet (not illustrated) and shares the received solution with other adjacent microfluidic structures through the first sharing channel 130*b*, a sample chamber 128*b* which is located further outside the solution chamber in the rotating body 152*b* in the radial direction and receives a sample injected through an air vent 129*b* opened outside, and a siphon channel 131*b* which has one end connected to the sample chamber and the other end connected to the waste chamber to deliver the sample and the solution to the waste chamber 124*b*.

According to an embodiment, the microfluidic structures 102*b* and 104*b* may further include a passive valve 125*b* which has one end connected to the solution chamber 123*b* and provides the solutions received in the solution chamber 123*b* to the sample chamber 128*b* based on the rotational force generated by the rotating body.

The structure of a microfluidic structure disclosed in FIG. 2A will be described in more detail with reference to FIGS. 2B to 2C to be described below.

The microfluidic device 100 includes at least one microfluidic structure and may move a sample and a solution in the microfluidic structure while rotating along a predetermined rotary shaft 113*b*. The microfluidic device 1000 according to the present disclosure may be fastened to a sample analysis apparatus 2000 and may be used in an automated sample analysis process by the control of the sample analysis apparatus 2000.

According to one embodiment, the sample analysis apparatus 2000 may pre-store a sample including a target sample corresponding to an antigen to be detected, a cleaning solution, an elusion, and reaction solutions for detecting the target antigen. The sample analysis apparatus 2000 may extract the sample, the cleaning solution, the elusion, and the reaction solutions stored in the storage unit 134 from the storage unit 134 and inject the extracted sample, cleaning solution, elusion, and reaction solutions into the chambers in the microfluidic device 1000 through the inlet 137.

The sample analysis apparatus 2000 rotates the microfluidic device 1000 injected with the sample or solution according to predetermined rotational number and rotation direction to control the sample or solution to move in the microfluidic device.

That is, the sample analysis apparatus 2000 may detect target materials included in various types of samples by moving the sample and the solutions in the microfluidic device 1000 including at least one microfluidic structure.

According to one embodiment, the target materials may correspond to a target nucleic acid, a target antigen or a target RNA or a target DNA having genetic information. Unlike a general sample analysis apparatus, the sample analysis apparatus 2000 automatically supplies the prestored samples and solutions to the microfluidic device to rapidly and accurately detect target materials in the samples injected to the microfluidic device.

In addition, according to one embodiment of the present disclosure, the microfluidic device and the sample analysis apparatus controlling the microfluidic device move a sample including a target antigen and solutions including an antibody or an enzyme in the microfluidic device to be used for an enzyme-linked immunosorbent assay (ELISA). However, it is not only limited thereto, and of course, the microfluidic device and the sample analysis apparatus may be used even for other chemical or biological tests for detecting and reacting target materials in the sample by moving the sample or solution in the microfluidic device.

Figure 2B:
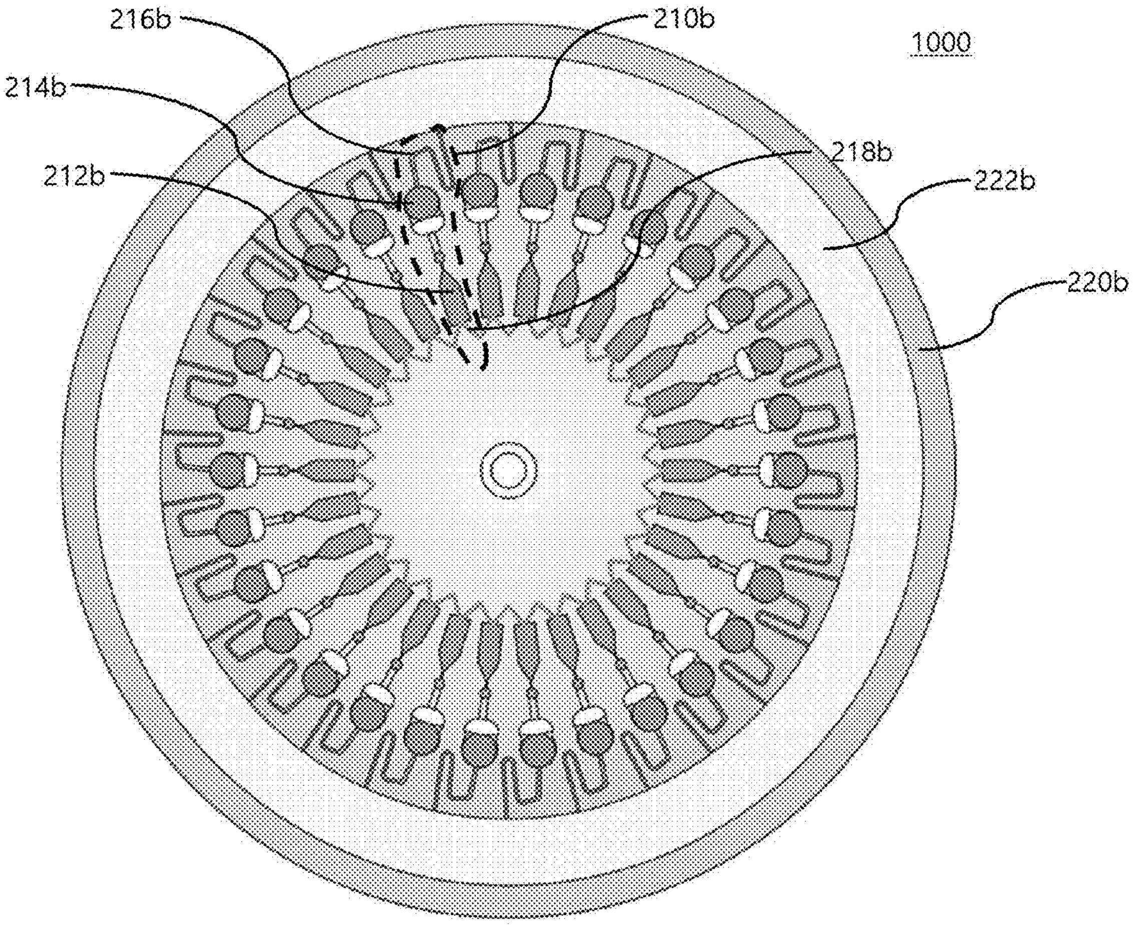
FIG. 2B is a diagram for describing a structure of a microfluidic device in which a plurality of microfluidic structures are disposed according to another embodiment.

FIG. 2B is a diagram for describing a structure of a microfluidic device in which a plurality of microfluidic structures are disposed according to yet another embodiment.

According to one embodiment, the microfluidic device 1000 may include a plurality of microfluidic structures arranged in a circumferential direction based on a rotary shaft. According to one embodiment, the microfluidic structures 210*a* may be arranged at predetermined intervals in a rotating body 218*a*.

According to one embodiment, the microfluidic structures may share samples or solutions stored in a chamber in the adjacent microfluidic structure through at least one sharing channel. For example, the microfluidic structure 210*a* may share samples or solutions stored in the chamber in the adjacent microfluidic structure to both sides of the microfluidic structure 210*a*. The microfluidic structures adjacent to the microfluidic structure 210*a* may be connected with other microfluidic structures in the same manner. According to one embodiment, all microfluidic structures in the rotating body 218*a* may be connected to each other through at least one sharing channel.

According to an embodiment, the solution chambers in the microfluidic structure 210*b* are connected with the solution chambers in another microfluidic structure through the sharing channel 218*b*, and the passive valve may be connected to one end of the solution chambers in each microfluidic structure 210*b*. Accordingly, the solutions stored in the solution chambers 212*b* of the present disclosure may be limited so as not to move to the sample chamber connected to the other end of the passive valve until the solution is filled in the solution chambers in anther microfluidic structure.

The microfluidic structure 210*b* may be located further inside the waste chamber 222*b* spaced part at a predetermined interval from an edge portion of the rotating body 220*b* in the radial direction. The microfluidic structure 210*b* may include a solution chamber 212*b* which receives a cleaning solution or a reaction solution for detecting a target material (e.g., a solution including a secondary antibody labeled with a chromogenic enzyme, a solution including a chromogenic substrate, a cleaning solution, etc.) through a solution inlet, a sample chamber 214*b* located further outside the solution chamber in a radial direction, and a siphon channel 216*b* connecting the sample chamber 214*b* and the waste chamber 222*b*.

According to one embodiment, the microfluidic device 1000 may include 30 microfluidic structures. However, it is not limited thereto, and the number of the microfluidic structures may vary depending on a type of sample and solution to be analyzed, an analysis method, a size of the rotating body, and a size of the microfluidic structure.

Figure 2C:
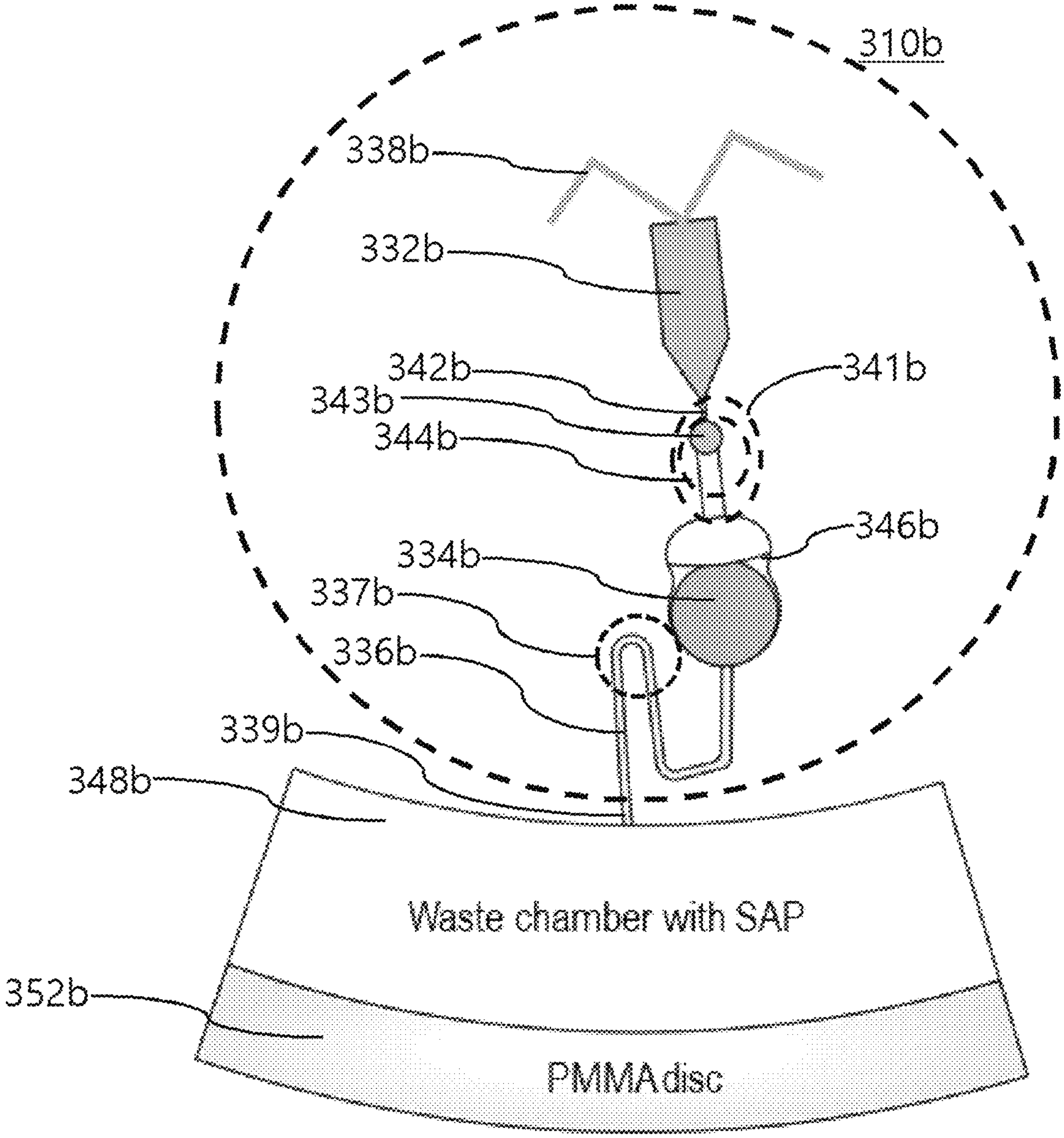
FIG. 2C is a diagram for describing a structure of the microfluidic structure according to another embodiment.

FIG. 2C is a diagram for describing a structure of the microfluidic structure according to another embodiment.

According to an embodiment, a microfluidic structure 310*b* may include a solution chamber 332*b* which receives a solution injected through a solution inlet and shares the solution with the solution chamber in other adjacent microfluidic structures through the first sharing channel 338*b*, a sample chamber 334*b* which is located further outside the solution chamber 332*b* in a radial direction in the rotating body and receives a sample injected through an air vent 346*b* opened outside, a passive valve 341*b* which has one end connected to the solution chamber 332*b* and the other end connected to the sample chamber 334*b*, and a siphon channel 336*b* for moving the sample or solutions in the sample chamber 334*b* to the waste chamber 348*b*. The microfluidic structure 310*b* may be arranged at a predetermined interval on the rotating body as illustrated in FIG. 2A and each siphon channel 336*b* of the microfluidic structures arranged on the rotating body may be connected to the waste chamber 348*b* located on the rotating body. Further, the waste chamber 348*b* may be formed at a predetermined interval from an edge of the rotating body 352*b* constituting the microfluidic device. According to one embodiment, the rotating body 352*b* may be provided in a disk form as a PMMA material.

The solution chamber 332*b* may have an end connected to a sharing channel, and the other end connected to the passive valve 341*b*. According to one embodiment, the solution chamber 332*b* may receive a cleaning solution for cleaning an antigen that is not captured in a pre-coated antibody in the sample chamber, a solution including an antibody labeled with a chromogenic enzyme for ELISA, and a solution including a chromogenic substrate.

The passive valve 341*b* may include a first channel 342*b* formed at an area similar to an area passing through the inlet of the passive valve 341*b* and a second channel 343*b* formed at apart of the first channel at a larger area than the area passing through the passive valve inlet. According to another embodiment, the passive valve 341*b* may further include a third channel 344*b* formed at a part of the first channel with an area larger than the area passing through the passive valve inlet or smaller than the area passing through the second channel, in addition to the second channel 343*b* formed at a part of the first channel with the area larger than the area passing through the passive valve inlet. However, according to one embodiment, the third channel described above may be formed similar to the area passing through the first channel. According to one embodiment, the surface in the passive valve 341*b* may be hydrophobically treated.

For example, in the passive valve 341*b*, radii of interfaces of the fluids passing through the first channel 342*b* and the second channel 343*b* may be different from each other due to a difference in area between the first channel 342*b* and the second channel 343*b* in the passive valve. The solutions in the solution chamber 332*b* may be limited so as not to move to the sample chamber 334*b* through the capillary force caused by the difference between the radii of the two interfaces.

Further, the passive valve 341*b* may also ensure a larger resistance so that the solution in the solution chamber 332*b* is not moved to the sample chamber 334*b* because at least a partial area in the passive valve is hydrophobically treated as well as the area difference between the first channel 342*b* and the second channel 343*b* in the passive valve 341*b*. The feature provided larger than an area in which at least a partial channel in the passive valve 341*b* passes through the inlet of the passive valve and the resistance generated by a hydrophobic material treated on an internal surface may be set so that the solutions in the solution chamber 332*b* is moved to the sample chamber according to a predetermined rotational force generated by the rotation of the rotating body.

More specifically, the solution chamber 332*b* in the microfluidic structure 310*b* may be located close to the rotary shaft of the rotating body in which the microfluidic structure 310*b* is mounted. Therefore, when the rotating body rotates around the rotary shaft, the rotational force generated by rotation may occur in a direction of the passive valve 341*b* in the solution chamber 332*b*. Since an inlet area of the passive valve 341*b* is smaller than the area of the solution chamber 332*b*, the solutions in the solution chamber 332*b* may move to the inlet of the passive valve 341*b* due to a difference in capillary pressure.

The solution moved to the inlet of the passive valve 341*b* may pass through a part of the first channel 342*b* formed in the area similar to the passage area of the inlet of the passive valve 341*b* and then reach the inlet of the second channel formed in a larger area than the first channel 342*b*. At this time, since the second channel is formed in a larger area than the first channel, there is a difference between a capillary force corresponding to the interface of the solution formed in the direction of the first channel and a capillary force corresponding to the interface of the solution formed in the direction of the second channel.

Since the second channel has an interface having a larger radius than the first channel, the capillary force corresponding to the interface of the second channel may be larger. Therefore, a net capillary force generated by a sum of the capillary force generated from the interface of the second channel and the capillary force corresponding to the interface of the first channel may form a resistance so that the solutions in the solution chamber 332*b* are not moved to the sample chamber 334*b*.

Thus, the solutions stored in the solution chamber 332*b* may be moved to the sample chamber 334*b* based on the rotational force generated by the rotation of the rotating body and the resistance provided by the passive valve 341*b*. According to one embodiment, the passive valve 341*b* may move the solutions injected into the solution chamber 332*b* to the sample chamber 334*b* based on a second rotational force generated by the rotating body rotating a second rotational number. According to one embodiment, the second rotational force may be provided to be equal to or larger than the resistance provided by the passive valve 341*b*.

Further, in the passive valve 341*b* connected to one end of the solution chamber 332*b* and the other end of the solution chamber, due to the first sharing channel 338*b* connected to the solution chambers in another microfluidic structure, as described above, the solutions stored in the solution chamber 332*b* may not move to the sample chamber 334*b* through the passive valve 341*b* until the solutions of the solution chamber in another microfluidic structure are filled.

Further, according to one embodiment, the first sharing channel 338*b*, which is connected to one end of the solution chamber 332*b* to share solutions in another microfluidic structure may be formed in a zigzag shape in the circumferential direction in the rotating body in which the microfluidic structure is located. However, it is not limited thereto, and the first sharing channel 338*b* may be formed in other shapes for sharing the solutions between the microfluidic structures.

The sample chamber 334*b* may receive a sample including at least one target material. According to one embodiment, the sample chamber 334*b* is connected to an air vent 346*b* to be connected with an external space of the sample chamber. The sample chamber 334*b* may receive the sample from the outside through the air vent 346*b*. As described below, when the sample chamber 334*b* is fastened to the sample analysis apparatus 2000, the sample may be acquired from the inlet of the sample analysis apparatus through the air vent 346*b*.

According to another embodiment, the sample chamber 334*b* may be connected to a second sharing channel for sharing the samples injected through the air vent 346*b* with the sample chamber 334*b* in another adjacent microfluidic structure. Further, according to one embodiment, the second sharing channel may be formed in a zigzag shape similar to the first sharing channel. However, according to one embodiment, unlike the solution chamber, each sample chamber 334*b* may not be connected through the sample chambers in another microfluidic structure.

According to one embodiment, in the sample chamber 334*b*, complementary antibodies may be pre-coated on a target material (e.g., a target antigen, a genome) in a sample. According to one embodiment, the inner surface of the sample chamber 334*b* may include a predetermined well region immobilized with the antibodies. When the sample chamber 334*b* acquires the sample through the air vent, antigens that may complementarily bind to the antibody in the sample may bind to the pre-coated antibodies.

In addition, the sample chamber 334*b* acquires a cleaning solution for cleaning the remaining substances except for the antigens binding to the antibody immobilized to the inner surface from the solution chamber, and may deliver target materials (e.g., antigens) and impurities that are not captured together with the washing solution may be delivered to the waste chamber 348*b* through the siphon channel 336*b*. According to one embodiment, the sample chamber 334*b* may further acquire a solution containing antibodies attached with a chromogenic enzyme and a solution containing a chromogenic substrate. In the sample chamber 334*b*, an antigen binding to the pre-immobilized antibody and an antibody attached with the chromogenic enzyme may form a conjugate, and the chromogenic reaction may be used by applying the chromogenic substrate to the chromogenic enzyme connected to the conjugate.

In the sample chamber 334*b*, antibodies which are not captured by the antigens, impurities, the cleaning solution, and other reaction solutions for ELISA may start to be introduced to the siphon channel 336*b* according to a rotation operation of the rotating body in which the microfluidic structures 310*b* are mounted.

The siphon channel 336*b* connected to one end of the sample chamber 334*b* may be located further outward the sample chamber 334*b* in the radial direction on the rotating body and is connected with the waste chamber located further outward the siphon channel 336*b*. The siphon channel 336*b* may move the solutions based on the capillary force provided by the siphon channel and the rotational force generated by the rotating body in which the microfluidic structures 310*b* are located.

More specifically, the sample acquired by the sample chamber 334*b* through the air vent 346*b* may be filled up to an outlet portion 339*b* of the siphon channel 336*b* connected to the waste chamber 348*b*. For example, the samples discharged through the inlet of the sample analysis device 2000 may be filled up to the outlet portion 339*b* discharged to the waste chamber 348*b* as the other end of the siphon channel 336*b* by an injection pressure generated by a cylinder pump of the sample analysis device 2000. The samples filled fully in the siphon channel 336*b* may be moved to the waste chamber 348*b* by the rotational force when the rotation of the rotating body starts.

For example, the samples may be injected into the sample chamber 334*b* while the rotating body stops, and among the injected samples, the remaining antigens except for the antigens (e.g., target materials) binding to the antibodies pre-coated on the sample chamber 334*b* and impurities contained in the sample may be filled up to the output portion 339*b* of the siphon channel. After a predetermined time has elapsed for the reaction between the antigens in the sample and the antibodies pre-coated on the sample chamber, when the rotating body rotates, antigens which do not bind to the antibodies pre-coated on the sample chamber 334*b* and impurities are moved to the waste chamber 348*b*.

Further, as described above, the solutions moved from the solution chamber 332B to the sample chamber 334*b* through the passive valve 341*b* may move up to the partial channel portion of the siphon channel by a second rotational force generated when the rotating body rotates at a second rotational number. According to one embodiment, the solutions moved to the sample chamber 334*b* through the passive valve 341*b* may be moved to at least a partial channel portion 337*b* in the siphon channel by the second rotational force. According to one embodiment, the solutions injected into the sample chamber 334*b* through the passive valve 341*b* may be filled up to the partial channel portion 337*b* in the siphon channel located at a portion corresponding to a height at which the solution is filled in the sample chamber 334*b*.

As the rotating body stops for a predetermined time, the solutions filled up to the partial channel portion 337*b* in the siphon channel may be moved to the outlet portion 339*b* in the siphon channel, and when the solutions start to be introduced to the waste chamber 348*b*, the rotating body where the microfluidic structures 310 are located may rotate again at high speed.

According to an embodiment, the reaction solutions for ELISA such as a first cleaning solution and a second cleaning solution for cleaning the target material, a solution containing antibodies attached with the chromogenic enzyme, and a solution containing a chromogenic substrate, which are moved to the sample chamber 334*b* through the passive valve 341*b* may be filled up to the partial channel portion 337*b* in the siphon channel located at the portion corresponding to the height at which the solution is filled in the sample chamber 334*b*. Thereafter, as the rotating body stops, the capillary force in the partial siphon channel 337*b* may be moved to the waste chamber 348*b* as the capillary force becomes larger than the rotational force of the rotating body.

The waste chamber 348*b* is formed to be spaced apart from an edge portion of a disk type substrate 352*b* at a predetermined interval and connected to each of at least one microfluidic structure to store the sample or solutions to be moved through each siphon channel of the at least one microfluidic structure. Further, according to one embodiment, the waste chamber 124*b* may further comprise a super absorbent polymer (SAP) capable of absorbing the sample and solution in the waste chamber, thereby effectively absorbing samples and solutions.

Figure 3A:
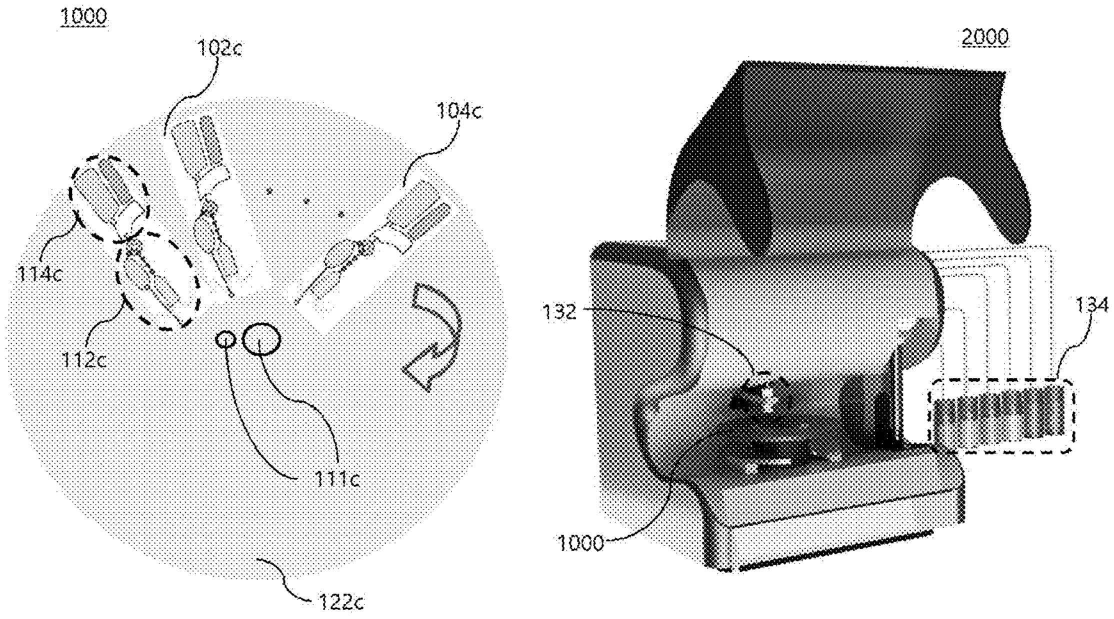
FIG. 3A is a diagram for schematically describing a process of analyzing samples by a microfluidic device and a sample analysis apparatus using the microfluidic device according to yet another embodiment.

FIG. 3A is a diagram for schematically describing a process of analyzing samples by a microfluidic device and a sample analysis apparatus using the microfluidic device according to yet another embodiment.

According to an exemplary embodiment, a microfluidic device 1000 may include a rotating body 122*a* to be rotatable, a chamber in which samples may be received in the rotating body, and microfluidic structures 102*c* and 104*c* provided with a plurality of channels through which the samples may move. For example, the microfluidic device 1000 may include a plurality of microfluidic structures 102*c* and 104*c* which are disposed at predetermined intervals in the rotating body 122*c*. The microfluidic structures may be disposed in a circumferential direction in the rotating body 122*c* based on a rotary shaft 111*c*, and may move samples and solutions in the microfluidic structures based on a rotational force generated by the rotation of the rotating body and a rotational direction of the rotating body.

According to an embodiment, the microfluidic structures 102*c* and 104*c* may include a pretreatment unit 112*c* which shares a solution injected through a solution injected through a solution inlet with another adjacent microfluidic structure through a sharing channel and performs a pretreating process for a sample injected through the sample inlet and the solution and a distribution unit 114*c* which is located outside the pretreatment unit in a radial direction in the rotating body and distributed with the target material in the sample pretreated through the pretreatment unit to perform detection for the distributed target material.

According to another embodiment, the pretreatment unit 112*c* may share the sample injected through the sample inlet and the solution injected through the solution inlet with another adjacent microfluidic structure through a sharing channel and performs a pretreating process for the injected sample and solution. The structure of the microfluidic structure will be described in more detail with reference to FIGS. 3B to 3C to be described below.

The microfluidic device 100 includes at least one microfluidic structure and may move a sample and a solution in the microfluidic structure while rotating along a predetermined rotary shaft 111*c*. The microfluidic device 1000 according to the present disclosure may be fastened to the sample analysis apparatus 2000 and may be used in an automated sample analysis process by the control of the sample analysis apparatus 2000.

According to an exemplary embodiment, the sample analysis apparatus 2000 may extract samples and solutions from the storage unit 134 in which the sample and the solutions are stored in advance. The sample analysis apparatus 2000 controls the injection port 132 for providing the sample and the solutions to the microfluidic device 1000 to inject the sample and the solutions extracted from the storage unit 134 to the microfluidic device 1000. The sample analysis apparatus 2000 rotates the microfluidic device 1000 injected with the sample or solution according to predetermined rotational number and rotation direction, so that the sample or solution moves in the microfluidic device.

That is, the sample analysis apparatus 2000 may extract target materials from various types of samples by moving the samples in the microfluidic device 1000 including at least one microfluidic structure. In addition, unlike a general sample analysis apparatus in the related art, the sample analysis apparatus 2000 automatically supplies the prestored samples and solutions to the microfluidic device to rapidly and accurately analyze the samples injected to the microfluidic device. According to one embodiment of the present disclosure, the target materials contained in the sample may include a genetic material, a genome, a nucleic acid, a RNA or DNA, but are not limited thereto.

Figure 3B:
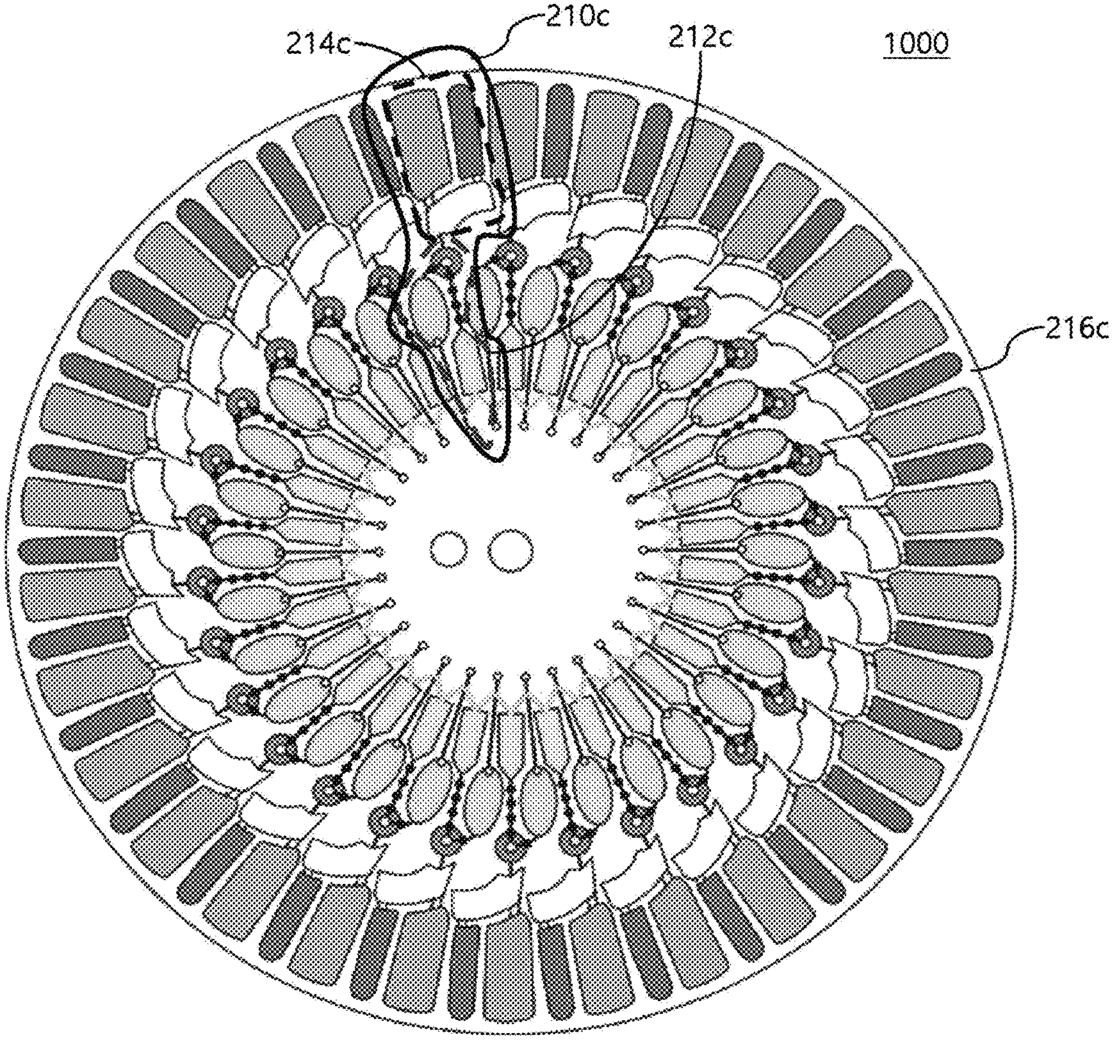
FIG. 3B is a diagram for describing a structure of a microfluidic device in which a plurality of microfluidic structures are disposed according to yet another embodiment.

FIG. 3B is a diagram for describing a structure of a microfluidic device in which a plurality of microfluidic structures are disposed according to yet another embodiment.

According to one embodiment, the microfluidic device 1000 may include a plurality of microfluidic structures arranged in a circumferential direction based on a rotary shaft. According to one embodiment, the microfluidic structures 210*c* may be arranged at predetermined intervals in a rotating body 216*c*.

According to one embodiment, the microfluidic structures may share samples or solutions stored in a chamber in the adjacent microfluidic structure through at least one sharing channel. For example, the microfluidic structure 210*c* may share samples or solutions stored in the chamber in the adjacent microfluidic structure to both sides of the microfluidic structure 210*c*. According to another embodiment, the microfluidic structure 210*c* may share only the samples stored in the chamber in the adjacent microfluidic structure to both sides of the microfluidic structure 210*c*. The microfluidic structures adjacent to the microfluidic structure 210*c* may be connected with other microfluidic structures in the same manner. According to one embodiment, at least one microfluidic structure in the rotating body 216*c* may be connected to each other through at least one sharing channel.

The microfluidic structure 210*c* may include a pretreatment unit 212*c* and a distribution unit 214*c* located outside the pretreatment unit in a radial direction in the rotating body 216*c*. The rotating body 216*c* and the distribution unit 214*c* may be connected to each other through at least one channel. The microfluidic structure 210*c* may distribute the samples or solutions injected through an inlet, and detect a target material in the distributed sample or store materials and solutions excluding the target material in the sample.

According to one embodiment, the microfluidic structure 210*c* may include 30 microfluidic structures. However, it is not limited thereto, and the number of the microfluidic structures may vary depending on a type of sample and solution to be analyzed, an analysis method, a size of the rotating body, and a size of the microfluidic structure.

Figure 3C:
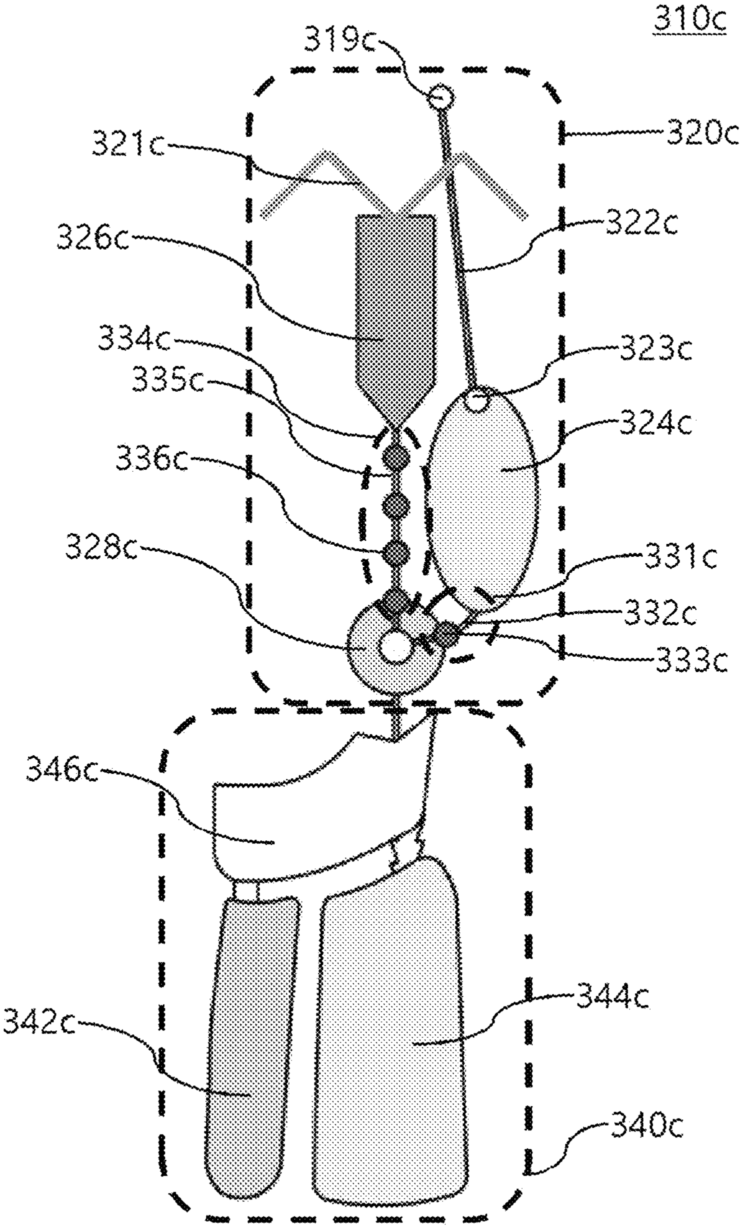
FIG. 3C is a diagram for describing a structure of the microfluidic structure according to yet another embodiment.

FIG. 3C is a diagram for describing a structure of the microfluidic structure according to yet another embodiment.

According to one embodiment, a microfluidic structure may include a pretreatment unit 320*c* and a distribution unit 340*c*. For example, the microfluidic structure may move at least one of a sample injected through a sample inlet and a sample or solution injected through a solution inlet to predetermined chambers in the distribution unit.

According to one embodiment, the pretreatment unit 320*c* may include a sample chamber 324*c* receiving the sample injected through the sample inlet, a solution chamber 326*c* receiving the solution injected through the solution inlet, and a capture filter 328*c* capturing a target material from the injected sample. According to another embodiment, the pretreatment unit 320*c* may further include a first passive valve connecting the sample chamber 324*c* and the capture filter 328*c* and a second passive valve connecting the solution chamber 326*c* and the capture filter 328*c*.

According to one embodiment, the pretreatment unit 320*c* may receive the sample and the solution and share at least one of the received sample or solution with other adjacent microfluidic structures through a sharing channel. As illustrated in FIG. 3C, the sharing channel 321*c* may also be formed in a part of the solution chamber 326*c*, but may also be connected to one end of the solution inlet when the solution inlet is formed in the solution chamber 326*c*. According to another embodiment, the sharing channel may be formed only at one end of the solution chamber or one end of the solution inlet, but may be formed even at one end of the sample chamber or one end of the sample inlet. According to yet another embodiment, the sharing channel may be formed on both the solution chamber and the sample chamber, or may be formed on both the solution inlet and the sample inlet.

The sample and the solutions received in the pretreatment unit 320*c* of the microfluidic structure 310*c* may be provided so as not to be moved to the capture filter until the sample and the solutions are shared in the sample chamber and the solution chamber in another microfluidic structure, respectively, due to a passive valve connected to one end of the sample chamber 324*c* or the solution chamber 326*c*.

The sample chamber 324*c* may receive the sample injected through the first sample inlet 323*c*. The first sample inlet 323*c* may be formed in one end of the sample chamber 324*c*. According to one embodiment, the first sample inlet 323*c* formed at one end of the sample chamber may be connected to a second sample inlet 319*c* through an inlet channel 322*c*, and the sample chamber 323*c* may also acquire a sample injected through the second sample inlet. According to one embodiment, when the sample chamber 324*c* acquires the sample through the first sample inlet 323*c*, the second sample inlet 319*c*, and the inlet channel 322*c*, the inlet channel 322*c* may be formed to a depth spaced apart from a surface of the rotating body (PMMA substrate) by a predetermined distance. For example, the second sample inlet 319*c* is formed on the surface of the rotating body, and at the other end of the second sample inlet 319*c* connected to the surface of the rotating body, one end is connected to the inlet channel 322*c*, and the inlet channel 322*c* may be connected with the first sample inlet 323*c* at a predetermined depth in the rotating body. In this case, the first sample inlet 323*c* may not be exposed to an external space. The first sample inlet 323*c* is connected to the inlet channel 322*c* at a predetermined depth from the surface of the rotating body so as not to be exposed to the external space, and the sample chamber 324*c* may also be connected to the first sample inlet 323*c* at a predetermined depth based on the surface of the rotating body. According to one embodiment, a sharing channel for sharing the sample with the microfluidic structure by the sample chamber 324*c* may also be connected to at least one of the first sample inlet 323*c*, the inlet channel 322*c*, or the second sample inlet 319*c*.

The solution chamber 326*c* may receive the solution injected through the solution inlet (not illustrated). According to an embodiment, the solution inlet may be formed at one end of the solution chamber, or may also be formed in at least apart of the sharing channel connected to the solution chamber. As described above, the sharing channel 321*c* may be connected to one side of the solution chamber 326*c*. The solution chamber 326*c* may be connected to the capture filter 328*c* through the second passive valve. The samples received in the solution chamber 326*c* may be provided so as not to be moved to the capture filter until all the solutions in the solution chamber in another microfluidic structure are filled due to the second passive valve.

According to one embodiment, the sharing channel connected to at least one of the sample chamber 324*c* or the solution chamber 326*c* may be formed in a zigzag shape, but is not limited thereto, and may be formed in other shapes so that the sample and the solution may be shared in the sample chamber and the solution chamber in another microfluidic structure, respectively. However, as described above, the sharing channel may be formed only in the solution chamber 326*c*, and the microfluidic structures formed on the rotating body may also share only the solution through the sharing channel.

The first passive valve 331*c* may include a first channel formed in the same area as an area passing through the first passive valve inlet and at least one second channel formed between the first channels in a larger area than the area passing through the first passive valve inlet. According to one embodiment, the surface in the first passive valve 331*c* may be hydrophobically treated.

More specifically, the first passive valve 331*c* may be limited so that radii of interfaces of a fluid passing through the first channel 332*c* and the second channel 333*c* may be different from each other due to a difference between the first channel 332*a* and the second channel 333*a* in the passive valve, and the samples in the sample chamber are not removed to the capture filter through a capillary force caused by the difference between the radii of the two interfaces. Further, the first passive valve 331*c* may also ensure a larger resistance so that the sample in the sample chamber is not moved to the capture filter because at least a partial area in the first passive valve is hydrophobically treated as well as an area difference between the first and second channels in the first passive valve.

The feature provided larger than an area in which at least a partial channel in the first passive valve 331*c* passes through the inlet of the first passive valve and the resistance generated by a hydrophobic material treated on an internal surface may be set so that the samples in the sample chamber 324*c* is moved to the capture filter 328*c* according to a first rotational force generated by the rotation of the rotating body.

The second passive valve 334*c* may include a third channel formed in the same area as an area passing through a second passive valve inlet and at least one fourth channel formed between the third channels in a larger area than the area passing through the second passive valve inlet. According to one embodiment, the surface in the second passive valve 334*c* may be hydrophobically treated.

More specifically, the second passive valve 334*c* may be limited so that radii of interfaces of a fluid passing through the third channel and the fourth channel may be different from each other due to a difference in area between the third channel 335*c* and the fourth channel 336*c* in the passive valve, and the solutions in the solution chamber are not moved to the capture filter through a capillary force caused by the difference between the radii of the two interfaces. Further, the second passive valve 334*c* may also ensure a larger resistance so that the solution in the solution chamber is not moved to the capture filter because at least a partial area in the second passive valve is hydrophobically treated as well as an area difference between the third and fourth channels in the second passive valve.

The feature provided larger than an area in which at least a partial channel in the second passive valve 334*c* passes through the inlet of the second passive valve and the resistance generated by a hydrophobic material treated on an internal surface may be set so that the solutions in the solution chamber 326*c* are moved to the capture filter 328*c* according to a second rotational force generated by the rotation of the rotating body.

The capture filter 328*c* may capture the target material from the injected sample. For example, the capture filter 328*c* may comprise a filter formed of a glass fiber of a predetermined thickness or a matrix including a plurality of silica-based beads. The capture filter 328*c* may capture target materials in the sample by using the matrix. According to one embodiment, the capture filter 333*c* may be a glass microfiber filter having a preset particle retention, but is not limited thereto, and includes other matrices for capturing the target material and the like in the sample.

The distribution unit 340*c* may include a collection chamber 342*c* and a waste chamber 344*c*. According to another embodiment, the distribution unit 340*c* may further include a delivery chamber 346*c* in addition to the collection chamber 342*c* and the waste chamber 344*c*. For example, the distribution unit 340*c* is located outside the pretreatment unit 320*c* in the rotating body in the radial direction, distributes the target material in the sample pretreated through the pretreatment unit and may perform the detection for the distributed target material. According to one embodiment, the distribution unit 340*c* may selectively store the sample and the solutions in the collection chamber or the waste chamber based on the rotational force and rotational direction of the rotating body in which the microfluidic structure 310*c* is mounted.

The collection chamber 342*c* may store an elusion including a target material captured in the capture filter. For example, the collection chamber 342*c* may acquire an elusion including a target material captured to the capture filter based on a second rotational direction of the rotating body in which the microfluidic structure 310*c* is located. More specifically, the elusions including the target material captured in the capture filter may be stored in the collection chamber 342*c* by moving unilaterally in a left direction of the delivery chamber 346*c* illustrated in FIG. 3C by rotating the rotating body in a second rotational direction.

The waste chamber 344*c* may be located adjacent to the collection chamber, and may store the cleaning solution for cleaning the remaining materials except for the target material that is captured in the capture filter in the sample and the solution passing through the capture filter. For example, the waste chamber 344*c* may receive remaining materials on the capture filter which are not captured in the capture filter and the cleaning solution of the solutions received in the solution chamber, based on the first rotational direction of the rotating body to which the microfluidic structure 310*c* is fastened. More specifically, as the rotating body rotates in the first rotational direction, the remaining materials which are not captured in the capture filter among the samples and some of the solutions received in the solution chamber may be stored in the waste chamber 344*c* by moving unilaterally in a right direction of the delivery chamber 346*c* illustrated in FIG. 3C.

In the delivery chamber 346*c*, an upper end of the delivery chamber is connected to the capture filter 328*c*, a lower end thereof is connected to the collection chamber 342*c*, and the other lower end may be connected to the waste chamber 344*c*. The delivery chamber 346*c* may connect the capture filter with the collection chamber and the first waste chamber, respectively, and may deliver selectively some of the samples or solutions received in the delivery chamber to the collection chamber 342*c* or the first waste chamber 344*c* in the rotational direction of the rotating body.

According to one embodiment, the delivery chamber 346*a* acquires the elusion including the target material or the sample passing through the capture filter and the cleaning solution from the capture filter and may selectively deliver the elusion including the target material to the collection chamber 342*c* or deliver the sample passing through the capture filter and the cleaning solution to the waste chamber 344*c*.

According to one embodiment, the sample injected into the microfluidic structure 310*c* is a sample comprising a genome such as RNA or DNA, target genomes which have been captured on the capturing filter may be stored in the collection chamber 342*c* as the target material together with the elusion.

Figure 3D:
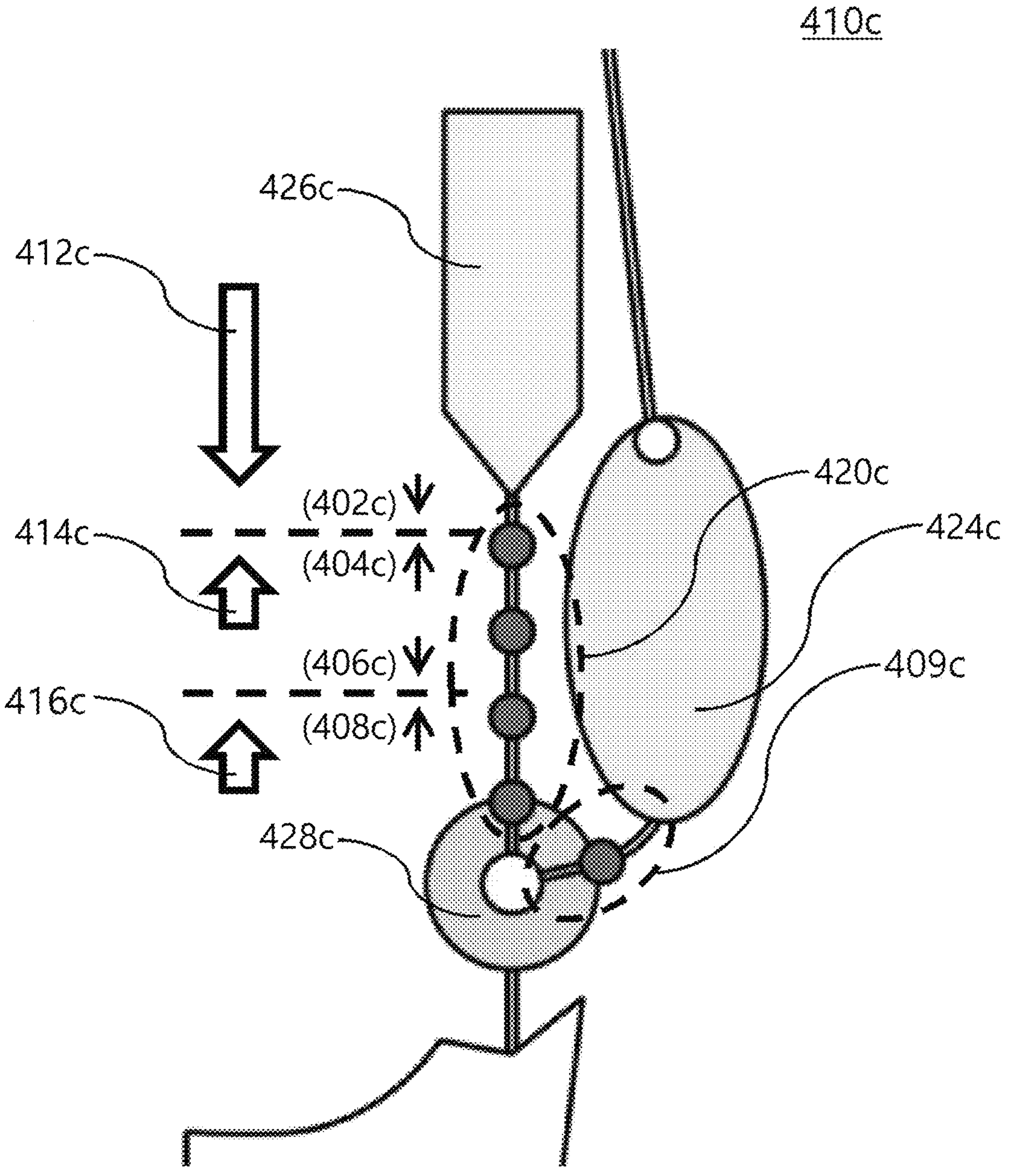
FIG. 3D is a diagram for describing an operation of a manual valve in the microfluidic structure according to an embodiment.

FIG. 3D is a diagram for describing an operation of a manual valve in the microfluidic structure according to an exemplary embodiment.

A microfluidic structure 410*c* may include a first passive valve 409*c* connecting a sample chamber 424*c* and a capture filter 428*c* and a second passive valve 420*c* connecting a solution chamber 426*c* and the capture filter 428*c*. For example, the first passive valve 409*c* may include a first channel formed in the same area as an area passing through the first passive valve inlet and a second channel formed in a larger area than the area passing through the first passive valve inlet.

Further, the second passive valve 420*c* may include a third channel formed in the same area as an area passing through a second passive valve inlet and at least one fourth channel formed between the third channels at predetermined intervals in a larger area than the area passing through the second passive valve inlet. An operation of the second passive valve will be described based on the fourth channel in the second passive valve 420*c* formed most adjacent to the solution chamber 426*c* illustrated in FIG. 3D.

Although not illustrated in FIG. 3D, as illustrated in FIG. 3B, the solution chamber 426*c* in the microfluidic structure 410*c* may be located close to the rotary shaft of the rotating body in which the microfluidic structure 410*c* is mounted. Therefore, when the rotating body rotates around the rotary shaft, a rotational force 412*c* generated by rotation may occur in a second passive valve direction in the solution chamber.

On the other hand, since an inlet area of the second passive valve 420*c* is smaller than the area of the solution chamber 426*c*, the solutions in the solution chamber 426*c* may move to the inlet of the second passive valve 420*c* due to a difference in capillary pressure. The solution moved to the inlet of the second passive valve 420*c* may pass through a part of the third channel formed in the same area as the passage area of the inlet of the second passive valve 420*c* and then reach the inlet of the fourth channel formed with a larger area than the third channel. At this time, since the fourth channel is formed in a larger area than the third channel, there is a difference between a capillary force 402*c* corresponding to the interface of the solution formed in the direction of the third channel and a capillary force 404*c* corresponding to the interface of the solution formed in the direction of the fourth channel.

Since the fourth channel has an interface having a larger radius than the third channel, the capillary force 404*c* corresponding to the interface of the fourth channel may be larger. Likewise, among the plurality of fourth channels in the second passive valve 420*c*, a capillary force 406*c* by a fourth channel adjacent to the capture filter 428*c* may also be larger than a capillary force 406*c* corresponding to the interface of the third channel. Therefore, net capillary forces 414*c* and 416*c* generated when a part of the channel in the second passive valve is formed to be wider than the area passing through the inlet of the second passive valve may form a resistance so that the solutions in the solution chamber 426*c* are not moved to the capture filter 428*c*.

Thus, the solutions stored in the solution chamber 426*c* may be moved to the capture filter 428*c* based on the rotational force 412*c* generated by the rotation of the rotating body and the resistance provided by the second passive valve 420*c*. According to one embodiment, the second passive valve 420*c* may move the solutions injected from the solution chamber 426*c* to the capture filter 428*c* based on a second rotational force generated by the rotating body. According to one embodiment, the second rotational force may be provided to be equal to or smaller than the resistance provided by the second passive valve.

Similarly to the operation of the second passive valve, the first passive valve 409*c* may also limit the samples stored in the sample chamber 424*c* to be moved to the capture filter 428*c* by using a difference in capillary pressure caused by a difference in area between the first channel and the second channel in the first passive valve. According to one embodiment, the first passive valve 409*c* may move the samples injected from the solution chamber 424*c* to the capture filter 428*c* based on a first rotational force generated by the rotating body. Further, as described above, at least a part of the surface in the first passive valve and the second passive valve may be hydrophobically treated, thereby providing additional resistance to the samples or solutions.

Figure 4:
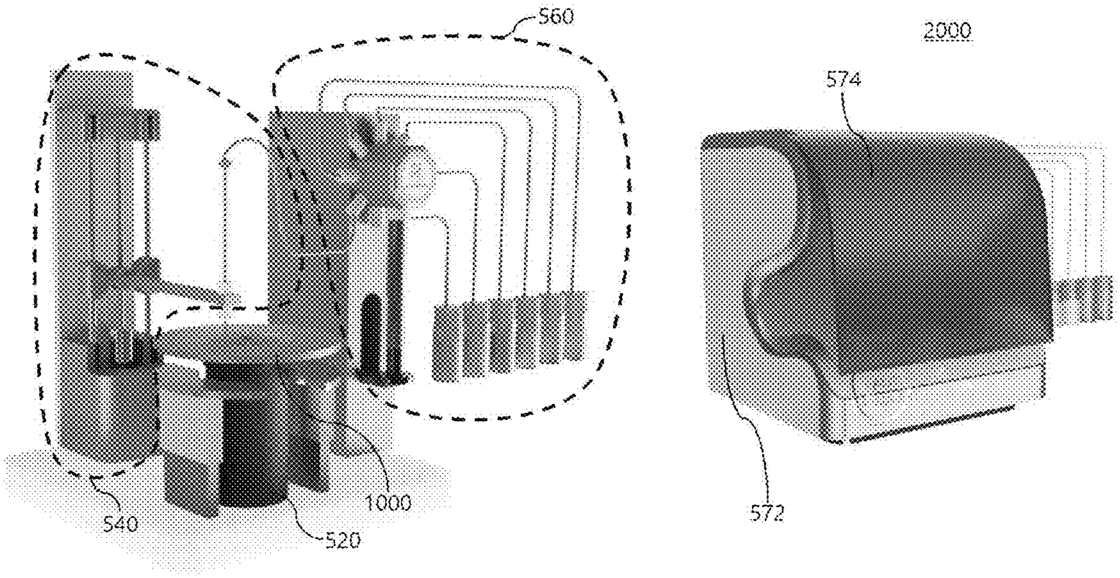
FIG. 4 is a diagram for schematically describing a structure of a sample analysis apparatus according to an embodiment.

FIG. 4 is a diagram for schematically describing a structure of a sample analysis apparatus according to an exemplary embodiment.

According to one embodiment, the sample analysis apparatus 2000 to which the microfluidic device 1000 is mounted may include a first driver 520 which rotates the microfluidic device 1000 along a predetermined rotary shaft, a second driver 540 which moves an injection mechanism for injecting samples and solutions along a predetermined driving shaft, a supply unit 560 which stores the sample and the solutions to be provided to the injection mechanism and selectively provides the stored samples and solutions to the injection mechanism, and a controller (not illustrated) which controls the first driver, the second driver, and the supply unit.

However, the illustrated components are not all required components, and the sample analysis apparatus 2000 may be implemented by more components than the illustrated components and the sample analysis apparatus 2000 may be implemented by fewer components. According to an embodiment, the sample analysis apparatus 2000 may further include a first housing 572 formed so that the first driver 520, the second driver 540, and the controller (not illustrated) among the configurations of the sample analysis apparatus 2000 are located therein, and a second housing 574 which is connected to the first housing 572 to be openable to selectively expose the microfluidic device. According to another embodiment, the sample analysis apparatus 200 may further include a network interface (not illustrated) for communicating with other electronic devices and a camera (not illustrated) for acquiring an image for the microfluidic device.

Figure 5:
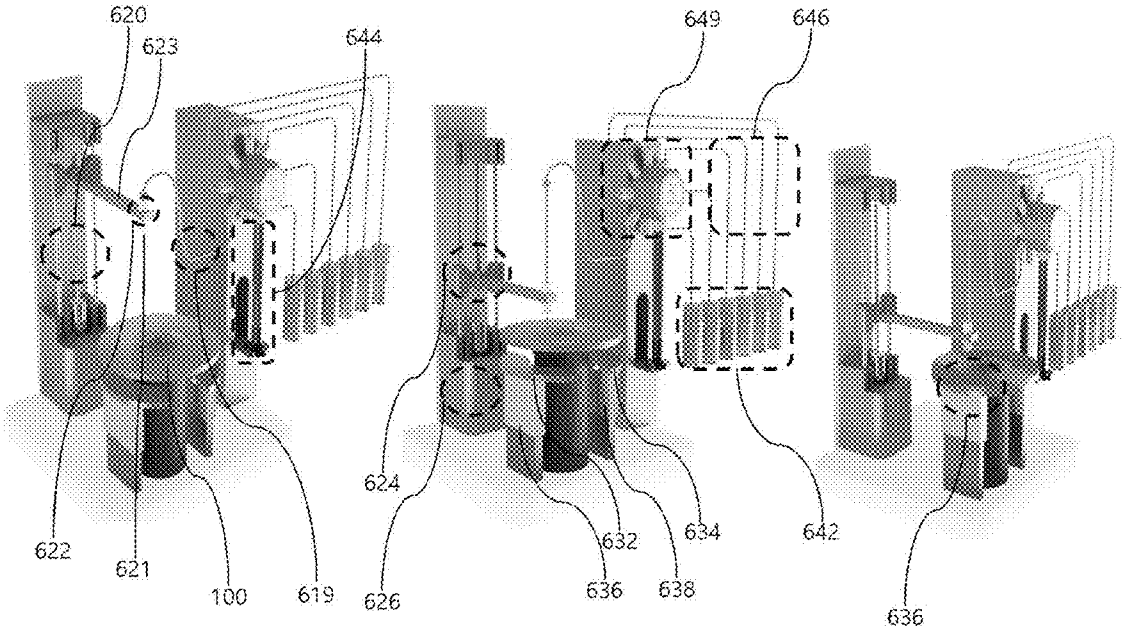
FIG. 5 is a diagram for describing an operation and a structure of a sample analysis apparatus according to an embodiment.

FIG. 5 is a diagram for describing an operation and a structure of a sample analysis apparatus according to an exemplary embodiment.

As described in FIG. 4, the sample analysis apparatus 2000 may include a first driver 520 which rotates the microfluidic device 1000 along a predetermined rotary shaft, a second driver 540 which moves an injection mechanism for injecting samples and solutions along a predetermined driving shaft, and a supply unit 560 which stores the sample and the solutions to be provided to the injection mechanism and selectively provides the stored samples and solutions to the injection mechanism.

Hereinafter, the features of each configuration in the sample analysis apparatus will be described in more detail with reference to FIG. 5.

The first driver 520 may include a rotating member (not illustrated) which is fastened to the microfluidic device and rotatably installed together with the microfluidic device along the rotary shaft of the microfluidic device and a spindle motor 632 which rotates the rotating member at predetermined rotational direction and rotational speed based on a first control signal acquired from the controller. The spindle motor 632 may rotate in predetermined rotational number and rotational direction by the control of the controller, so that the microfluidic device 1000 rotates. The first driver 520 may differently set the rotational number and the rotational direction according to a type of solution to be injected from the injection mechanism or the degree of the reaction process using the solution and the sample to rotate the rotating body.

The second driver 540 may include at least a guide shaft 620, a first driving member 622 in which one end of the drive shaft is fastened to an injection mechanism 621, a second driving member 624 which is connected to the other end of the drive shaft 623 and transmits a driving force to the drive shaft so that the drive shaft rotates at a predetermined angle interval, and a step motor 626 which rotates the second driving member 624 by a predetermined angle. The second driver 540 may inject the sample or solution into a predetermined chamber in the microfluidic device by the control of the controller.

The first driving member 622 is connected to one end of the drive shaft 623 to allow the injection mechanism 621 to be fixed. According to one embodiment, the first driving member 622 may be formed integrally with the drive shaft 623, but may be detachable. The drive shaft 623 is connected to the second driving member 624 to acquire a rotational force by the step motor.

The at least one guide shaft 620 may be located at the top of the step motor 626, and provide a guide path so that the first driving member 622, the drive shaft 623, the injection mechanism 621, and the second driving member 624 in the second driving unit 540 move in a vertical direction. According to one embodiment, the guide shaft 620 may be spaced at a predetermined interval, and threads for being coupled to a ball screw member may be formed on at least one axis of the guide shaft. Further, at least one guide shaft 620 may be formed in three, but is not limited thereto.

The second driving member 624 may include a through hole in which the at least one guide shaft 620 penetrates and a ball screw member in contact with a surface formed in the through hole. The second driving member may move along the at least one guide shaft in a state in which the ball screw member and threads formed on the at least one guide shaft are in contact with each other. Further, the second driving member 624 may transmit the driving force by step motor 626 to the injection mechanism 621 through the drive shaft 623. For example, the second driving member 624 may allow the drive shaft 623 connected to one end to rotate at a predetermined angle interval, so that the injection mechanism may be moved at a predetermined angle interval.

The supply unit 560 may include a storage unit 642 in which a sample and solutions are separately stored, a supply channel 646 in which the samples and solution are separately acquired from the storage unit, a port valve 649 for selecting a supply channel to be connected to the injection channel 619 or the injection mechanism 621 from the supply channels, and a cylinder pump 644 for pumping the sample and the solutions stored in the storage unit 642.

The storage unit 642 may include various storage means for separately storing the sample and the solutions. For example, the storage unit 642 may include a sample storage unit for storing a sample, a cleaning solution storage unit for storing a cleaning solution, and an elusion storage unit for storing an elusion. However, it is not limited thereto, and the storage unit 642 may further include a plurality of storage chambers for storing other various samples and solutions. According to one embodiment, each sample storage unit, the cleaning solution storage unit, and the elusion storage unit in the storage unit 642 may further include a connection hole communicating with the supply channel.

The supply channel 646 may be connected to a connection hole of the storage chambers where each sample and solutions of the storage unit 642 are stored. The supply channel 646 may separately acquire the sample and the solutions stored in the storage unit 642. One end of the supply channel 646 may be connected to the storage unit 642, and the other end of the supply channel 646 may be connected to the port valve 649.

The port valve 649 may select one supply channel from the supply channels in which the sample and the solutions stored in the storage unit 642 move and connect the selected supply channel to the injection mechanism 621. According to another embodiment, the port valve 649 may select one supply channel among the plurality of supply channels, and may connect the selected supply channel to the injection channel connected to the injection mechanism 621. According to one embodiment, the port valve 649 may be formed as 8 ports for connecting 8 supply channels, but is not limited thereto, but the number of ports to be connected may vary according to the number of samples and solutions required for sample analysis.

The cylinder pump 644 may be discharged through the injection mechanism by pumping the sample and the solutions stored in the storage unit. For example, the cylinder pump may include a step motor in the cylinder pump, and the step motor is connected to a rack where the cylinder pump is installed, so that a rotational motion of the step motor may be converted into a linear motion of the cylinder pump. According to one embodiment, the cylinder pump 644 may discharge the sample, the cleaning solution and the elusions stored in the storage unit 642 through the injection mechanism based on the control of the controller.

According to an embodiment, the sample analysis apparatus 2000 may further include heating units 632 and 634 which cover at least a part of the first driver in a cylindrical shape in an outer direction of the first driver below the microfluidic device and linear guides 636 and 638 for aligning the positions of the heating units in the outer direction of the first driver.

For example, the sample analysis apparatus 2000 controls the first driver, the second driver, and the microfluidic device to control the heating units 632 and 634 located below the microfluidic device when predetermined samples and solutions are injected into the microfluidic device, so that the temperature of the sample and the solutions in the microfluidic device may be constantly maintained. Further, the sample analysis apparatus 2000 may constantly maintain the temperature of the chambers in which the sample and the solutions are stored in the microfluidic device 1000 by aligning the positions of the heating units below the first driver using the linear guide. Accordingly, the sample analysis apparatus 2000 may provide a suitable temperature for extraction and reaction of the target material.

Figure 6:
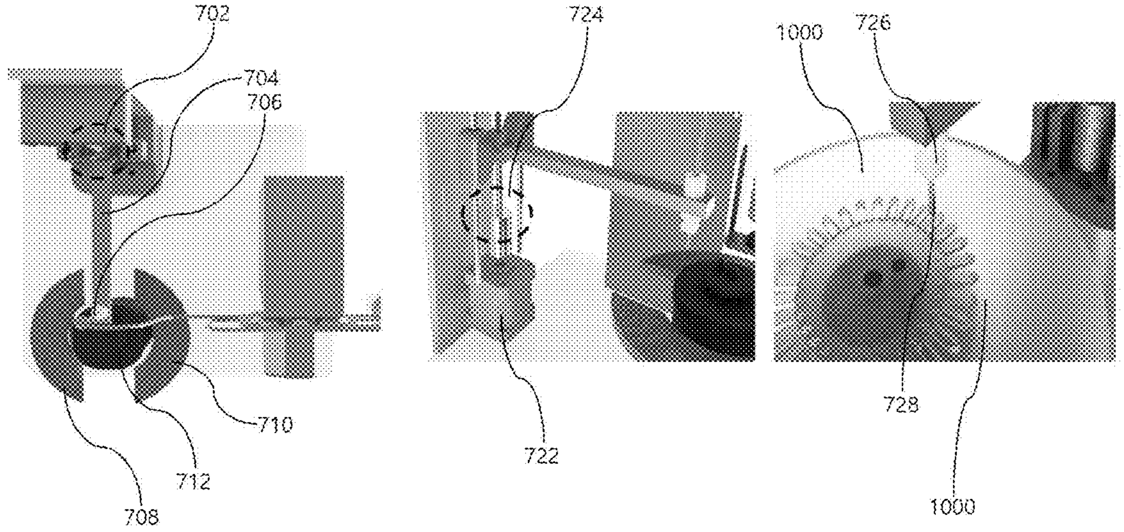
FIG. 6 is a diagram for describing an operation and a structure of a sample analysis apparatus according to an embodiment.

FIG. 6 is a diagram for describing an operation and a structure of a sample analysis apparatus according to an exemplary embodiment.

Referring to FIG. 6, the configuration of the sample analysis apparatus associated with the second driver will be described in detail.

The second driver 540 may include a step motor 722, and the step motor 722 may transmit a driving force to a drive shaft 704 through a second driving member 702. According to one embodiment, the drive shaft 704 may be driven in a predetermined axial direction (e.g., z-axis direction) based on the driving force transmitted from the second driving member 702. First driving members 706 and 726 for fixing an injection mechanism 728 may be formed at one end of the drive shaft 704. The second driver controls the second driving member 702, the drive shaft 704, the first driving members 706 and 726, and the injection mechanism 728, which move in a predetermined axial direction, so that the sample and the solution are injected on the microfluidic device 1000.

According to one embodiment, the second driver may stably move the first driving members 706 and 726, the drive shaft 704, the injection mechanism 728, and the second driving member in a vertical direction by using at least one guide shaft 724 which is disposed at a predetermined interval. According to one embodiment, the second driver may drive the injection mechanism 728 within an area corresponding to the microfluidic device located at the top of the first driver.

According to one embodiment, the first driver may be located between a first heating unit 708 and a second heating unit 710 formed in a fan shape or a cylindrical shape, and may include a spindle motor and a rotating member 712 as described above. The rotating member may rotate according to a predetermined rotational number by the control of the spindle motor.

Figure 7:
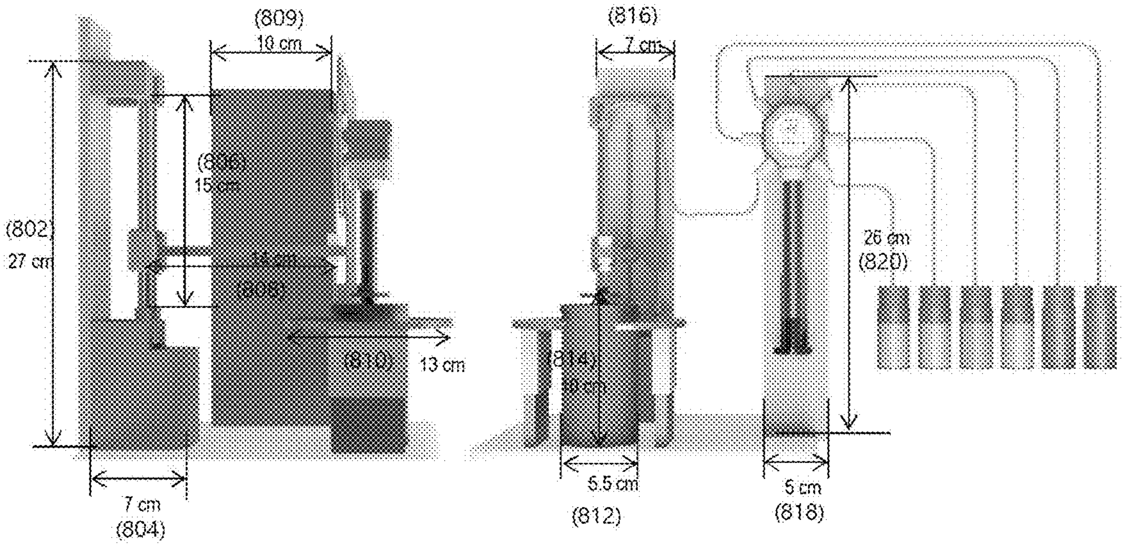
FIG. 7 is a diagram for describing sizes of each configuration of the sample analysis apparatus according to an embodiment.

FIG. 7 is a diagram for describing sizes of each configuration of the sample analysis apparatus according to an exemplary embodiment.

According to an embodiment, a total vertical length 802 of the second driver 540 of the sample analysis apparatus is 27 cm, a horizontal width 804 of a housing in which a step motor is located is 7 cm, a vertical length 806 of at least one guide shaft is 15 cm, a length 808 of the drive shaft is 14 cm, a width 809 of a supply unit for supplying the sample and the solution is 10 cm, and a diameter 801 of a heating unit below the microfluidic device is 13 cm. Further, according to one embodiment, a vertical length 814 of the first driver of the sample analysis apparatus is 10 cm, a diameter 812 is 5.5 cm, a total length 816 in which the at least one guide shaft is disposed at a predetermined interval is 7 cm, a horizontal length 818 of the supply unit for supplying the sample and the solution is 5 cm, and a vertical length 820 is 26 cm.

However, the sizes of the sample analysis apparatus 2000 and the microfluidic device 1000 according to the present disclosure are not limited thereto, and may vary according to conditions such as amounts of samples and solutions to be analyzed, an analysis speed, analysis accuracy, and a place where the analysis is performed.

Figure 8:
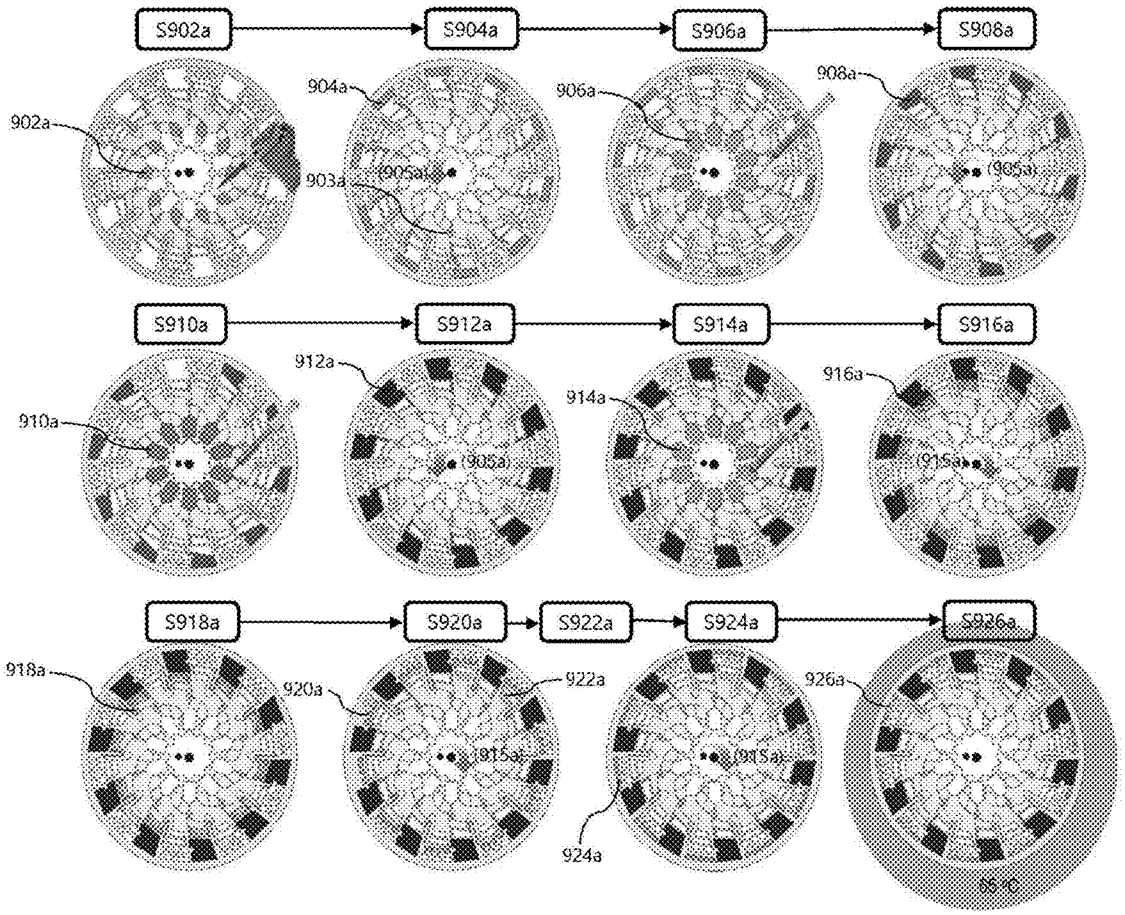
FIG. 8 is a diagram illustrating a process of analyzing samples by the microfluidic device and the sample analysis apparatus using the microfluidic device according to FIGS. 1A to 1D.

FIG. 8 is a diagram illustrating a process of analyzing samples by the microfluidic device and the sample analysis apparatus using the microfluidic device according to FIGS. 1A to 1D.

According to one embodiment, a process in which the sample analysis apparatus 2000 analyzes a sample by using the microfluidic device 1000 will be described in detail. According to an embodiment, the sample analysis apparatus 2000 may induce amplification reaction of a target material (e.g., a specific genome) in the sample by using the microfluidic device 1000. In addition, the sample analysis apparatus 2000 may diagnose the target material by amplifying the target material in the sample using the microfluidic device 1000 and detecting the amplified target material.

The sample analysis apparatus 2000 may rotate a rotating body of the microfluidic device coupled to the sample analysis apparatus in predetermined rotational number and rotational direction based on at least one rotary shaft. The sample analysis apparatus 2000 may move a sample and a solution injected to the microfluidic device 1000 in at least one microfluidic structure in the microfluidic device based on a rotational force generated by rotating the rotating body. The sample analysis apparatus 2000 controls at least one of the rotational direction and the rotational number of the rotary body, so that the sample or solutions may be controlled to move in different directions.

According to one embodiment, in the sample analysis apparatus 2000, the sample injected to the microfluidic device 1000 may include a target material to be analyzed and impurities except for the target material. In addition, in the sample analysis apparatus 2000, the solution injected into the microfluidic device 1000 may include a cleaning solution for cleaning remaining materials except for the target material and an elusion (e.g., water) for separating the target material on a capture filter.

In S902*a*, the sample analysis apparatus 2000 may inject a sample to a sample chamber 902*a* of the microfluidic device 1000 fastened on the rotating member of the sample analysis apparatus. For example, the sample analysis apparatus 2000 may inject samples prestored in the storage unit by connecting an injection mechanism to a sample inlet connected to the sample chamber 902*a*. According to one embodiment, the sample chamber 902*a* of the microfluidic device 1000 may be connected to a first passive valve for controlling samples in the sample chamber to move to the capture filter based on a predetermined rotational force.

Accordingly, in the sample analysis apparatus 2000, until samples are injected to all sample chambers in the microfluidic device 1000, the samples in the sample chamber may not be moved to the capture filter.

In S904*a*, the sample analysis apparatus 2000 may control the rotating member to rotate in a second rotational direction (e.g., half clockwise direction) and a first rotational number. The samples stored in the sample chambers 902*a* of each microfluidic structure may move to a first waste chamber 904*a* based on a second rotational direction 904*a* and a first rotational force generated by the rotating body rotating according to the first rotational number. According to one embodiment, the first rotational force may be larger than or equal to the resistance provided by the first passive valve connected to the sample chamber 902*a*.

In S904*a*, the sample analysis apparatus 2000 controls the rotating body to generate a first rotational force, so that the samples stored in the sample chamber in each microfluidic structure may pass through the capture filter, and target materials captured by a silica-based matrix and remaining materials except for the target materials in the sample may present on a capture filter 903*a*.

In S906*a*, the sample analysis apparatus 2000 may inject solutions into a solution chamber 906*a* of the microfluidic device 1000. More specifically, the sample analysis apparatus 2000 may inject a cleaning solution for cleaning the remaining materials except for the target material in the sample to the solution chamber 906*a*. For example, the sample analysis apparatus 2000 may inject a cleaning solution prestored in the storage unit by connecting an injection mechanism to a solution inlet connected to a solution chamber 906*a*. According to one embodiment, the solution chamber of the microfluidic device 1000 may be connected to a second passive valve for controlling the solutions in the solution chamber to move to the capture filter based on a predetermined rotational force and a sharing channel for sharing the solutions with the solution chamber in another microfluidic structure. Therefore, until the cleaning solution is injected into all the solution chambers 906*a* in the microfluidic device 1000, the cleaning solutions in the solution chamber 906*a* may not move to the capture filter.

In S908*a*, the sample analysis apparatus 2000 may control the rotating member to rotate in a second rotational direction 905*a* and a second rotational number. Based on a second rotational force generated by the rotating body rotating according to the second rotational direction 905*a* and the second rotational number, solutions (e.g., first cleaning solutions) stored in the solution chamber 706*a* of each microfluidic structure may move to a first waste chamber 908*a*. According to one embodiment, the second rotational force may be larger than or equal to the resistance provided by the second passive valve.

According to one embodiment, the sample analysis apparatus 2000 controls the rotating body to generate a second rotational force, so that the solutions stored in the solution chamber in each microfluidic structure may pass through the capture filter. On the capture filter 903*a*, the remaining materials except for the captured target material and impurities may be present, and the remaining materials except for the target material and the impurities may move to the first waste chamber 908*a* together with the cleaning solution by the injected first cleaning solution.

According to one embodiment, the resistance provided by the first passive value for controlling the movement of the sample in the sample analysis apparatus 2000 and the second passive valve for controlling the movement of the solution may be the same as each other. However, according to another embodiment, the resistance provided by the first passive value and the second passive valve may be differently provided, and the sample analysis apparatus 2000 may control the sample and the solutions to move based on different rotational forces by rotating the rotating body at different rotational numbers.

In S910*a*, the sample analysis apparatus 2000 may inject a second cleaning solution into a solution chamber 910*a* of the microfluidic device 1000. For example, despite the cleaning process performed by the sample analysis device 2000 in step S908*a*, impurities and non-captured target materials may be present on the capture filter. Accordingly, the sample analysis apparatus 2000 may inject the second cleaning solution into the solution chamber 910 of the microfluidic device 1000 to prepare a second cleaning process.

In S912*a*, the sample analysis apparatus 2000 may control the rotating member to rotate in a second rotational direction 905*a* and a second rotational number. Based on a second rotational force generated by the rotating body rotating according to the second rotational direction 905*a* and the second rotational number, solutions (e.g., second injected cleaning solutions) stored in the solution chamber 910*a* of each microfluidic structure may move to a first waste chamber 912*a*. In S912*a*, the sample analysis apparatus 2000 may clean the remaining materials except for the target material captured in the capture filter in the process of moving the cleaning solutions in the solution chamber to the first waste chamber 912*a* and as a result, the purified target materials may be located on the capture filter.

In S914*a*, the sample analysis apparatus 2000 may inject an elusion into a solution chamber 914*a* of the microfluidic device 1000. More specifically, the sample analysis apparatus 2000 may inject the elusion for separating the target material captured in the capture filter into the solution chamber 914*a* through the solution inlet. The sample analysis apparatus 2000 may inject an elusion prestored in the storage unit by connecting an injection mechanism to the solution inlet connected to the solution chamber 914*a*.

According to one embodiment, the sample chamber 914*a* of the microfluidic device 1000 may be connected to the second passive valve for controlling the solutions in the solution chamber to move to the capture filter based on a predetermined rotational force. Therefore, until the elusion is injected into all the solution chambers in the microfluidic device 1000, the cleaning solutions in the solution chamber 914*a* may not move to the capture filter.

In S916*a*, the sample analysis apparatus 2000 may control the rotating member to rotate in a first rotational direction 915*a* and a third rotational number. Based on a third rotational force generated by the rotating body rotating according to the first rotational direction 915*a* and the third rotational number, the elusion stored in the solution chamber 914*a* of each microfluidic structure may move to a collection chamber 916*a*. That is, the sample analysis apparatus 2000 may rotate the rotating member in different rotational directions for moving the sample and the cleaning solution by moving the elusion injected to the microfluidic device 1000. According to one embodiment, the third rotational force may be larger than or equal to the resistance provided by the second passive valve connected to the solution chamber 914*a*.

More specifically, as described above, the elusions collected in the collection chamber 916*a* may be filled up to at least a partial channel portion in a siphon channel 918*a* connected to one end of the collection chamber 916*a*. According to one embodiment, the elusions may be filled to a portion in the siphon channel located at a portion corresponding to a height at which the elusions are filled in the collection chamber 916*a*. According to one embodiment, the sample analysis apparatus 2000 may rotate the rotating body alternately in a first direction and a second direction after stopping the rotating body for a predetermined time when the elusion is filled up to at least a portion in the siphon channel. For example, the sample analysis device 2000 may shake the collection chamber 916*a* by rotating the rotating body in the first direction and the second direction.

According to one embodiment, it is assumed that the reaction solutions for amplifying the target material in the collection chamber 918*a* are lyophilized. If the elusion is filled to at least a portion of the siphon channel connected to the one end of the collection chamber 916*a*, the sample analysis device 2000 stops the rotating body for a shortest time and then rotates alternately the rotating body in both direction, so that the target materials included in the reaction solutions and the elusion in the collection chamber are reacted.

In S918*a*, the sample analysis apparatus 2000 may stop the rotating body for a predetermined time when a predetermined time elapses. According to one embodiment, the sample analysis apparatus 2000 may stop the rotating body for a longer time than the stop time before shaking the collection chamber 916*a*. As the rotating body stops, a capillary force applied to the elusion filled to at least a partial channel in the siphon channel 918*a* connected to one end of the collection chamber 916*a* is more increased than the rotational force applied to the elusion in the partial channel and the elusions in the siphon channel 918*a* may start to move to a distribution chamber 920*a*.

That is, the sample analysis apparatus 2000 stops the rotating member at a predetermined time so that the elusions stored in a part of the siphon channel and the collection chamber move to the distribution chambers by the capillary force in the siphon channel 918*a*. According to one embodiment, the sample analysis apparatus 2000 may allow the elusion containing the target material stored in the collection chamber to move to the distribute chambers by rotating the rotating member to a fourth rotational number (e.g., RPM 0). According to one embodiment, in the sample analysis apparatus 2000, the operation of rotating the rotating member at the fourth rotation number may correspond to the operation of maintaining the rotating member to a stopped state. In S918*a*, the sample analysis apparatus 2000 may rotate the rotating member at a fifth rotational number (e.g., 5000 RPM) once the elusion stored in the collection chamber 916*a* and at least a part of the siphon channel starts to move to the reaction chamber.

In S920*a*, the sample analysis apparatus 2000 may allow the elusions containing a target material moving to the distribution chambers through the siphon channel 918*a* to be distributed to the distribution chambers. According to one embodiment, the sample analysis apparatus 2000 rotates the rotary member according to the first rotational direction and the fifth rotational number so that the elusions containing the target material passing through the siphon channel are distributed to the distribution chambers.

In S922*a*, when the elusions containing the target material are distributed to the distribution chambers, the sample analysis apparatus 2000 generates oil by applying predetermined heat to a wax storage unit so that the generated oil is distributed into the distribution chambers. In S924*a*, the sample analysis apparatus 1000 rotates the rotating member according to the first rotational direction and a sixth rotational number, so that the solutions containing the target material distributed to the distribution chambers may be injected to reaction chambers 924*a*.

In S926*a*, the sample analysis apparatus 2000 may maintain the microfluidic device 1000 at a predetermined temperature so that a predetermined temperature for the amplification reaction of the target material is maintained in the reaction chambers 926*a*. As described above, in the reaction chambers 926*a*, the reaction solutions for amplification reaction of the target material may be pre-lyophilized. According to an embodiment, the sample analysis apparatus 2000 may induce the amplification reaction of the target material in the reaction chamber by maintaining the microfluidic device 1000 at 65° C.

The sample analysis apparatus 2000 may induce the amplification reaction of the target material in the reaction chambers in accordance with a series of sample analysis method described above and photograph the microfluidic device at a predetermined time interval while the amplification reaction occurs. The sample analysis apparatus 2000 may acquire first images by photographing the preset microfluidic device at a predetermined time interval and also extract an image for a reaction chamber area in the acquired first image. The sample analysis apparatus 2000 may quantify the progress of the amplification reaction and a concentration of the target material in the sample based on a change of a color value in the images of the reaction chamber area.

According to another embodiment, the sample analysis apparatus 2000 transmits the acquired first images or second images to a server connected with the sample analysis device 2000, and also receive information about the sample analysis result from the server.

Figure 9:
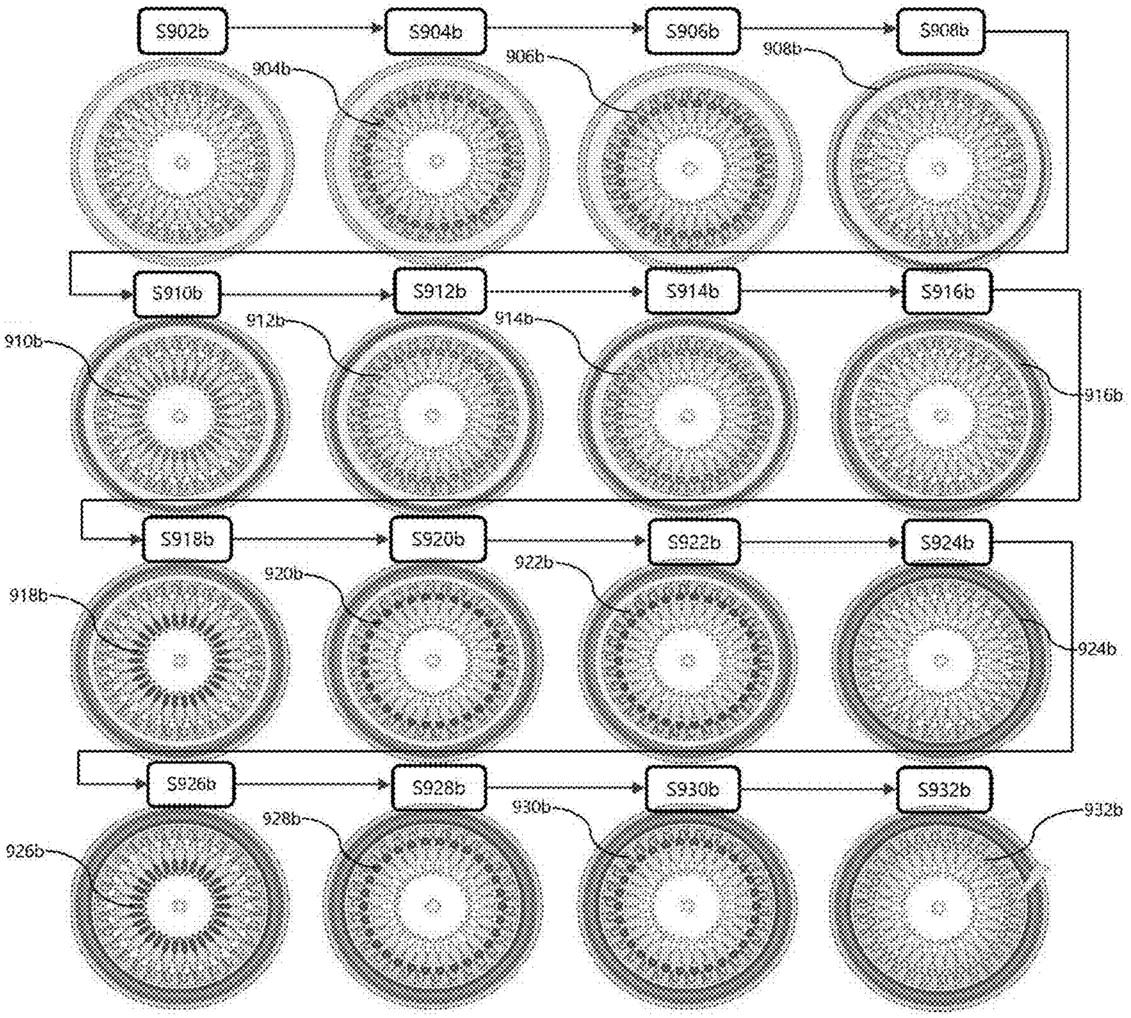
FIG. 9 is a diagram illustrating a process of analyzing samples by the microfluidic device and the sample analysis apparatus using the microfluidic device according to FIGS. 2A to 2C.

FIG. 9 is a diagram illustrating a process of analyzing samples by the microfluidic device and the sample analysis apparatus using the microfluidic device according to FIGS. 2A to 2C.

According to one embodiment, a process in which the sample analysis apparatus 2000 analyzes a sample by using the microfluidic device 1000 will be described in detail. According to an embodiment, the sample analysis apparatus 2000 may quantitatively measure the amount and the presence of a target material (e.g., a target antigen) in the sample by using the microfluidic device 1000.

The sample analysis apparatus 2000 may rotate a rotating body of the microfluidic device coupled to the sample analysis apparatus in predetermined rotational number and rotational direction based on at least one rotary shaft. The sample analysis apparatus 2000 may move a sample and a solution injected to the microfluidic device 1000 in at least one microfluidic structure in the microfluidic device based on a rotational force generated by rotating the rotating body. The sample analysis apparatus 2000 controls at least one of the rotational direction and the rotational number of the rotary body, so that the sample or solutions may be controlled to move in different directions.

According to one embodiment, in the sample analysis apparatus 2000, the sample injected to the microfluidic device 1000 may include a target material (e.g., a target antigen) to be analyzed and impurities except for the target material. Further, a solution injected to the microfluidic device 1000 in the sample analysis apparatus 2000 may include a cleaning solution for cleaning remaining materials except for the target material (e.g., a target antigen), a solution containing an antibody attached with a chromogenic enzyme as a reaction solution for ELISA, and a solution including a chromogenic substrate.

In S902*b*, the microfluidic device 1000 including at least one microfluidic structure in which the sample and the solution are moved may be fastened to the sample analysis apparatus 2000. In S904*b*, the sample analysis apparatus 2000 may inject a sample to a sample chamber 904*b* of the microfluidic device 1000 fastened on the rotating member of the sample analysis apparatus. For example, the sample analysis apparatus 2000 may inject samples prestored in the storage unit by connecting an injection mechanism to an air vent connected to the sample chamber 904*b*. According to one embodiment, as described in FIG. 2C, the samples injected into the sample chamber 904*b* may be filled to an outlet portion of a siphon channel 906*b* connected to a waste chamber. According to one embodiment, the sample injected by the sample analysis apparatus 2000 may include a target antigen to be detected.

According to one embodiment, antibodies that may complementarily bind to the target antigen may be precoated in the sample chamber 904*b*. For example, while the rotating body is stopped, after the samples including the target antigen injected into the sample chamber 904*b* are injected to an end portion (e.g., a portion where an outlet channel of the siphon channel most adjacent to the waste chamber is located), a predetermined incubation time (e.g., about 30 minutes) may be provided. When the incubation is completed, the target antigens in the sample may bind to the pre-coated antibodies in the sample chamber 904*b*. In addition, in the sample chamber 904*b*, target antigens which do not bind to the antigens except for the target antigens binding to the antibodies, and other impurities may be present.

In S906*b*, the sample analysis apparatus 2000 may inject a sample so that the sample injected into the sample chamber is filled to the end of the siphon channel connected between one end of the sample chamber and the waste chamber. According to one embodiment, the sample analysis apparatus 2000 may inject the sample into the sample chamber and the siphon channel in a state where the rotating body is stopped. In S906*b*, the sample analysis apparatus 2000 may inject the sample into the sample chamber and the siphon channel and then wait for a predetermined incubation time. During the incubation time, the target materials in the sample injected by the sample analysis apparatus 2000 may bind to antibodies pre-stored in the sample chamber.

In S908*b*, the sample analysis apparatus 2000 rotates the rotating member according to a first rotational number to move samples including target antigens which are not captured in pre-coated antibodies and impurities, which are stored in the sample chamber 904*b* and the siphon channel, to the waste chamber.

In S910*b*, the sample analysis apparatus 2000 may inject solutions into a solution chamber 910*b* of the microfluidic device 1000. For example, the sample analysis apparatus 2000 may inject a cleaning solution for cleaning the target antigens which do not bind to the antibodies in the sample chamber 904*b* and other impurities into the solution chamber 910*b*. As described above, a passive valve may be coupled to one end of the solution chamber 910*b* so that the solutions of the solution chamber do not move to the sample chamber until the solutions are filed in all the solution chambers in another microfluidic structure.

In S912*b*, the sample analysis apparatus 2000 rotates the rotating member according to a second rotational number, so that the cleaning solutions stored in the solution chamber may move to the sample chamber through the passive valve. While the rotating body rotates according to the second rotational number, the solutions moved to the sample chamber 904*b* through the passive valve may move to a partial channel portion of the siphon channel. According to one embodiment, the solutions moved from the sample chamber through the passive valve by the second rotational force may be moved to a portion of the siphon channel located at a portion corresponding to a height at which the solution is filled in the sample chamber.

When the solution is filled to a part of the siphon channel, the sample analysis apparatus 2000 may stop the rotation of the rotating member for a predetermined time, and then rotate the rotating member alternately in both directions. For example, while the sample analysis apparatus 2000 rotates the rotating member according to the second rotational number, when the solutions are moved to a part of the siphon channel, the sample analysis apparatus 2000 stops the rotating member for a shortest time and then may shake the microfluidic device 1000.

The sample analysis apparatus 2000 may shake the microfluidic device by rotating the rotating member alternately in both directions and as a result, may allow the cleaning solutions in the sample chamber to separate target antigens which do not bind to the antibodies on the sample chamber and impurities.

In S914*b*, the sample analysis apparatus may drop the rotational number of the rotating member or temporarily stop the rotating member so that the cleaning solutions including the cleaning solutions including the target antigens which do not bind to the antibodies on the sample chamber 904*b* and impurities are injected into the siphon channel 914*b*. As the capillary force provided by the siphon channel 914*b* becomes larger than the rotational force of the rotating body, the cleaning solutions including the target antigens which do not bind to the antibodies on the sample chamber 904*b* and impurities may start to be injected into the siphon channel.

In S916*b*, the sample analysis apparatus 2000 may stop the rotating member for a predetermined time so that the cleaning solutions including the target antigens which do not bind to the antibodies on the sample chamber 904*b* and impurities move to a waste chamber 916*b* and then rotate the rotating member according to a third rotational number again. In S916*b*, conjugates of purified antibodies and antigens may be present on the sample chamber 904*b*.

More specifically, while the cleaning solutions injected into the sample chamber 904*b* are filled with the part of the siphon channel, the cleaning solutions are located in at least a partial channel of the siphon channel and the sample chamber 904*b* without moving to an end portion of the siphon channel by the shaking operation of the sample analysis apparatus 2000 to separate antigens which do not bind to the antibodies and impurities in the sample chamber. The sample analysis apparatus 2000 may rotate the rotating member alternately in both directions for a predetermined time, and then stop the rotating member for a predetermined time. According to one embodiment, the sample analysis apparatus 2000 may stop the rotating body for a longer time than the stop time before shaking.

If the sample analysis apparatus 2000 stops the rotating member, the cleaning solutions filled with at least a part of the siphon channel, the impurities included in the cleaning solution, and the antigens that do not bind to the antibodies may move to the outlet portion of the siphon channel by the capillary force of the siphon channel. The sample analysis apparatus 2000 may move the rotating body according to a third rotational number again when the cleaning solutions in the siphon channel, the impurities included in the cleaning solution, and the antigens that do not bind to the antibodies start to move to the waste chamber.

According to one embodiment, the sample analysis apparatus 2000 may repeat the cleaning process from S910*b* to S916*ba* at a predetermined number of times by using different cleaning solutions (e.g., a second cleaning solution, a third wash solution and a fourth washing solution). For example, the sample analysis apparatus 2000 may repeat the cleaning process four times by using the first cleaning solution, the second cleaning solution, the third cleaning solution, and the fourth cleaning solution. However, the present disclosure is not limited thereto.

In S918*b*, the sample analysis apparatus 2000 may inject a solution containing antibodies attached with a chromogenic enzyme for ELISA into the solution chamber 918*b* of the microfluidic device 1000. For example, the sample analysis apparatus 2000 may inject a solution containing secondary antibodies and a chromogenic enzyme liked to the secondary antibodies capable of binding to target antigens binding to primary antibodies pre-coated on the sample chamber 904*b*. According to one embodiment, the primary antibodies and the secondary antibodies may be provided with homogeneous antibodies.

In the S920*b*, the sample analysis apparatus 2000 rotates the rotating member of the microfluidic device 1000 according to the second rotational number so that the solutions containing the secondary antibodies attached with the chromogenic enzyme which are stored in the solution chamber may move to the sample chamber 920*b* by passing through the passive valve. While the rotating body rotates according to the second rotational number, the solutions containing the secondary antibodies attached with the chromogenic enzyme which move to the sample chamber 920*b* by passing through the passive valve may move to a partial channel portion of the siphon channel. According to one embodiment, the solutions moved from the sample chamber through the passive valve by the second rotational force may be moved to a portion of the siphon channel located at a portion corresponding to a height at which the solution is filled in the sample chamber.

When the solution is filled to a part of the siphon channel, the sample analysis apparatus 2000 may stop the rotation of the rotating member for a predetermined time, and then rotate the rotating member alternately in both directions. For example, while the sample analysis apparatus 2000 rotates the rotating member according to the second rotational number, when the solutions are moved to a part in the siphon channel, the sample analysis apparatus 2000 stops the rotating member for a shortest time and then may shake the microfluidic device 1000.

The sample analysis apparatus 2000 may shake the microfluidic device by rotating the rotating member alternately in both directions, and as a result, the secondary antibodies liked with the chromogenic enzyme in the sample chamber may be linked to conjugates of the purified antigens immobilized in the sample chamber and the primary antibodies.

In S922*b*, the sample analysis apparatus 2000 may rotate the rotating member according to the third rotational number again after stopping the rotating member for a predetermined time, so that secondary antibodies linked with the chromogenic enzyme and the solutions containing the secondary antibodies, which are not linked to the conjugates of the antigens immobilized in the sample chamber 920*b* and the primary antibodies among the solutions injected in S918. According to one embodiment, the sample analysis apparatus 2000 may stop the rotating body fora longer time than the stop time before shaking the rotating member.

As the rotating member stops, the capillary force is larger applied to the solution filled to the partial channel in the siphon channel, so that the secondary antibodies linked with the chromogenic enzyme and the solutions containing the secondary antibodies, which are not linked to the conjugates of the antigens and the primary antibodies, may move to the outlet portion of the siphon channel. The sample analysis apparatus 2000 may rotate the rotating member according to the third rotational number again when the solutions start to move to the waste chamber 924*b*.

According to one embodiment, although not illustrated in FIG. 9, the sample analysis apparatus 2000 performs the process of S918B to S924B, and then may perform a cleaning process for cleaning the secondary antibodies linked with the chromogenic enzyme, which are not linked to the conjugates of the antigens and the primary antibodies. According to one embodiment, the sample analysis apparatus 2000 may perform the operation of S910*b* to S916*b* again after step S924*b*.

In S926*b*, the sample analysis apparatus 2000 may inject a solution containing a chromogenic substrate into a solution chamber 926*b*. For example, the sample analysis apparatus 2000 may inject a solution comprising a chromogenic substrate capable of reacting to a secondary conjugate linked with in the chromogenic enzyme.

In S928*b*, the sample analysis apparatus 2000 rotates the rotating member of the microfluidic device 1000 according to the second rotational number, so that the solutions containing the chromogenic substrate which are stored in the solution chamber 926*b* may move to a sample chamber 928*b* by passing through the passive valve. The chromogenic substrates moving to the sample chamber 928*b* may cause a chromogenic reaction 932*b* by reacting with the secondary conjugate attached with the chromogenic enzyme, as in step S932*b* to be described below. According to an embodiment, while the rotating body rotates according to the second rotational number, the solutions containing the chromogenic substrate moving to the sample chamber 920*b* by passing through the passive valve may move to a partial channel portion of the siphon channel. According to one embodiment, the solutions containing the chromogenic substrate moving to the sample chamber 920*b* through the passive valve by the second rotational force generated by the rotating member may be moved to a portion of the siphon channel located at a portion corresponding to a height at which the solution is filled in the sample chamber. When the solution containing the chromogenic substrate is filled to a part in the siphon channel, the sample analysis apparatus 2000 may stop the rotation of the rotating member for a predetermined time, and then rotate the rotating member alternately in both directions.

For example, while the sample analysis apparatus 2000 rotates the rotating member according to the second rotational number, when the solutions containing the chromogenic substrate are moved to a part of the siphon channel, the sample analysis apparatus 2000 stops the rotating member for a shortest time and then may shake the microfluidic device 1000. The sample analysis apparatus 2000 may induce a chromogenic substrate to perform a chromogenic reaction by reacting with a chromogenic enzyme through a sample chamber shaking process.

In S930*b*, after a predetermined time elapses, the sample analysis apparatus 2000 may stop the rotating member for a predetermined time and then rotate the rotating member according to the third rotational number again, so that the solutions containing the chromogenic substrate in the sample chamber 928*b* may move to the waste chamber 932*b* through the siphon channel 930*b*. According to one embodiment, the sample analysis apparatus 2000 stops the rotating member for a longer time than the stop time before shaking the rotating member, so that the solutions containing the chromogenic substrate stored in a part of the siphon channel and the sample chamber start to move to the waste chamber. The sample analysis apparatus 2000 may rotate the rotating member again according to the third rotation number when the solution containing the chromogenic substrate starts to move to the waste chamber.

In S932*b*, the sample analysis apparatus 2000 may wait for a time required for the reaction with the chromogenic substrate and the chromogenic enzyme on the sample chamber 928*b*. According to one embodiment, in order to purify the chromogenic reaction according to the reaction with the chromogenic substrate and the chromogenic enzyme, the sample analysis apparatus 2000 may acquire first images by photographing the microfluidic device at a predetermined time interval. The sample analysis apparatus 2000 may extract a second image about the sample chamber from the first image and analyze color information in the extracted second image, thereby quantifying the elapse of the reaction.

As described above, the sample analysis apparatus 2000 injects samples containing the target antigen in the microfluidic device 1000, cleaning solutions for cleaning antigens which do not bind to the antibodies on the sample chamber and impurities, and other reaction solutions for ELISA and rotates the microfluidic device 1000 in predetermined rotational number and rotational direction, thereby effectively inducing the reaction occurring in a plurality of microfluidic structures in the microfluidic device.

Further, as described above, although not illustrated in FIG. 9, the sample analysis apparatus 2000 may acquire a first image by photographing the images about the microfluidic device at predetermined time intervals, extract second images about the sample chamber area in the acquired first image, and automatically analyze the progress of the reaction based on changes in color values of the extracted second images.

Figure 10:
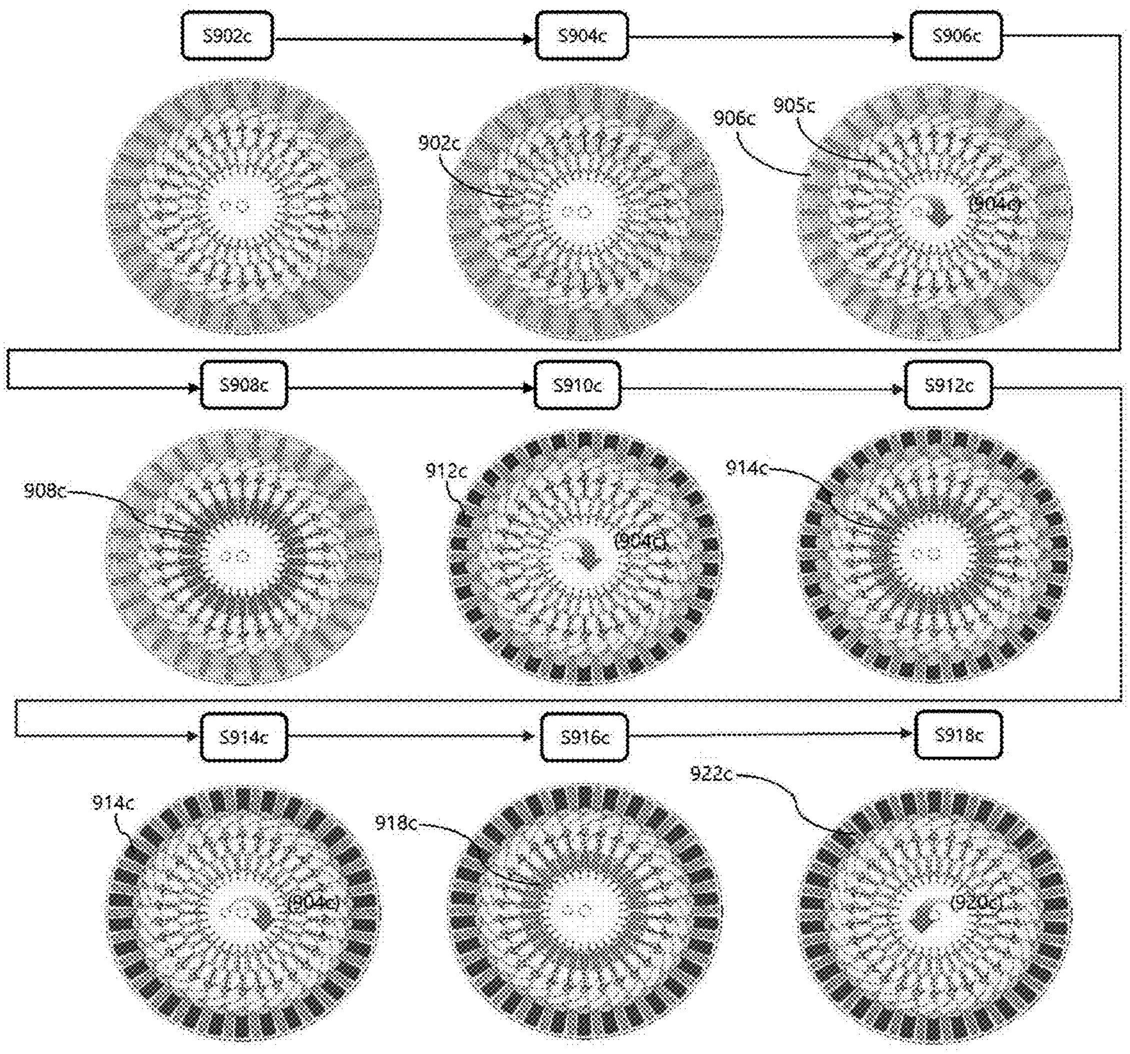
FIG. 10 is a diagram illustrating a process of analyzing samples by the microfluidic device and the sample analysis apparatus using the microfluidic device according to FIGS. 3A to 3C.

FIG. 10 is a diagram illustrating a process of analyzing samples by the microfluidic device and the sample analysis apparatus using the microfluidic device according to FIGS. 3A to 3C.

According to one embodiment, a process in which the sample analysis apparatus 2000 analyzes a sample by using the microfluidic device 1000 will be described in detail. According to an embodiment, the sample analysis apparatus 2000 may extract a target material (e.g., a specific genome) in the sample by using the microfluidic device 1000.

The sample analysis apparatus 2000 may rotate a rotating body of the microfluidic device coupled to the sample analysis apparatus in predetermined rotational number and rotational direction based on at least one rotary shaft. The sample analysis apparatus 2000 may move a sample and a solution injected to the microfluidic device 1000 in at least one microfluidic structure in the microfluidic device based on a rotational force generated by rotating the rotating body. The sample analysis apparatus 1000 controls the rotational direction and the rotational number of the rotary body, so that the samples or solutions may be controlled to move in different directions.

According to one embodiment, in the sample analysis apparatus 2000, the sample injected to the microfluidic device 1000 may include a target material to be analyzed and impurities except for the target material. In addition, in the sample analysis apparatus 2000, the solution injected into the microfluidic device 1000 may include a cleaning solution for cleaning remaining materials except for the target material and an elusion (e.g., water) for separating the target material on a capture filter.

In S902*c*, the sample analysis apparatus 2000 may fasten the microfluidic device 1000 on the rotating member. In S904*c*, the sample analysis apparatus 2000 may inject a sample into a solution chamber 902*c* of the microfluidic device 1000. For example, the sample analysis apparatus 2000 may inject samples prestored in the storage unit by connecting an injection mechanism to a sample inlet connected to the sample chamber. According to one embodiment, the sample chamber of the microfluidic device 1000 may be connected to a first passive valve for controlling samples in the sample chamber to move to a capture filter based on a predetermined rotational force. Accordingly, in the sample analysis apparatus 2000, until samples are injected to all the sample chambers in the microfluidic device 1000, the samples in the sample chamber may not be moved to the capture filter.

In S906*c*, the sample analysis apparatus 2000 may control the rotating member to rotate in a first rotational direction 904*c* and a first rotational number. Based on a first rotational force generated by the rotating body rotating according to the first rotational direction 904*c* and the first rotational number, the samples stored in the solution chamber 902*c* of each microfluidic structure may move to a collection chamber 906*c*. The first rotational force may be greater than or equal to the resistance provided by the first passive valve connected to the sample chamber 902*c*.

According to one embodiment, the sample analysis apparatus 2000 controls the rotating body to generate the first rotational force, so that the samples stored in the sample chamber in each microfluidic structure may pass through the capture filter. The capture filter 905*c* may include a preset thickness of glass fibers, a plurality of silica-based beads, or a silica-based matrix and may capture the target materials in the sample by using the preset thickness of glass fibers, the plurality of silica-based beads, or the silica-based matrix. On the capture filter, there may be remaining materials except for the captured target materials and the target materials in the sample.

In S908*c*, the sample analysis apparatus 2000 may inject solutions into a solution chamber 908*c* of the microfluidic device 1000. More specifically, the sample analysis apparatus 2000 may inject a cleaning solution for cleaning the remaining materials except for the target material in the sample to the solution chamber 908*c*. For example, the sample analysis apparatus 2000 may inject a cleaning solution prestored in the storage unit by connecting an injection mechanism to a solution inlet connected to a solution chamber 908*c*. According to one embodiment, the solution chamber of the microfluidic device 1000 may be connected to the second passive valve for controlling the solutions in the solution chamber to move to the capture filter based on a predetermined rotational force. Therefore, until the cleaning solution is injected into all the solution chambers in the microfluidic device 1000, the cleaning solutions in the solution chamber 908*c* may not move to the capture filter.

In S910*c*, the sample analysis apparatus 2000 may control the rotating member to rotate in a first rotational direction 904*c* and a second rotational number. Based on a second rotational force generated by the rotating body rotating according to the first rotational direction 904*c* and the second rotational number, the solutions (e.g., cleaning solutions) stored in the solution chamber 908*c* of each microfluidic structure may move to a waste chamber 912*c*. The second rotational force may be greater than or equal to the resistance provided by the second passive valve connected to the solution chamber 908*c*.

According to one embodiment, the sample analysis apparatus 2000 controls the rotating body to generate a second rotational force, so that the solutions stored in the solution chamber in each microfluidic structure may pass through the capture filter. On the capture filter 905*c*, the remaining materials except for the captured target material and impurities may be present, and the remaining materials except for the target material and the impurities may move to the waste chamber 912*c* together with the cleaning solution by the injected cleaning solution.

According to one embodiment, the resistance provided by the first passive value for controlling the movement of the sample in the sample analysis apparatus 2000 and the second passive valve for controlling the movement of the solution may be the same as each other. However, according to another embodiment, the resistance provided by the first passive value and the second passive valve may be differently provided, and the sample analysis apparatus 2000 may control the sample and the solutions to move based on different rotational forces by rotating the rotating body at different rotational numbers.

In S912*c*, the sample analysis apparatus 2000 may inject a cleaning solution into a solution chamber 914*c* of the microfluidic device 1000. For example, despite the cleaning process performed by the sample analysis device 2000 in step S910*c*, impurities and non-captured target materials may be present on the capture filter. Accordingly, the sample analysis apparatus 2000 may inject the cleaning solution into the solution chamber 914*c* of the microfluidic device 1000 again to prepare a second cleaning process. According to one embodiment, the sample analysis apparatus 2000 may inject the first cleaning solution in step S908*c* and then inject a second cleaning solution different from the first cleaning solution in step S912*c*. According to one embodiment, the first cleaning solution and the second cleaning solution may be a homogeneous cleaning solution.

In S914*c*, the sample analysis apparatus 2000 may control the rotating member to rotate in a first rotational direction 904*c* and a second rotational number. Based on a second rotational force generated by the rotating body rotating according to the first rotational direction 904*c* and the second rotational number, the solutions (e.g., second injected cleaning solutions) stored in the solution chamber 914*c* of each microfluidic structure may move to a waste chamber 914*c*.

In S916*c*, the sample analysis apparatus 2000 may inject an elusion into a solution chamber 918*c* of the microfluidic device 1000. More specifically, the sample analysis apparatus 2000 may inject the elusion for separating the target material captured in the capture filter into the solution chamber 918*c* through the solution inlet. The sample analysis apparatus 2000 may inject an elusion prestored in the storage unit by connecting an injection mechanism to the solution inlet connected to the solution chamber 918*c*.

According to one embodiment, the solution chamber 918*c* of the microfluidic device 1000 may be connected to the second passive valve for controlling the solutions in the solution chamber to move to the capture filter based on a predetermined rotational force. Therefore, until the elusion is injected into all the solution chambers in the microfluidic device 1000, the cleaning solutions in the solution chamber 908*c* may not move to the capture filter.

In S918*c*, the sample analysis apparatus 2000 may control the rotating member to rotate in a second rotational direction 920*c* and a third rotational number. Based on a third rotational force generated by the rotating body rotating according to the second rotational direction 920*c* and the third rotational number, the elusion stored in the solution chambers 918*c* of each microfluidic structure may move to a collection chamber 922*c*. That is, the sample analysis apparatus 2000 may rotate the rotating member in different rotational directions for moving the sample and the cleaning solution by moving the elusion injected to the microfluidic device 1000. According to one embodiment, the third rotational force may be larger than or equal to the resistance provided by the second passive valve connected to the solution chamber 918*c*.

More specifically, the elusions stored in the solution chamber 918*c* may move to the capture filter despite the resistance provided by the second passive valve, based on the third rotational force generated by the rotation of the rotating body. The elusions moved to the capture filter may separate the purified target materials captured in the capture filter from the capture filter. In S918*c*, while the rotating body rotates in the second rotational direction 920*c*, the elusions containing the captured target material may move tot eh collection chamber 922*c* other than the waste chamber through a delivery chamber.

The sample analysis apparatus 2000 according to one embodiment of the present disclosure performs the sample analysis method according to the above order to rapidly pretreat a large amount of samples, thereby automatically extracting the target materials from the pretreated samples.

According to one embodiment, the sample analysis apparatus 2000 may acquire first images for the microfluidic device 1000 for each step described above. According to another embodiment, the sample analysis apparatus 2000 may acquire the first images for the microfluidic device 1000 at predetermined time intervals after step S918*c*. The sample analysis apparatus 2000 may acquire second images about the collection chambers by pretreating the first images.

The sample analysis apparatus 2000 may identify pixel values of the second images about the collection chambers, and determine color changes of the collection chambers in the second images based on the identified pixel values. The sample analysis apparatus 2000 may identify a concentration of the target material stored in the collection chamber in the microfluidic device based on the color changes of the collecting chambers. According to another embodiment, the sample analysis apparatus 2000 may also transmit information on the acquired first images and second images, or the concentration identification results of the target material to another external device or a server connected with the sample analysis apparatus 2000.

Figure 11:
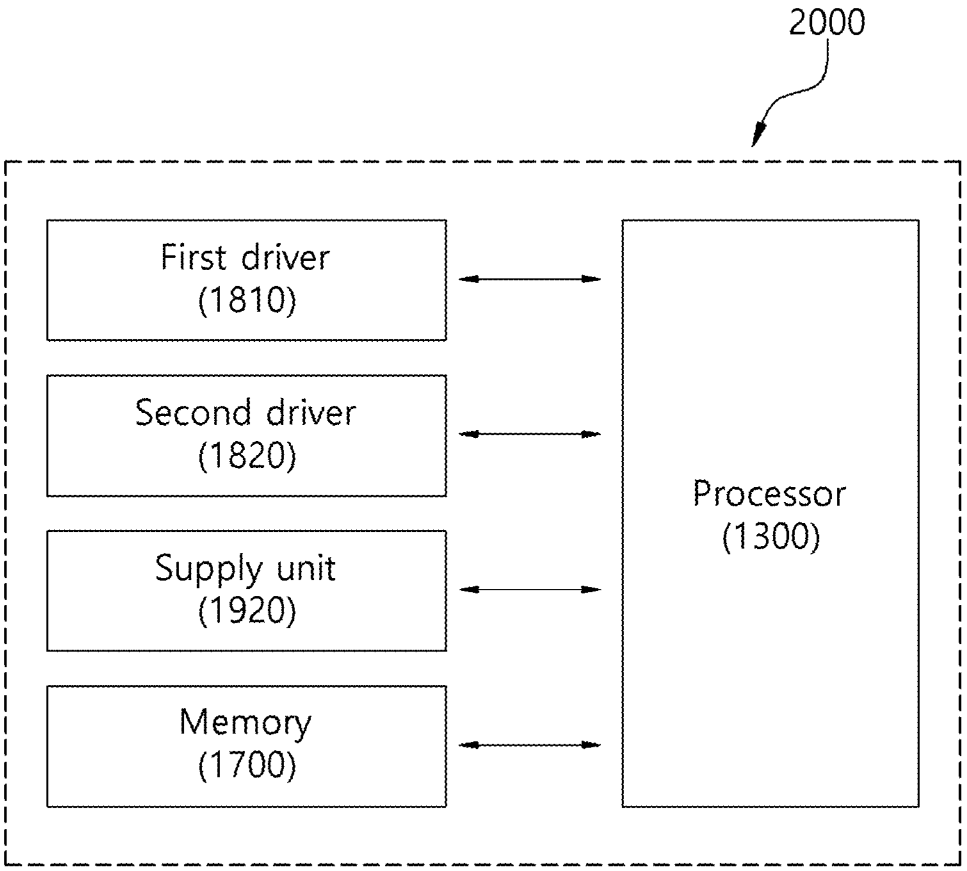
FIG. 11 is a block diagram of a sample analysis apparatus according to an embodiment.

FIG. 11 is a block diagram of a sample analysis apparatus according to an exemplary embodiment.

Figure 12:
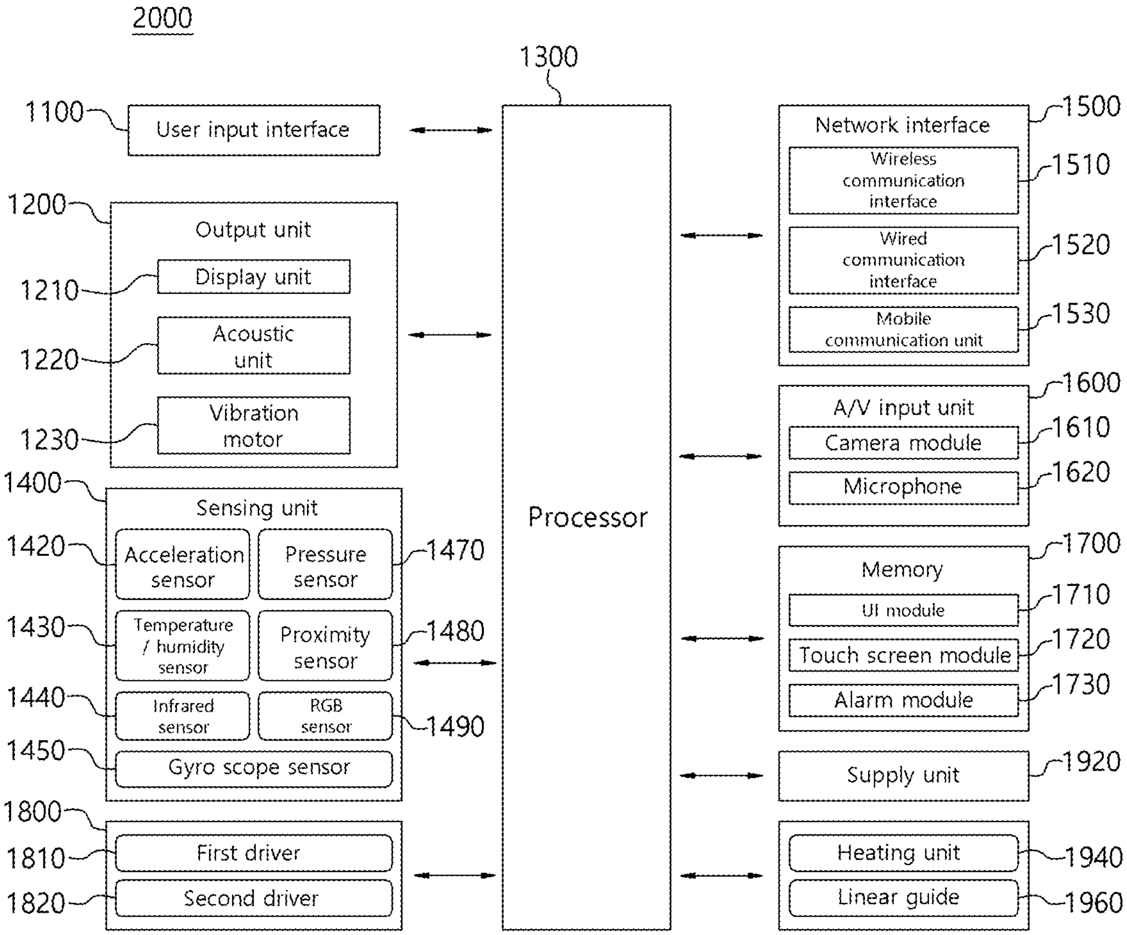
FIG. 12 is a block diagram of a sample analysis apparatus according to another embodiment.

FIG. 12 is a block diagram of a sample analysis apparatus according to another exemplary embodiment.

As illustrated in FIG. 11, the sample analysis apparatus 2000 may include a processor 1300, a memory 1700, a first driver 1810, a second driver 1820, and a supply unit 1920. However, all illustrated components are not required. The sample analysis apparatus 2000 may be implemented by more components than the illustrated components and the sample analysis apparatus 2000 may be implemented by fewer components.

For example, as illustrated in FIG. 12, the sample analysis apparatus 2000 according to an embodiment may further include a user input interface 1100, an output unit 1200, a sensing unit 1400, a network interface 1500, an A/V input unit 1600, a heating unit 1940, and a linear guide 1960, in addition to the processor 1300, a driving unit 1800 including the first driver 1810 and the second driver 1820, the memory 1700, and the supply unit 1920.

The user input interface 1100 refers to a means for inputting a sequence for controlling the sample analysis apparatus 2000 by the user. For example, the user input interface 1100 may include a key pad, a dome switch, a touch pad (a contact capacitance type, a pressure resistive type, an infrared sensing type, a surface ultrasound conduction type, an integrated tension measurement method, a piezo effect type, etc.), a jog wheel, a jog switch, etc., but is not limited thereto. The user input interface 1100 may receive a user's input sequence for a screen output on the display by the sample analysis apparatus 2000. In addition, the user input interface 1100 may also receive a user touch input touching the display or a key input through a graphic user interface on the display.

The output unit 1200 may output an audio signal or a video signal or a vibration signal, and the output unit 1200 may include a display unit 1210, an acoustic output unit 1220, and a vibration motor 1230.

The display unit 1210 includes a screen for outputting information processed in the sample analysis apparatus 2000. In addition, the screen is an image acquired by photographing the reaction chambers connected to the collection chamber or the distribution chamber in the microfluidic device, and may be used to analyze a biological or chemical reaction result generated in the reaction chamber or the collection chamber.

The acoustic output unit 1220 is received from the network interface 1500 or outputs audio data stored in the memory 1700. In addition, the acoustic output unit 1220 outputs an acoustic signal associated with a function performed in the sample analysis apparatus 2000. The vibration motor 1230 may output a vibration signal. For example, the vibration motor 1230 may output a vibration signal corresponding to the output of functions performed in an electronic device 1000.

The processor 1300 usually controls the overall operation of the sample analysis apparatus 2000. For example, the processor 1300 executes programs stored in the memory 1700 to control the user input unit 1100, the output unit 1200, the sensing unit 1400, the network interface 1500, the A/V input unit 1600, etc. as a whole. Further, the processor 1300 executes programs stored in the memory 1700 and may perform the function of the sample analysis apparatus 2000 described in FIGS. 1A to 10.

Specifically, the processor 1300 may acquire an input of a user touching the screen of the sample analysis apparatus 2000 by controlling the user input unit. According to one embodiment, the processor 1300 may control a microphone to acquire a user's voice. The processor 1300 may execute an application for moving samples and solutions in a microfluidic device based on the user input, and may also execute an application for measuring the reaction progress to the target material in the collection chamber. Further, the processor 1300 may further acquire other user inputs through the executed application.

According to one embodiment, the processor 1300 may perform automatically the sample analysis process for the samples of the microfluidic device coupled to the sample analysis apparatus 200 by executing at least one instruction related to the sample analysis method stored in the memory 1700.

According to one embodiment, the processor 1300 may control the first driver to rotate the microfluidic device along the rotary shaft. According to one embodiment, the processor 1300 may control the second driver which moves an injection mechanism for injecting the sample and the solution along a predetermined drive shaft to the microfluidic device.

Further, according to one embodiment, the processor 1300 controls the supply unit which stores a sample and solutions to be supplied to the injection mechanism, so that the stored sample and solutions (cleaning solution, elusion, cleaning solution and reaction solutions for ELISA reaction) may be selectively provided to the injection mechanism.

According to one embodiment, the processor 1300 may control the rotating member to rotate according to a first rotational direction and a first rotational number, so that the rotating member may generate a first rotational force. According to another embodiment, the processor 1300 may control the rotating member to rotate according to the first rotational direction and a second rotational number, so that the rotating member may generate a second rotational force in the first rotational direction.

According to yet another embodiment, the processor 1300 may control the rotating member to rotate according to a second rotational direction and the first rotational number, so that the rotating member may generate a first rotational force in the second rotational direction. However, according to yet another embodiment, the processor 1300 may control the rotating member to rotate according to the second rotational direction and the second rotational number, so that the rotating member may generate the second rotational force in the second rotational direction.

According to one embodiment, the processor 1300 may control a second driving member in the second driver to move vertically along at least one guide shaft. The processor 1300 also controls a step motor so that the second driving member in the second driver rotates at a predetermined angle interval to control the injection mechanism connected to one end of the drive shaft to be located in a predetermined microfluidic structure in the microfluidic device.

According to one embodiment, the processor 1300 may control the heating unit located below the sample analysis apparatus to which the microfluidic device 1000 is fastened to control a temperature required for the reaction of the sample to be maintained. Further, the processor 1300 may control a linear guide for aligning the position of the heating unit in an outer direction of the first driver, thereby controlling the heating unit to provide uniform heat energy to the microfluidic device.

According to one embodiment, the processor 1300 controls a port valve in the supply unit to control one supply channel among the supply channels connected to the storage unit to be connected to an injection channel of the injection mechanism. Further, the processor 1300 controls a cylinder pump, so that the supply channel connected to the storage unit is connected to the injection channel and then the solutions or samples stored in the storage unit may be discharged to the injection mechanism through the supply channel and the injection channel.

According to one embodiment, the processor 1300 may acquire images for the microfluidic device at a predetermined time interval by controlling a camera in the sample analysis apparatus. Further, the processor 1300 may also transmit information on the images acquired from the camera to other external devices connected to the sample analysis apparatus.

According to one embodiment, the processor 1300 identifies a reaction chamber area in the images of the microfluidic device acquired through the camera, and may quantify a progress of chemical or biological reaction occurring in the reaction chamber area based on color values of an image for the identified reaction chamber area.

For example, when a target material, a primer, and a LAMP solution are included in the reaction chamber, the processor 1300 may acquire images for the reaction chamber area by photographing the reaction chambers according to a predetermined time interval and analyze a progress of amplification reaction of the target material based on changes in color values in the acquired images.

According to another embodiment, when a solution containing antibodies binding to a target material (e.g., target antigen), antibodies binding to a chromogenic enzyme, and a chromogenic substrate capable of reacting with the chromogenic enzyme is included in the sample chamber, the processor 1300 may acquire images for the sample channel area by photographing the sample channels at a predetermined time interval and analyze a progress of ELISA reaction based on changes in color values in the acquired images.

According to another embodiment, the processor 1300 identifies a collection chamber area in the images of the microfluidic device acquired through the camera, and may quantify a progress of chemical or biological reaction occurring in the chamber area based on color values of an image for the identified collection chamber area.

According to another embodiment, the processor 1300 transmits the images for the reaction chamber acquired at a preset time interval to an external device and may control the network interface to receive a result analyzed based on the images received by the external device.

According to another embodiment, the processor 1300 transmits the images for the sample chamber acquired at a preset time interval to an external device and may control the network interface to receive a result analyzed based on the images received by the external device.

According to yet another embodiment, the processor 1300 transmits the images for the collection chamber acquired at a preset time interval to an external device and may control the network interface to receive a result analyzed based on the images received by the external device.

The sensing unit 1400 may detect states around the sample analysis apparatus 2000 and transmit the sensed information to the processor 1300. The sensing unit 1400 may include at least one of an acceleration sensor 1420, a temperature/humidity sensor 1430, an infrared sensor 1440, a gyroscope sensor 1450, a pressure sensor 1470, a proximity sensor 1480, and an RGB sensor (illuminance sensor) 1490, but is not limited thereto. Since the functions of each sensor can be intuitively inferred by those skilled in the art from the name, a detailed description thereof will be omitted.

The network interface 1500 may include one or more components that make the sample analysis apparatus 2000 communicate with other devices (not illustrated) and a server 4000. Other devices (not illustrated) may be devices such as the sample analysis apparatus, computing devices capable of acquiring images and analyzing color values of the acquired images, or sensing devices, but are not limited thereto. For example, the network interface 1500 may include a wireless communication interface 1510, a wired communication interface 1520, and a mobile communication unit 530.

The wireless communication interface 1510 may include a short-range wireless communication unit, a Bluetooth communication unit, a near field communication unit, a WLAN (WiFi) communication unit, a ZigBee communication unit, an infrared (IrDA, infrared Data Association) communication unit, a WFD (Wi-Fi direct) communication unit, etc., but is not limited thereto. The wired communication interface 1520 may wiredly connect the server 2000 or the sample analysis apparatus 2000.

The mobile communication unit 1530 transmits/receives a radio signal to/from at least one of abase station, an external terminal, and a server on a mobile communication network. Herein, the radio signal may include various types of data depending on transmission/reception of a voice signal, a video call signal, or a text/multimedia message.

According to one embodiment, the network interface 1500 may transmit images photographed by the microfluidic device to the server by controlling the processor. In addition, the network interface 1500 may receive an analysis result of the progress of the reaction in the reaction chamber from the server.

The audio/video (A/V) input unit 1600 is used for inputting an audio signal or a video signal may include a camera 1610, a microphone 1620, etc. The camera 1610 may acquired an image frame such as a still image or a moving picture by an image sensor in a video call mode or a photographing mode. The image captured through the image sensor may be processed through the processor 1300 or a separate image processing unit (not illustrated). For example, the camera module 1610 may acquire an image for the reaction chambers according to a predetermined photographic period.

The microphone 1620 receives an external acoustic signal and processes the received acoustic signal into electrical voice data. For example, the microphone 1620 may receive an acoustic signal from an external device or a user. The microphone 1620 may receive user's voice input. The microphone 1620 may use various noise removal algorithms to remove noise generated in a process of receiving the external acoustic signal.

The memory 1700 may store programs for processing and controlling of the processor 1300 and may also store data input or output to the sample analysis apparatus 2000. Further, the memory 1700 may store various driving instructions required for the sample analysis apparatus 2000 to control the first driver and the second driver. Further, the memory 1700 may include various instructions required for the sample analysis apparatus 2000 to perform automatically a sample analysis process by extracting samples or solutions from the supply unit, injecting the extracted samples or solutions to the microfluidic device, and rotating the microfluidic device in predetermined rotational direction and rotational number.

The memory 1700 may include at least one type of storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The programs stored in the memory 1700 may be classified into a plurality of modules according to their functions, and for example, may be classified into a UI module 1710, a touch screen module 1720, and an alarm module 1730.

The UI module 1710 may provide specialized UI, GUI, and the like that are linked with the sample analysis apparatus 2000 for each application. The touch screen module 1720 may detect a touch gesture on the touch screen of the user, and may transmit information on the touch gesture to the processor 1300. The touch screen module 1720 according to some embodiments may recognize and analyze a touch code. The touch screen module 1720 may be configured by separate hardware including a controller.

The alarm module 1730 may generate a signal for alarming occurrence of an event of the sample analysis apparatus 2000. Examples of the event which occurs in the sample analysis apparatus 2000 include call signal reception, message reception, key signal input, schedule alarm, and the like. The alarm module 1730 may output an alarm signal in the form of a video signal through the display unit 1210, output an alarm signal in the form of an audio signal through the acoustic output unit 1220, and output an alarm signal in the form of a vibration signal through the vibration motor 1230.

The driving unit 1800 may include a first driver 1810 and a second driver 1820. Each component of the driving unit 1800 may correspond to the first driver 520 and the second driver 540 as described in FIGS. 4 to 7, and thus the detailed description will be omitted.

The supply unit 1920 may store the sample and the solutions to be supplied to the injection mechanism, and supply the stored samples and solutions to the injection mechanism through a particular supply channel. Each component of the supply unit 1920 may correspond to the port valve 649, the supply channel 646, and the storage unit 642 described above in FIGS. 4 to 7, and the detailed description will be omitted.

The heating unit 1940 may provide a temperature suitable for the reaction of the sample and the solutions in the microfluidic device by generating heat energy below the microfluidic device. The linear guide 1960 aligns the position of the heating unit located below the microfluidic device when the predetermined sample and the solutions are injected into the microfluidic device to constantly supply the heat energy to the microfluidic device 1000. Since the heating unit 1940 and the linear guide 1960 may correspond to the heating units 632, 634 and the linear guides 636 and 638 described above in FIG. 5, a detailed description will be omitted.

Figure 13:
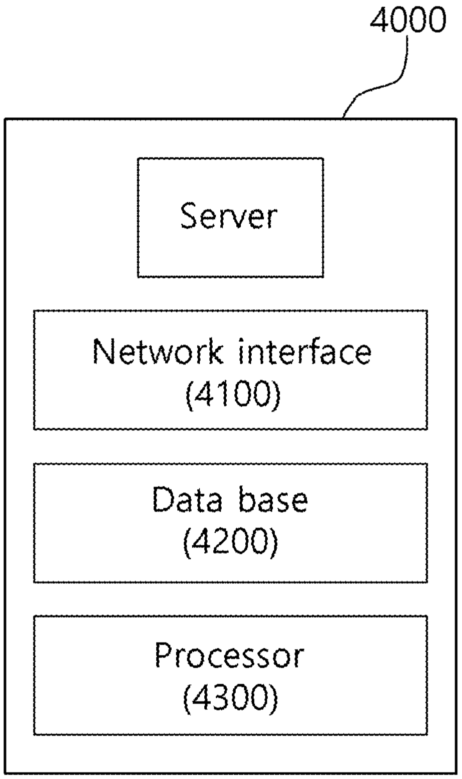
FIG. 13 is a block diagram of a server connected with the sample analysis apparatus according to an embodiment.

FIG. 13 is a block diagram of a server connected with the sample analysis apparatus according to an exemplary embodiment.

The server 4000 may include a network interface 4100, a database 4200, and a processor 4300. The network interface 4100 may correspond to the network interface 1500 of the sample analysis apparatus 1000 illustrated in FIGS. 11 to 12. For example, the network interface 4100 may receive an image for the collection chambers in the microfluidic device from the sample analysis apparatus 2000 or transmit information on a collection chamber image analysis result determined in the server 4000 to the sample analysis apparatus 2000.

According to another embodiment, the network interface 4100 may receive an image for the sample chambers in the microfluidic device from the sample analysis apparatus 2000 or transmit information on a sample chamber image analysis result determined in the server 4000 to the sample analysis apparatus 2000.

The database 4200 may correspond to the memory 1700 of the sample analysis apparatus 2000 illustrated in FIG. 11. For example, the database 4200 may store first images for the microfluidic device received from the sample analysis apparatus 2000, second images for the collection chambers generated by pre-processing the first images, and information on a reaction result determined by analyzing color information in the first images and the second images.

In addition, according to one embodiment, the database 4200 may further store information on color values of the collection chambers acquired from the images for the collection chambers, changes in the reaction time of the color values, and the concentration of the target material determined based on the change in color value for each collection chamber.

According to another embodiment, the database 4200 may store first images for the microfluidic device received from the sample analysis apparatus 2000, second images for the sample chambers generated by pre-processing the first images, and information on an immune diagnosis result determined by analyzing color information in the first images and the second images.

According to yet another embodiment, the database 4200 may further store information on color values of the sample chambers acquired from the images for the sample chambers, changes in the reaction time of the color values, and the concentration of the target material determined based on the change in color value for each sample chamber.

According to yet another embodiment, the database 4200 may store first images for the microfluidic device received from the sample analysis apparatus 2000, second images for the collection chambers generated by pre-processing the first images, and information on a reaction result determined by analyzing color information in the first images and the second images.

The processor 4300 generally controls an overall operation of the server 4000. For example, the processor 4300 may entirely control the DB 4200 and the network interface 4100, by executing programs stored in the DB 4200 of the server 4000. Further, the processor 4300 may execute programs stored in the DB 4100 and may perform some of the operations of the sample analysis apparatus 2000 described in FIGS. 1A to 10.

For example, the processor 4300 may acquire first images for the microfluidic device, acquire second images for the reaction chambers from the acquired first images, and identify color information of the reaction chambers from the second images while extracting the target material in the collection chambers in the sample analysis apparatus 2000.

According to yet another embodiment, the processor 4300 may acquire first images for the microfluidic device, acquire second images for the reaction chambers from the acquired first images, and identify color information of the sample chambers from the second images while the immune response on the target material in the sample chambers occurs in the sample analysis apparatus 2000.

In addition, the processor 4300 identifies the progress of the amplification reaction of the target material extracted in the reaction chambers based on the acquired color information, and quantifies the concentration or color change amount of the target material, and transmit quantitative result information on the target material to the sample analysis device 2000.

According to another embodiment, the processor 4300 may identify the concentration of the target material extracted in the sample chambers based on the acquired color information, and transmit information on the concentration of the identified target material to the sample analysis device 2000.

The method according to the embodiment may be implemented in a form of program instructions which may be performed through various computer means to be recorded in a computer readable medium. The computer readable medium may include program instructions, a data file, a data structure, and the like alone or in combination. The program command recorded in the medium may be specially designed and configured for the present disclosure, or may be publicly known to and used by those skilled in the computer software field.

Further, there may be provided a computer program apparatus including a recording medium stored in which a program is stored to perform the method according to the exemplary embodiment. Examples of the computer readable medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. Examples of the program instructions include high-level language codes executable by a computer by using an interpreter and the like, as well as machine language codes created by a compiler.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A microfluidic device comprising: a rotating body;

at least two microfluidic structures disposed at a predetermined interval in the rotating body;

a solution inlet; and a sharing channel connected between the solution inlet and each of the at least two microfluidic structures, wherein each of the at least two microfluidic structures comprises;

a pretreatment unit which shares a solution injected through the solution inlet and the sharing channel and performs a pretreating process for a sample injected through a sample inlet and the solution;

a storage unit which is located outside the pretreatment unit in a radial direction in the rotating body and separately stores the sample and solution pretreated by the pretreatment unit based on a rotational direction of the rotating body;

and a detection unit which distributes a target material in the pretreated sample from the storage unit and performs the detection on the distributed target material, wherein the pretreatment unit comprises:

a sample chamber for receiving the sample injected through the sample inlet;

a solution chamber for receiving, via the sharing channel, the solution injected through the solution inlet;

a capture filter for capturing a target material from the injected sample; and a solution valve disposed between the solution chamber and the capture filter and configured to control a flow from the solution chamber to the capture filter such that the solution in the solution chamber is configured to not be moved to the capture filter until the solution is shared in each solution chamber of a different one of the least two microfluidic structures.

2. The microfluidic device of claim 1, wherein the pretreatment unit further comprises a sample valve which provides the sample received at the sample chamber to the capture filter based on a first rotational force generated by the rotating body; and wherein the solution valve is configured to provide the solution received at the solution chamber to the capture filter based on a second rotational force generated by the rotating body.

3. The microfluidic device of claim 2, wherein the sharing channel is formed in a zigzag form in a circumferential direction in the rotary body, and the rotating body stops or rotates so that the solution in the solution chamber is not moved to the capture filter until the solution is shared in each solution chamber in another microfluidic structure.

4. The microfluidic device of claim 1, wherein the storage unit comprises a collection chamber which stores an elusion including the target material captured in the capture filter in the target material in the sample and the solution; and a first waste chamber which stores a cleaning solution for cleaning remaining materials except for the target material captured in the capture filter in the sample and the solution passing through the capture filter.

5. The microfluidic device of claim 4, wherein the storage unit further comprises a delivery chamber which acquires an elusion containing the target material or a sample passing through the capture filter, and the cleaning solution from the capture filter, and selectively delivers the elusion including the target material to the collection chamber or deliver the sample passing through the capture filter and the cleaning solution to the first waste chamber, wherein reaction solutions for detecting the target material are lyophilized in the collection chamber, and the delivery chamber in the storage unit is connected to the collection chamber and the first waste chamber in the storage unit.

6. The microfluidic device of claim 4, wherein the detection unit comprises a siphon channel of which one end is connected to the collection chamber;

a distribution unit which is connected to the other end of the siphon channel and includes a plurality of distribution chambers so that the elusion including the target material is distributed by a predetermined amount from the collection chamber; and a reaction unit which acquires the elusion including the target material provided from the distribution chambers and includes reaction chamber in which primers and reaction solutions for detecting the target material are lyophilized.

7. The microfluidic device of claim 6, wherein the detection unit further comprises a second waste chamber which stores an elusion remaining after being distributed to the distribution chambers in the elusion including the target material acquired from the siphon channel.

8. The microfluidic device of claim 6, wherein the detection unit further comprises a wax storage which stores wax for generating oil to be injected into the distribution chamber at a predetermined temperature so as to prevent evaporation of the elusion after the elusion including the target material is distributed to the distribution chambers.

9. The microfluidic device of claim 6, wherein the rotating body stops for a predetermined time so that a rotational force generated by the rotating body applied to at least a partial channel portion in the siphon channel is smaller than a capillary force generated by the at least the partial channel portion, so that the target material in the collection chamber starts to move to the siphon channel.

10. The microfluidic device of claim 6, wherein the rotating body rotates so that the rotational force applied to the elusion containing the target material in the distribution chambers become greater than the air pressure stored in the reaction chambers.

11. A sample analysis apparatus comprising:

the microfluidic device of claim 1;

a first driver which rotates the microfluidic device along the rotary shaft;

a second driver which moves an injection mechanism for injecting samples and solutions to the microfluidic device along a predetermined driving shaft;

a supply unit configured to contain the samples and solutions to be provided to the injection mechanism and to selectively provide the contained samples and solutions to the injection mechanism; and a controller which controls the first driver, the second driver, and the supply unit so that the samples and solutions in the microfluidic structure moves on a predetermined path.

12. The sample analysis apparatus of claim 11, wherein the first driver comprises a rotating member which is fastened to the microfluidic device and rotatably installed together with the microfluidic device along the rotary shaft of the microfluidic device; and a spindle motor which rotates the rotating member at predetermined rotational direction, rotational speed, and rotational number based on a first control signal acquired from the controller.

13. The sample analysis apparatus of claim 11, further comprising:

heating units which cover at least a part of the first driver in a cylindrical shape in an outer direction of the first driver below the microfluidic device; and linear guides for aligning the positions of the heating units in the outer direction of the first driver.

14. The sample analysis apparatus of claim 11, wherein the sample includes a target material to be analyzed, and the solution includes a cleaning solution for cleaning remaining materials except for the target material, an elusion for separating the target material, and a reaction solution for amplifying the target material in the sample.

15. The sample analysis apparatus of claim 14, wherein the supply unit comprises:

a container in which the samples, the cleaning solution, and the elusion are separately stored;

a supply channel connected to the container and configured to separately acquire the samples, the cleaning solutions, the elusion, and the reaction solution from the container;

a port valve for selecting a channel to be connected to the injection mechanism among the supply channels by the control of the controller; and a cylinder pump for moving the samples, the cleaning solution, the elusions, and the reaction solutions to the injection mechanism in the storage unit, wherein the supply channel is provided to connect the container and the port valve.

16. The sample analysis apparatus of claim 15, wherein the storage unit comprises a sample storage unit storing the sample;

a cleaning solution storage unit storing the cleaning solution;

an elusion storage unit for storing the elusion; and a reaction solution storage unit for storing the reaction solution, wherein the sample storage unit, the cleaning solution storage unit, and the elusion storage unit further comprise a connection hole in communication with the supply channel.

17. The sample analysis apparatus of claim 11, further comprising:

a first housing formed so that the first driver, the second driver, and the controller are located therein; and a second housing which is connected to the first housing to be openable to selectively expose the microfluidic device.

* * * * *